US009972354B2

(12) United States Patent
Boyd

(10) Patent No.: US 9,972,354 B2
(45) Date of Patent: *May 15, 2018

(54) CALIBRATED DEVICE AND METHOD TO DETECT MATERIAL FEATURES ON A SPINNING SURFACE BY GENERATION AND DETECTION OF GRAVITO-MAGNETIC ENERGY

(71) Applicant: Michael Boyd, Soquel, CA (US)

(72) Inventor: Michael Boyd, Soquel, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/130,768

(22) Filed: Apr. 15, 2016

(65) Prior Publication Data

US 2017/0025148 A1 Jan. 26, 2017

Related U.S. Application Data

(63) Continuation-in-part of application No. 13/595,424, filed on Aug. 27, 2012, now Pat. No. 9,318,031.

(51) Int. Cl.
*G01V 7/04* (2006.01)
*G09B 23/06* (2006.01)
(Continued)

(52) U.S. Cl.
CPC ............ *G11B 20/1816* (2013.01); *G01V 7/04* (2013.01); *G09B 23/06* (2013.01); *G09B 23/18* (2013.01); *H02N 11/008* (2013.01)

(58) Field of Classification Search
CPC ...... G11B 20/1816; G01V 7/04; G09B 23/06; G09B 23/18; H02N 11/008
(Continued)

(56) References Cited

U.S. PATENT DOCUMENTS 5,126,561 A * 6/1992 Nakazawa ............. G01B 11/26
250/230
6,073,486 A * 6/2000 Packard ................. G01N 19/08
73/105

(Continued)

FOREIGN PATENT DOCUMENTS

RU   2007119441 A   11/2008
WO   2010010434 A1   1/2010

OTHER PUBLICATIONS

U.S. Appl. No. 12/159,657, filed May 3, 2011, Han et al.
(Continued)

*Primary Examiner* — Brandon S Cole
(74) *Attorney, Agent, or Firm* — Patrick Reilly

(57) ABSTRACT

A head-disk assembly device, "mass spin-valve" or "gravitational rectifier" and method of producing gravitomagnetic induction utilizing Nano-features fabricated on the surface of a hard disk is presented. The Nano-features may include Nano-bumps and Nano-pits. The device includes a computer hard disk, a piezoelectric glide head and/or a GMR read head, a typical hard drive's electronics, wherein defects are fabricated on the said disk using a Focused Ion Beam (FIB) by depositing requisite number of nanobumps of specified height, and etching equal number of nanopits of specified depth a few mils or mm apart on a pre-decided radius. By spinning the said nano-features disk produce (1) an associated mechanical force utilizing a piezoelectric glide head and/or (2) an associated magnetic force utilizing a GMR read head for (a) general use in surface characterization work and (b) for producing power by the presence or the absence of matter on a spinning disk.

19 Claims, 47 Drawing Sheets

(51) Int. Cl.
 *G09B 23/18* (2006.01)
 *G11B 20/18* (2006.01)
 *H02N 11/00* (2006.01)

(58) Field of Classification Search
 USPC .................................................. 307/100–112
 See application file for complete search history.

(56) References Cited

U.S. PATENT DOCUMENTS

| | | | |
|---|---|---|---|
| 6,359,433 B1 | 3/2002 | Hillis et al. | |
| 6,956,707 B2 | 10/2005 | Ottesen et al. | |
| 6,960,975 B1* | 11/2005 | Volfson | B64G 1/409 |
| | | | 335/216 |
| 7,549,325 B1 | 6/2009 | Yang et al. | |
| 8,000,066 B2 | 8/2011 | Mizuno et al. | |
| 8,576,407 B2 | 11/2013 | Flechsing et al. | |
| 2001/0028536 A1* | 10/2001 | Sugimoto | G11B 5/6005 |
| | | | 360/245 |
| 2003/0002728 A1* | 1/2003 | Takai | G06T 7/0002 |
| | | | 382/141 |
| 2008/0020935 A1* | 1/2008 | Volfson | H01S 1/02 |
| | | | 505/180 |
| 2012/0212375 A1* | 8/2012 | Depree, IV | H01Q 15/0086 |
| | | | 343/700 MS |
| 2016/0101372 A1* | 4/2016 | Antolin | A63H 33/26 |
| | | | 446/132 |

OTHER PUBLICATIONS

U.S. Appl. No. 11/176,680, filed Feb. 27, 2007, Matsui.
U.S. Appl. No. 13/369,061, filed Apr. 29, 2014, Chen.
M.L. Ruggicro, A. Tartaglia; "Gravitomagnetic effects;" Dip. Fisica, Politecnico and INFN, Torino, Italy; PACS Nos. 04.20, 04.80; Feb. 3, 2008.
Boyd, M., Xiaopeng, X., "MR Glide Inspection for Hard Disk Defect Detection", (SPIE vol. 3619), San Jose, California, U.S. Jan. 1999 pp. 53-64.
Tajmar, M. "Martin Tajmir on Gravitomagnetism", (youtube.com), Sep. 8, 2012: https://www.youtube.com/watch?v=FRb-1WApJKs.

* cited by examiner

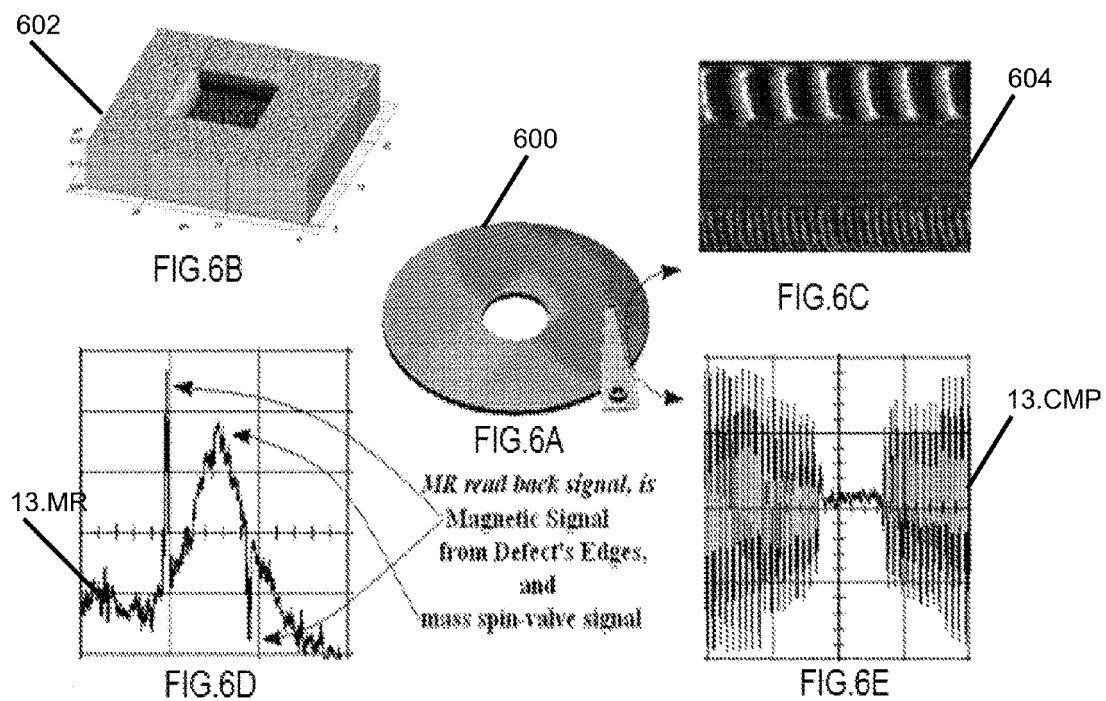

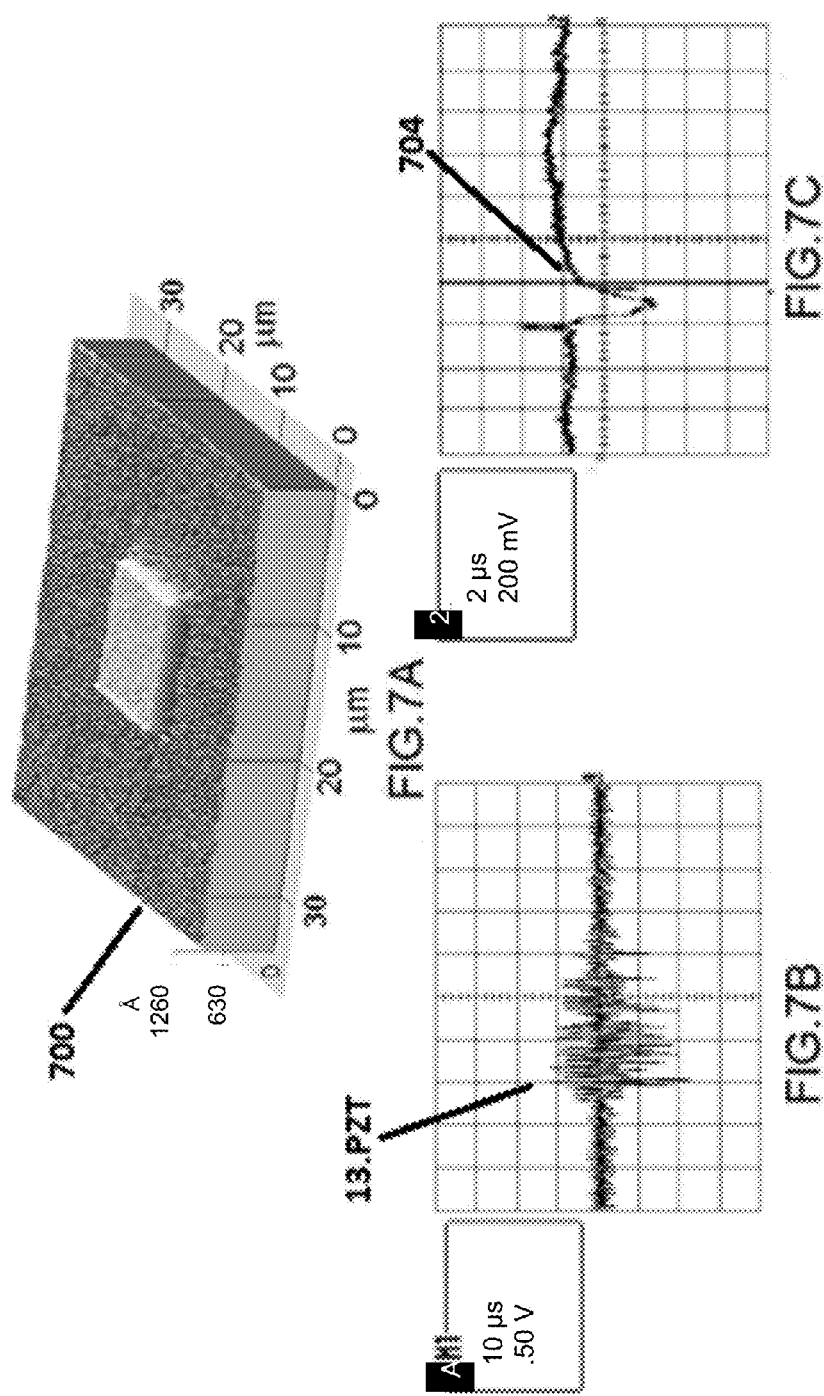

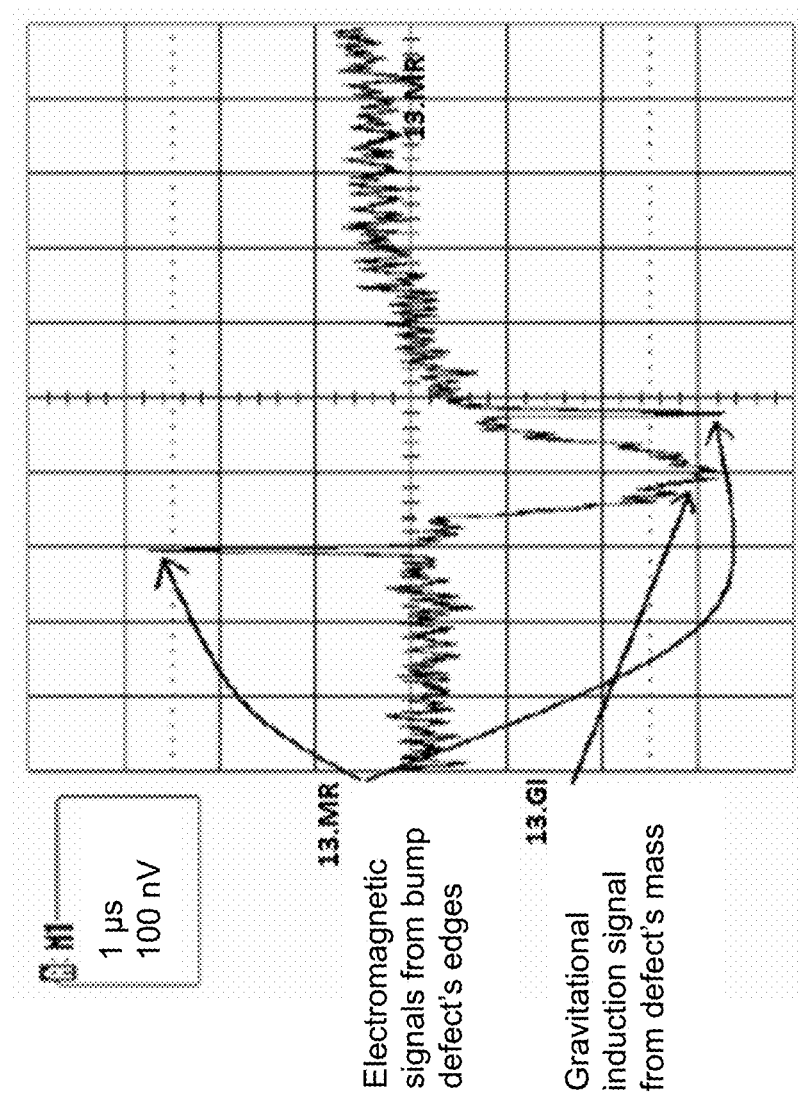

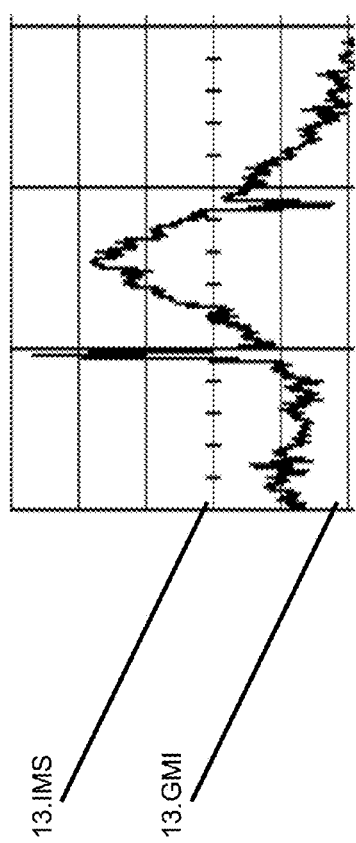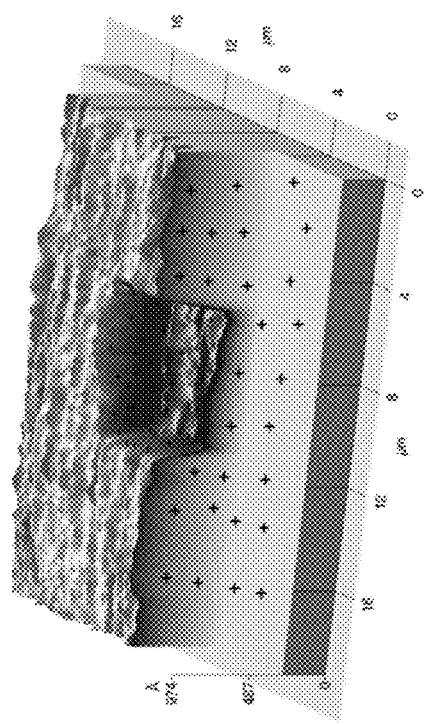
FIG. 20

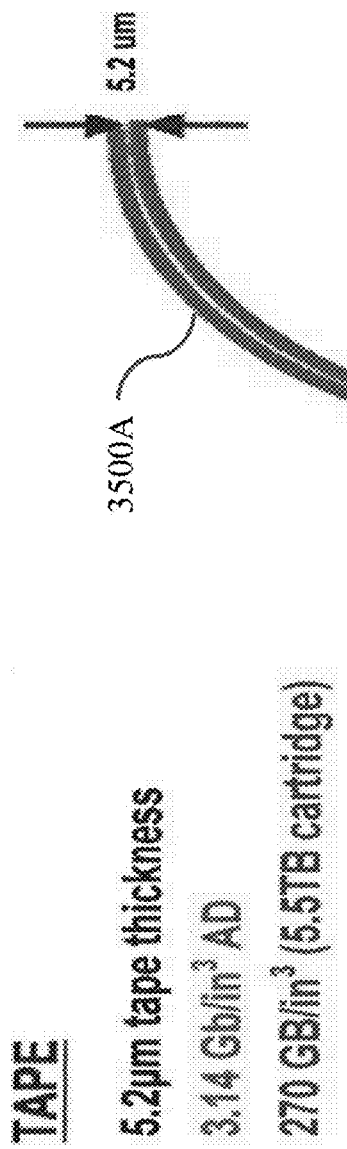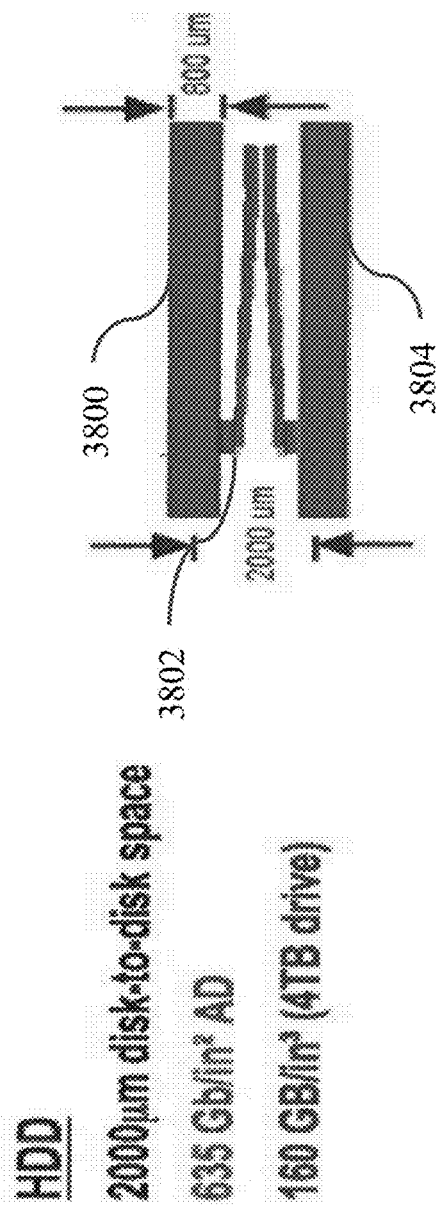

CALIBRATED DEVICE AND METHOD TO DETECT MATERIAL FEATURES ON A SPINNING SURFACE BY GENERATION AND DETECTION OF GRAVITO-MAGNETIC ENERGY

CO-PENDING PATENT APPLICATION

This Nonprovisional Patent Application is a Continuation-in-Part Application to U.S. Nonprovisional patent application Ser. No. 13/595,424 as filed on Aug. 27, 2012 by Inventor Michael Boyd and titled DEVICE AND METHOD TO PRODUCE GRAVITOMAGNETIC INDUCTION, MASS SPIN-VALVE OR GRAVITATIONAL RECTIFIER.

FIELD OF THE INVENTION

The present invention relates to a device and method to produce gravitomagnetic induction utilizing a head disk assembly and more precisely utilizing gravitomagnetic induction produced by the Nano-bump or the Nano-pit on the spinning disk that can be used to produce mechanical and electrical energy for work and power.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There have been a number of attempts to build gravitomagnetic induction devices, and a small number of reports of gravitomagnetic induction like effects have found a place in a scientific literature. But none of the examples that follow are accepted as reproducible examples of gravitomagnetic induction; nor is there any prior art on a device to produce gravitomagnetic induction utilizing a head disk assembly.

Gyroscopes produce a force when twisted that operates "out of plane" and can appear to lift themselves against gravity. Although this force is well understood to be illusory, even under Newtonian models, it has nevertheless generated numerous claims of gravitomagnetic induction devices and any number of patented devices. Perhaps the best known example is a series of patents issued to Henry William Wallace, an engineer at GE Aerospace in Valley Forge, Pa., and GE Re-Entry Systems in Philadelphia. He constructed devices that rapidly spun disks of brass, a material made up largely of elements with a total half-integer nuclear spin. (A "kinemassic field" generator from U.S. Pat. No. 3,626,605: "Method and apparatus for generating a secondary gravitational force field".) He claimed that by rapidly rotating a disk of such material, the nuclear spin became aligned, and as a result created a "gravitomagnetic" field in a fashion similar to the magnetic field created by the Barnett effect.

Hayasaka and Takeuchi had reported weight decreases along the axis of a right spinning gyroscope. Tests of their claims by Nitschke and Wilmath yielded null results. A few years later, recommendations were made to conduct further tests. Provatidis and Tsiriggakis have proposed a novel gyroscope equipped by couples of rotating mass particles that draw only the upper (or lower) 180 degrees of a circle, thus producing net impulse per full revolution. This is achieved by transforming the previously used circular orbit into a figure-eight-shaped path (symbol of infinity) of variable curvature that entirely lies on the surface of a hemisphere. Moreover, it was claimed that the spinning of the entire mechanism, in conjunction with the resonance of the centrifugal force through two servomotors, produces antigravity propulsion towards the axis of symmetry of the aforementioned hemisphere. (Antigravity Mechanism, U.S. Patent Application No. 61/110,307 (Filing date: 31 Oct. 2008)). In November 2011, Professor Provatidis published a detailed state-of-the-art report.

The Russian researcher Eugene Podkletnov claims to have discovered experimenting with superconductors in 1995, that a fast rotating superconductor reduces the gravitational effect. Many studies have attempted to reproduce Podkletnov's experiment, always to no results.

A paper by Martin Tajmar et al. in 2006 claims detection of an artificial gravitational field around a rotating superconductor, proportional to the angular acceleration of the superconductor.

In July 2007, Graham et al. of the Canterbury Ring Laser Group, New Zealand, reported results from an attempt to test the same effect with a larger rotating superconductor. They report no indication of any effect within the measurement accuracy of the experiment. Given the conditions of the experiment, the Canterbury group concludes that if any such 'Tajmar' effect exists, it is at least 22 times smaller than predicted by Tajmar in 2006. However, the last sentence of their paper states: "Our experimental results do not have the sensitivity to either confirm or refute these recent results (from 2007)".

The prior art may additionally be understood with reference to FIG. 2A through FIG. 5, as described herein, and below in the Detailed Description of the Invention. Referring to FIG. 2A, which displays prior art disk testing mechanisms a glide head 200 flies with a pitch angle with a trailing end 208 closer to the surface of the disk than a leading edge 206. Due to the pitch angle during flight and because glide head 200 includes trailing end taper 218, the lowest flying point 234 on glide head 200 is moved forward of the trailing end 208, and is at the junction of the air bearing surfaces 214, 216 with trailing end taper 218. FIG. 2B, shows a bottom plan view and a side view, respectively, of the glide head 200 having side rails with tapered trailing ends. As is shown in the Figure, glide head 200 includes first and second rails 202 and 204 that run from the leading end 206 to the trailing end 208 of glide head 200 with a recessed area 222 formed between the two rails 202 and 204. Rails 202 and 204 include a leading end taper 210 and a trailing end taper 218 with air bearing surfaces 214 and 216 disposed between. Also as shown glide head 200, including rail 204 and the angle of leading end taper 210 and trailing end taper 218. The recessed area 222 is indicated by a broken line. The glide head 200 is a 50% slider. The term "50%", as is well known in the art, refers to the size of the slider component of the glide head 200. It should be understood; however, that glide head 200 is not limited to a 50% slider, but may be any size desired.

FIG. 3A illustrates a magnetic head with combined elements of the read and write functions into a single, or a "merged head," using the IBM terminology, as well as a writing head. The small, concentrated magnetic field magnetizes, or "turns on", a region on the disk by induction. The gap at the bottom concentrates the field over the disk. When current is applied to generate the magnetic field, the "hard" disk medium is permanently magnetized with a polarity that matches the writing field. Reversing the current reverses the polarity on the disk bit to rewrite or erase the information stored in digital format. A timing clock is synchronized with disk rotation so that the location of the head with the magnetic "bit cells" is precisely known and controlled. Bits represent ones and zeros (reversed magnetic polarity), and bit magnetic domains are the means by which the polarity of bits may be written and/or reversed. Although the disk is permanently magnetized, bits are easily reversed, or rewritten, as the head applies an opposite magnetic field produced by simply reversing the coil current. MR and GMR require more precise synchronization since the magnetic domains are smaller. The task of the READ portion of the head is to read the disk data bits. Reading is where the state-of-the-art technology is being applied and where MR and the newest GMR principles are being applied. Both MR and GMR use a somewhat similar head structure. Very thin MR or GMR sensor strips are sandwiched between oppositely biased contact elements and this component is placed between two magnetic shields to reduce the influence of stray magnetic fields. MR and GMR head structures are shown in the Figure. A Soft Adjacent Layer (SAL) is magnetized by the nearby magnetic field. The SAL produces a magnetic field that biases the magnetization in the MR element so that the magnetic field angle of the MR element is shifted to 45°, the optimum angle for this type of sensor. Although reading and writing are independent functions, it is critical to place the write and read heads close together and near the recording medium. Writing heads are therefore fabricated directly onto the spin valve GMR reading heads. The top shield of the GMR sensor becomes the bottom magnetic pole of the writing head as shown in FIG. 3A to form an integrated or merged head design. The GMR head and the writing head share one magnetic layer. The efficient integrated Read-Write assembly is commonly referred to in the art as a merged head. The write head may be less than 30 microns above the rapidly spinning disk and the transaction is virtually instantaneous. In future, higher density recording media may require a near-zero gap.

FIG. 3B illustrates one embodiment for a printed circuit board for use in the head-disk assembly. A printed circuit board 400 includes multiple layers including a power plane, ground planes, and signal paths. In general the printed circuit board includes, for operation of the hard disk drive, digital circuits 356, clock 340, analog circuits 360, and control/power and line conditioning 370. A head-disk assembly (HDA) connector 330 connects power and control conductors from the printed circuit for routing to the head-disk assembly. For this embodiment, the ground plane is divided between a digital circuit ground plane 310 and an analog circuit ground plane 320. A clock 340, used to generate data to read and write data in the hard disk drive, is mounted on the printed circuit board 300 and coupled to the digital circuit ground plane 310. Similarly, digital circuits 350 that control the operations of the hard disk drive are also mounted on the printed circuit board and grounded on the digital circuit ground plane 310. Analog circuit 360, which operates on analog signals read from the head-disk assembly, is mounted on the printed circuit ground plane 320. The power and control signals from the analog circuits 360 are input to control/power line conditioning circuits 370 conditioning the power and control signals to reduce noise coupling in the actuator. The conditioned signals are then passed to the HDA connector 330.

FIG. 4 illustrates a glide head or a downward facing merged head mounted on a suspension arm 420 and flying over the surface 424 of a rotating disk 422; disk 422 rotates in the direction of arrow 425. A linear actuator (not shown) controls the radial position of the head 402 with respect to the disk 422 by moving the suspension arm 420 as illustrated by arrow 421.

FIG. 5 illustrates a side view of a downward facing glide head, or a downward facing merged head. It should be understood that typically, the top surface 424A and the bottom surface 424B of disk 422 are utilized at the same time by a downward facing head 402A and an upward facing head 402B, respectively, as shown in the side view illustrated in FIG. 5. Head 402A and 402B are mounted on respective suspension arms 420A and 420B, which are controlled by linear actuator 428, such that the head 402A and head 402B remains within a range of 100 nm to 1 mm to the top surface 424A and the bottom surface 424B of the disk 422. During operation, disk 422 rotates to produce a linear velocity between disk 422 and head 402. The higher linear velocity drives air between the surface 424 of the disk 422 and the head 402, which produces lift on an air bearing surfaces 214 and 216 of head 402, as shown in reference to FIG. 2, and in the description below. Thus, head 402 is said to "fly" over surface 424 of disk 422. As disk 422 rotates, head 402 is moved laterally over a radius of disk 422 by linear actuator 428 (shown in FIG. 5). The lateral movement of the head 402 is slow relative to the rotation of the disk 422. During operation of the mechanical force mass spin-valve device the glide head 402 experiences a mechanical force from nano-pits NP.01-NP.N or Nano-bumps on the disk 422 surface. Likewise; during operation of the magnetic force mass spin-valve device the merged head 402 experiences a magnetic force produced from nano-pits NP.01-NP.N or nano-bumps NB.01-NB.N on the disk 422 surface.

Prior art methods and devices, as discussed above, do not provide means by which GMR heads may be employed to produce gravitomagnetic energy to aid in the search for defects on spinning disk surfaces comprising a plurality of materials, particularly non-ferromagnetic materials. Additionally, the prior art does not enable the capture, storage in a battery or target, and use of gravitomagnetic energy in powering and enabling a plethora of devices. There is therefore a long-felt need to provide a device which enables the use of the gravitomagnetic energy both in defect detection, and in the collection of gravitomagnetic energy.

BRIEF SUMMARY OF THE INVENTION

Towards these objects and other objects that will be made obvious in light of the present disclosure a mass spin-valve or gravitational rectifier is presented which allows for increased efficiencies in the field of detection of defects in spinning disks and objects, magnetic tapes and flexible tapes, and in collecting and use of gravitomagnetic energy. The mass spin-valve is a product/device comprised of a disk containing Nano-features, a piezoelectric glide head and/or a GMR read head in combination with a typical electronics found in a hard drive. Spin-valve is standard terminology in the hard drive industry for the type of device presented herein. According to the present invention, the device to produce gravitomagnetic induction comprises: a computer hard disk; a piezoelectric glide head and/or a GMR read head in combination with a typical hard drive's electronics, wherein a plurality of defects are fabricated on a MR disk using a Focused Ion Beam (FIB) and plurality of nanobumps of specified height were deposited on a disk, and plurality of nanopits of specified depth are etched on a disk, each a few mils or µm apart on a pre decided radius.

In another aspect of this invention the mass spin-valve or gravitational rectifier is, by definition, a new type of head disk assembly device, which can be utilized to produce gravitomagnetic induction. The gravitomagnetic induction may be created by utilizing Nano-features fabricated on the surface of a hard disk in combination with a hard drive head to produce (a.) an associated mechanical force utilizing a piezoelectric glide head and/or (b.) an associated magnetic force utilizing a GMR read head for general use in surface characterization work and for producing power by the presence or the absence of matter on a spinning disk. Additional specifics of the devices performance are that the disk was spinning at a constant linear velocity of 500 inches per second; the GMR resistor was at a constant DC bias of 16 mA; the MR element was around 101 μm long and 10 nm wide; the head was positioned vertically ~51 nm (2 μinches) over the surface of the spinning disk. This phenomenon was validated by the following experiment and a brief summary is given below.

Nano-features, Nano-bumps NB.01-NB.N, and Nano-pits NP.01-NP.N are terms known and utilized in the art of nanotechnology. Nanotechnology is understood to be the ability to manipulate matter at the atomic or molecular level to make something useful at the nano-dimensional scale i.e. on a scale of between 1 and 1000 nanometers. A head disk assembly is configured in a process involving fabricating a Nano-features product/device, including Nano-bumps NB.01-NB.N and Nano-pits NP.01-NP.N fabricated on the surface of a hard drive magnetic media disk. Fourteen defects DF.01-DF.N were fabricated on a 2400 Oe 31.5 mil 95 mm MR disk using a Focused Ion Beam (FIB). Seven bumps of ~1.25 μin (~32 nm) in height were deposited, and seven pits ~21 μin (–51 nm) deep were etched, on a disk 50 mils (~1.27 mm) apart on a radius, as shown in FIG. 1. The specified areal dimensions were 40×40, 20×20, 10×10, 6×6, 4×4, 2×2 and 1×1 μm$^2$ respectively.

Following fabrication, the disk was placed on the spindle of an MG250, a type of hard disk certifier, and magnetically erased using a wide track MIG inductive head. The disk was then scanned using a 50% slider with a piezoelectric crystal mounted on the side of one of the sliders (i.e., a Piezo Glide or Glide head) and the disk was measured for mechanical force signal from the piezoelectric Glide head. The MG250 Read channel was then used with a 50% Slider GMR head containing a magnetized MR element. The MR current was optimum at 16 mA, and the linear velocity was maintained at 500 inches per second (ips), unless otherwise noted. Both the Glide head and the MR head were moved to the approximate location of the defect under analysis, and then stepped on a radius until a signal was detected on a Lecroy LC920 Oscilloscope. The signal was then optimized for maximum signal level output. The maximum signal was then recorded and characterized for signal amplitude and timing characteristics. The maximum signal measured was recorded and characterized for both MR modulation and mass spin-valve signal amplitudes and timing characteristics. The disk was then removed and each individual defect was characterized utilizing a Park Scientific AFM for defect width along the direction of the circumference as reported in Table 1 in the Detailed Description of the Invention.

GMR is the conventional acronym for "giant magneto-resistive" in the terminology of the art of hard disk drive storage technology. The term is usually referred to in reference to GMR heads. GMR heads are termed "giant" not because of their size, but for the giant magneto-resistive effect, first discovered by the European researchers Peter Gruenberg and Albert Fert in the late 1980s. While working with large magnetic fields and thin layers of magnetic materials, Gruenberg and Fert noticed that very large resistance changes were present when these materials were subjected to magnetic fields. Disk drives that are based on GMR head technology use these properties to help control a sensor that responds to very small rotations on the disk, even down to below a single μm. Even the very small magnetic rotation yields a very large change in sensor resistance, which in turn provides a signal that can be picked up by the (electric circuits) sensitive amplifiers in the drive.

Passing over a fixed magnetic field, the electrons in the free layer of the GMR head turn to align with those on the fixed field, creating a lowered resistance in the head structure. When the head passes over a field of opposite polarity, the free layer electrons in the GMR head rotate so that they are not aligned with the electrons on the fixed field. This causes an increase in the structure's resistance. Because resistance changes in the GMR head are caused by changes to the spin characteristics of electrons in the free layer, GMR heads are also known as "spin valves", a term coined by IBM.

The observed MR modulation read back signal corresponds to the switch in magnetization polarity produced by the edges of the bumps and pits, wherein bumps and pits may be defined as protruding asperities, and depressed asperities, respectively. The product of the time change between the positive and negative magnetic transition modulation pulses times the linear velocity scales to within 200 nm of the defects' width along the circumference as measured with an atomic-force microscope (AFM). Several observations were made and recorded. (1) It was observed that the mass spin-valve "MS signal" is the central peak offset voltage whose offset voltage is dependent on the type of defect and the defect's size. (2) It was observed that the polarity of the MR magnetic modulation signal induced by a micro-fabricated defect is dependent on the polarity of DC erase the ferro-magnetic film of the MR media but the MR mass spin-valve signal (or "MS" signal) is independent of the polarity of DC erase. Glass substrates uncoated with magnetic recording materials (not shown) are textured with YAG laser bumps in the head landing zone to enable the reliability of the head disk assembly. These non-magnetic media coated disks were scanned with the GMR head used in this invention to (3) verify the independence of the gravitomagnetic induction field from the magnetic field direction dependent MR magnetic modulation signals to the polarity of the media's magnetization since no electromagnetic signals were observed were magnetic media was not present.

The pits on the spinning disk produce a positive upward force, as shown. This was verified using a type of force meter for hard disk defects called a piezoelectric (PZT) glide head. The bump defects produced a downward force which was also verified with a PZT Glide head.

The GMR head was used to specifically quantify the measured gravitational induction signals by measuring the defects with a magnetic force microscope (MFM) to calibrate the force in units of nanoNewtons on 10×10 μm$^2$ pit defect that was 200 nm deep.

Specifics of the devices performance are that (a.) the disk was spinning at a constant linear velocity of 500 inches per second; (b) the GMR resistor was at a constant DC bias of 16 mA; (c.) the MR element was around 101 μm long and 10 nm wide; and (d.) the head was positioned vertically ~51 nm (2 μinches) over the surface of the spinning disk.

A 2 Volt gravitational induction signal amplitude is equivalent to a 2 nNewton force as measured with an MFM.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, aspects, and advantages of the present invention will become better understood with regard to the following description, with reference to accompanying drawings and figures:

FIGS. 6A, 6B, 6C, 6D and 6E illustrate the mass spin-valve device, more particularly;

FIG. 6A shows a typical head disk assembly;

FIG. 6B shows a Nano-pit's associate atomic force micrograph (AFM);

FIG. 6C shows a typical written hard disk's magnetic force micrograph (MFM);

FIG. 6D shows a Nano-pits' mass-spin valve read back signal;

FIG. 6E shows a Nano-pit's mass-spin valve read back signal with data written on the disk which is also known as a disk drive certifier missing pulse test;

FIG. 7A, illustrates a Nano-bump's associate AFM;

FIG. 7B illustrates a typical PZT glide read back signal;

FIG. 7C illustrates the same Nano-bump's mass-spin valve read back signal;

FIG. 9 illustrates the typical magnetic induction and gravitational induction characteristic for the same Nano-bump's mass-spin valve read back signal;

FIG. 20 shows magnetic induction modulation signals superimposed on an gravitomagnetic induction signal, referred herein as the MR Glide signal, for purposes of metrological analysis;

FIG. 38A is side view of preferred tape for use in the testing and induction;

FIG. 38B is a view of the disk-to-disk space in the tape testing head.

DETAILED DESCRIPTION OF THE INVENTION

The surface of a typical magnetic media hard disk 2 contains a thin diamond-like coating of 1 nm or less over a deposition of 10 nm-20 nm thick layer of ferromagnetic perpendicular materials cobalt, platinum and Chromium (Cr) over a ~1 μm thick nickel phosphorus (NiP) layer deposited on an aluminum substrate that has been polished to a roughness of less than 1 Å.

A focused ion beam, also known as FIB, is a technique used particularly in the semiconductor and materials science fields for site-specific analysis, deposition, and ablation of materials. An FIB setup is a scientific instrument that resembles a scanning electron microscope (SEM). However, while the SEM uses a focused beam of electrons to image the sample in the chamber, an FIB setup instead uses a focused beam of ions. An FIB can also be incorporated in a system with both electron and ion beam columns, allowing the same feature to be investigated using either of the beams.

Some of the preferred embodiments of the device and process under the invention are described as follows with particular reference to the drawings.

Figure 1:
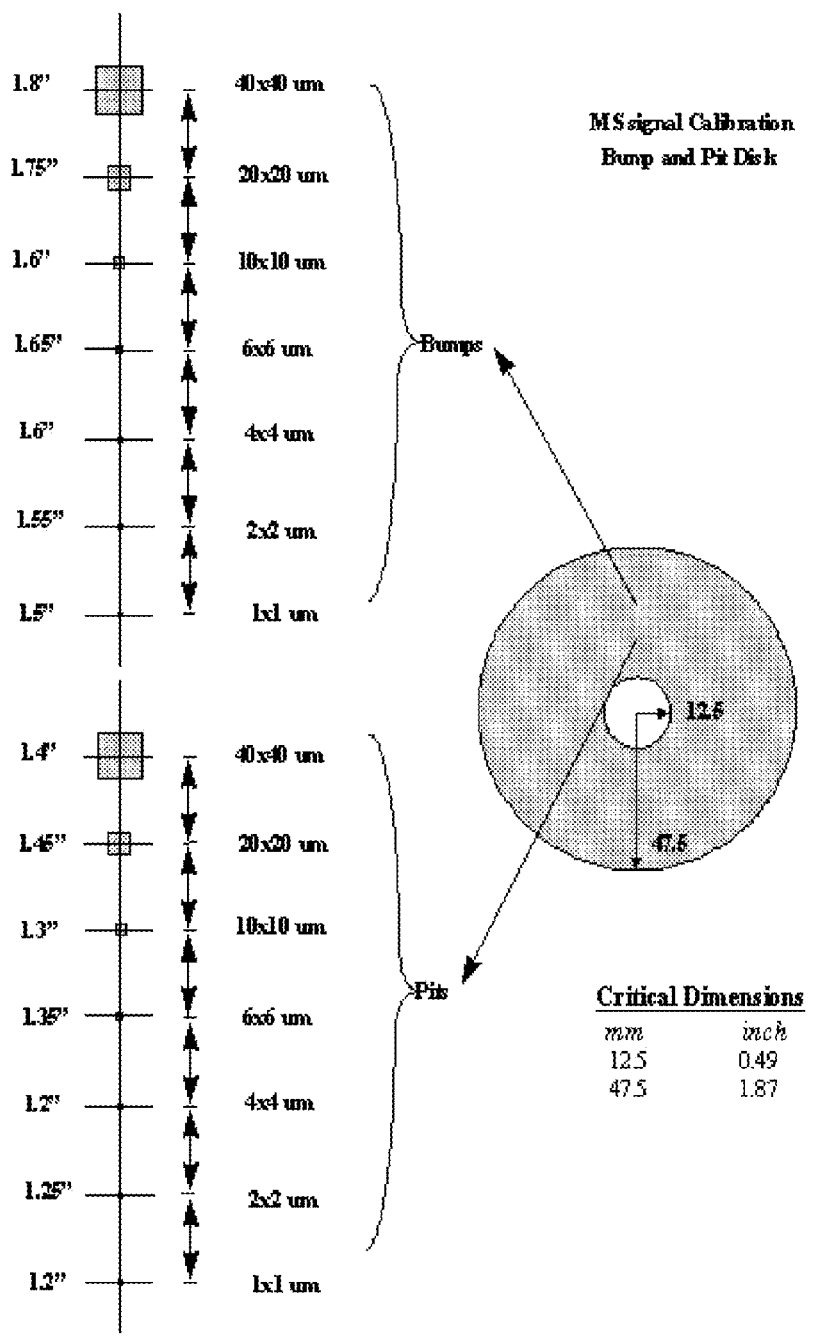
FIG. 1 illustrates the top view of the Nano-features fabricated on the surface of a hard drive disk using a focus ion beam.

FIG. 1 is a top view of a plurality of fourteen defects DF.01-DF.N fabricated on a 2400 one 31.5 mil 95 mm MR disk 2 using a Focused Ion Beam (FIB). Seven nano-bumps NB.01-NB.N of ~1.25 μin (~32 nm) height were deposited, and seven nano-pits NP.01-NP.N ~2 μin (~51 nm) deep were etched, on a disk 2 50 mils (~1.27 mm) apart on a radius, as shown. The specified areal dimensions were 40×40, 20×20, 10×10, 6×6, 4×4, 2×2 and 1×1 μm$^2$, respectively. Following fabrication, the disk 2 was placed on the spindle 4 of an MG250 and erased using a wide track MIG inductive head. The disk 2 was then scanned using a 50% slider 6 with a piezoelectric crystal mounted on the side of one of the sliders 6 (i.e., a Piezo Glide or Glide head 8) and the disk was measured for mechanical force signal from the piezoelectric Glide head 8. The MG250 Read channel was then used with a 50% Slider MR head 10 containing a magnetized MR element. The MR current was optimum at 16 mA, and the linear velocity was maintained at 500 inches per second (ips), unless otherwise noted.

Both the Glide head 8 and the MR head 10 were moved to the approximate location of a defect DF.01-DF.N under analysis, and then stepped on a radius until a signal was detected on a Lecroy LC920 Oscilloscope. The signal was then optimized for maximum signal level 12. The maximum signal 12 was then recorded and characterized for signal amplitude and timing characteristics. (R. D. Hemstead, *IBM J. Res. & Dev.*, Vol. 18, p 547, 1974). The maximum signal 12 measured was recorded and characterized for both MR modulation and mass spin-valve signal amplitudes and timing characteristics. The disk 2 was then removed and each individual defect DF.01-DF.N was characterized utilizing a Park Scientific AFM for defect width along the direction of the circumference as reported in Table 1.

TABLE 1

| Design Width ($1^{1111}$) | Defect Type | AFM Width (gm) | AFM Height or Depth (Inn/nm) | MR Modulation Pulse Delay (I · LSec) | MR Modulation Delay × Velocity (pm) | MR mass spin-valve Signal Maximum Ampl (Vp) Anti- GForce (nNewtons) | MR mass spin-valve Signal Minimum Ampl (Vp) GForce (-nNewtons) | Expected normal Gravity Force Bump Volume × 19.3 g/cm$^3$ density of W (-nNewtons) |
|---|---|---|---|---|---|---|---|---|
| 40 | Bump | 40.9 | 1.27/3 | 3.23 | 41.021 | NA | −2 | −0.00010630 |
| 20 | Bump | 20.2 | 1.22/3 | 1.6 | 20.3 | NA | −0.805 | −0.00002489 |
| 10 | Bump | 10.9 | 1.27/3 | 0.858 | 10.8966 | NA | −0.304 | −0.00000755 |
| 6 | Bump | 6.56 | 1.22/3 | 0.518 | 6.5786 | NA | −0.185 | −0.00000262 |
| 4 | Bump | 4.76 | 1.24/3 | 0.38 | 4.826 | NA | −0.14 | −0.00000140 |
| 2 | Bump | 2.8 | 1.04/2 | 0.218 | 2.7686 | NA | −0.065 | −0.00000041 |
| 1 | Bump | 2.4 | 1.05/2 | 0.19 | 2.413 | NA | −0.04 | −0.00000030 |
| 40 | Pit | 42.2 | 1.7/43 | 3.31 | 42.037 | 0.378 | NA | NA |
| 20 | Pit | 20.4 | 1.99/5 | 1.59 | 20.193 | 0.287 | NA | NA |
| 10 | Pit | 10.3 | 2.02/5 | 0.814 | 10.3378 | 0.245 | NA | NA |
| 6 | Pit | 6.28 | 1.92/4 | 0.498 | 6.3246 | 0.163 | NA | NA |
| 4 | Pit | 4.25 | 1.59/4 | 0.34 | 4.318 | 0.141 | NA | NA |
| 2 | Pit | 2.4 | 1.65/4 | 0.208 | 2.6416 | 0.102 | NA | NA |
| 1 | Pit | 1.28 | 1.86/4 | 0.104 | 1.3208 | 0.055 | NA | NA |

Scaling up the power density based on the read-back signal 13 for a 40.9×40.9 μm$^2$ nano-bump NB.01-NB.N, for example, on the spinning disk 2 produces a 2 Volts signal times 16 mA DC current on the MR resistor or 0.032 Watts of power/40.9×40.9 μm$^2$; which is equivalent to a novel power density of about 20 Megawatts/meter$^1$. In another words, a spinning disk 2 sized large enough when scaled-up to contain sufficient 40.9×40.9 μm$^2$ nano-bumps NB.01-NB.N to cover a surface area of one square meter would produce about 20 Megawatts/meter$^2$.

FIGS. 6A, 6B, 6C, 6D and 6E illustrate the mass spin-valve device 14. FIG. 6A is a typical head disk assembly 600. In FIG. 6B, an atomic force micrograph (AFM) 602 from a 10 μm×10 μm area nano-pit NP.01-NP.N is shown. In FIG. 6C a magnetic force micrograph (MFM) 604 of a written track from a typical hard disk 2 is shown. An MR read back signal 13.MR from a magnetically erased disk and a certification missing pulse test reading 13.CMP for the same 10 μm×10 μm area nano-pit NP.01-NP.N are shown in 6D and 6E respectively.

FIG. 7A illustrates a nano-bump's NB-01-NBN associated AFM 700. FIG. 7B a typical PZT glide 8 read back signal 13.PZT. FIG. 7C shows the same Nano-bump's mass-spin valve read back signal. It is shown that the MS signal of nano-bump NB.01-NB.N defects DF.01-DF.N exhibited a negative polarity pulse as shown in FIG. 7B. FIG. 7C shows that for a 1.25 μin (~32 nm) 10 μm×10 μm nano-bump NB-01-NB.N measured with the AFM produces a characteristic PZT Glide signal 13.PZT, measured at 890 ips, of the downward force of the nano-bump NB.01-NB.N on the downward facing head slider 6 and a characteristic mass spin-valve signal 13.MR of a nano-bump NB.01-NB.N (labeled as non-contact MS-valve signal).

Figures 8A, 8B, 8C:
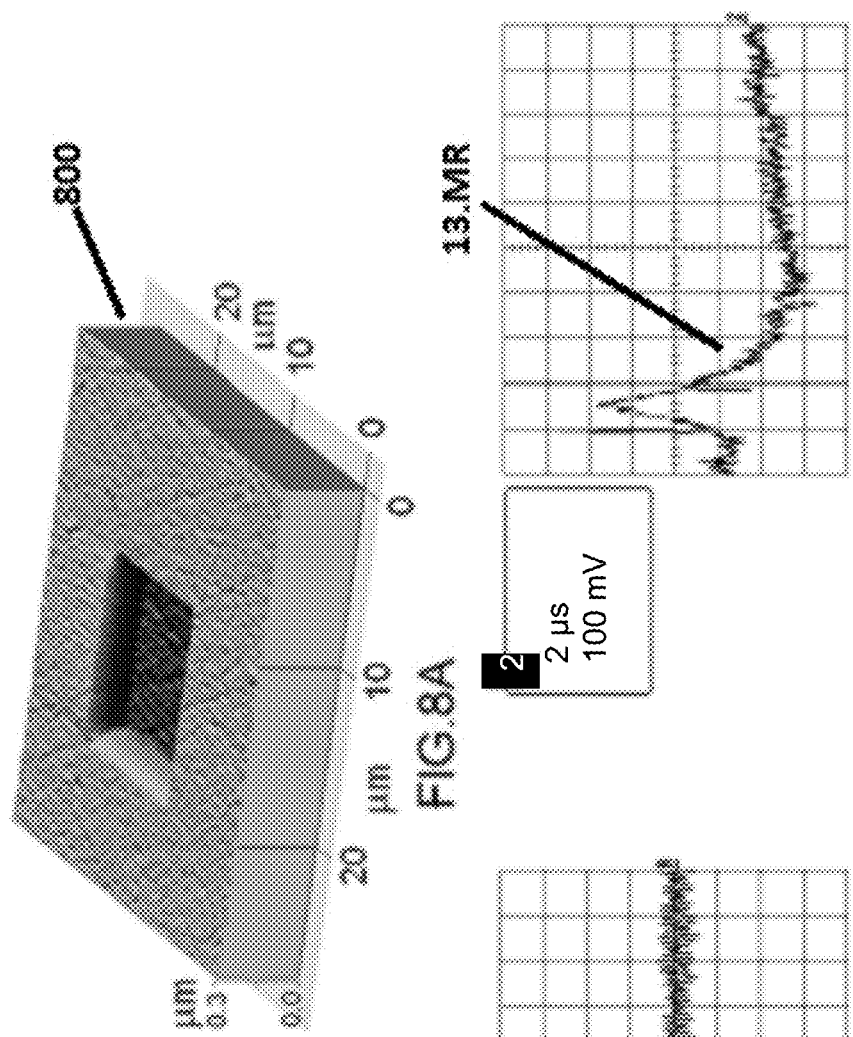
FIG. 8A illustrates a Nano-pit's associate AFM.
FIG. 8B illustrates a typical PZT glide read back signal.
FIG. 8C illustrates the same Nano-pit's mass-spin valve read back signal.

FIG. 8A, FIG. 8B and FIG. 8C illustrate a nano-pit's NP.01-NP.N associated AFM 800; a typical PZT glide read back signal 13.PZT; and the same Nano-pit's NP.01-NP.N mass-spin valve read back signal 13.MR respectively. FIG. 8B illustrates that for ~2 μin 10 μm×10 μm nano-pit NP.01-NP.N measured with an AFM produce a PZT Glide signal 13.PZT, measured at 890 ips, and the characteristic mass spin-valve signal 13.MR of a nano-pit NP.01-NP.N. The mass spin valve signal 13.MR of nano-pit NP.01-NP.N defect DF.01-DF.N exhibited a positive polarity pulse as shown in FIG. 8C.

FIG. 9 illustrates the typical magnetic induction and gravitational induction characteristic for the same nano-bump's NB.01-NB.N mass-spin valve read back signal 13.MR. FIG. 9 illustrates that a 10 μm×10 μm nano-bump NB.01-NB.N exhibits two electromagnetic signals 13 due to electromagnetic induction 13.GI created by the edges of the nano-bump NB.01-NB.N defect DF.01-DF.N following Maxwell's right hand rule and also exhibits the gravitational induction signal of 0.304 Volts, or 0.304 nNewtons of negative magnetic force. Maxwell's right-hand rule (RHR) demonstrates that, if the conductor is held with the right hand such that the thumb points in the direction of the current flow I, the fingers circling the conductor point in the direction of the magnetic flux lines.

Figure 10:
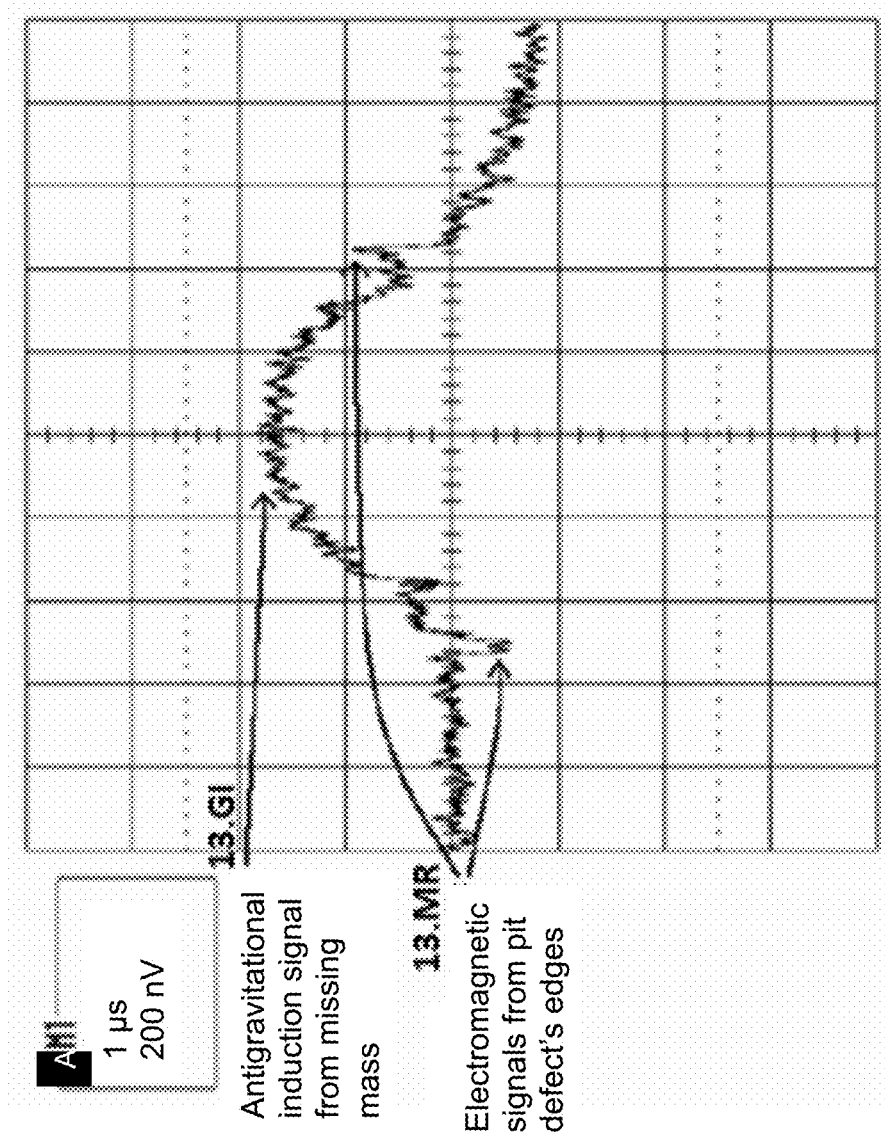
FIG. 10 illustrates the typical magnetic induction and gravitational induction characteristic for the same Nano-pit's mass-spin valve read back signal.

FIG. 10 illustrates the typical magnetic induction and gravitational induction characteristic for the same nano-pit's NP.01-NP.N mass-spin valve read back signal 13.MR. FIG. 10 illustrates that a that 40 μm×40 μm nano-pit NP.01-NP.N exhibits two electromagnetic signals 13 due to electromagnetic induction created by the edges of the nano-pit NP.01-NP.N defect DF.01-DF.N and also exhibits the gravitational induction signal 13.GI of 0.378 Volts with an equivalent (upward) force of $0.378 \times 10^{-9}$ Newtons produced by $7.69 \times 10^{-17}$ m$^3$ of missing mass. This novel upward anti-gravitational force (see Table 1) is not predicted by any known theory.

Figure 11:
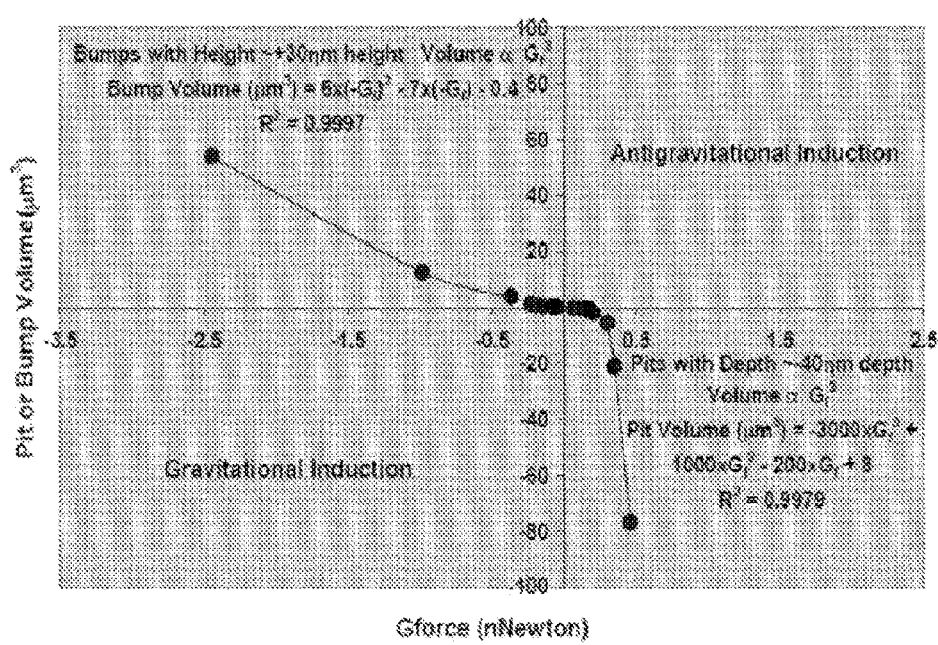
FIG. 11 illustrates the quantum gravitational characteristics of pit or bump volume versus gravitational force rectification in the mass spin-valve device.

FIG. 11 illustrates the quantum gravitational characteristics of nano-pit NP.01-NP.N or nano-bump NB.01-NB.N volume versus gravitational force rectification in the mass spin-valve device 10.

In a metallic conductor, current is carried by the flow of electrons. In semiconductors, current is often schematized as being carried either by the flow of electrons or by the flow of positively charged "holes" in the electron structure of the material. There exists an equivalent quantum nature to gravity associated with the presence and absence of matter on the spinning disk 2 to the quantum nature in electromagnetism in the semiconductor junction, or in a rectifier, as a type electromagnetic spin valve device 10 which is based on the spin of conduction energy band electrons in the semiconductor crystal. FIG. 11 illustrates the gravitational induction equivalent of the semiconductor; as a gravitational rectifier in the mass spin valve device 10; whereby the downward gravitational induction force (N type donor gravitons) is produced by additional mass; equivalent to the electrons in the semiconductor rectifier; and the upward gravitational induction force (P type acceptor anti-gravitons) is produced by the absence of mass, equivalent to "holes" in the semiconductor rectifier.

Figure 12A:
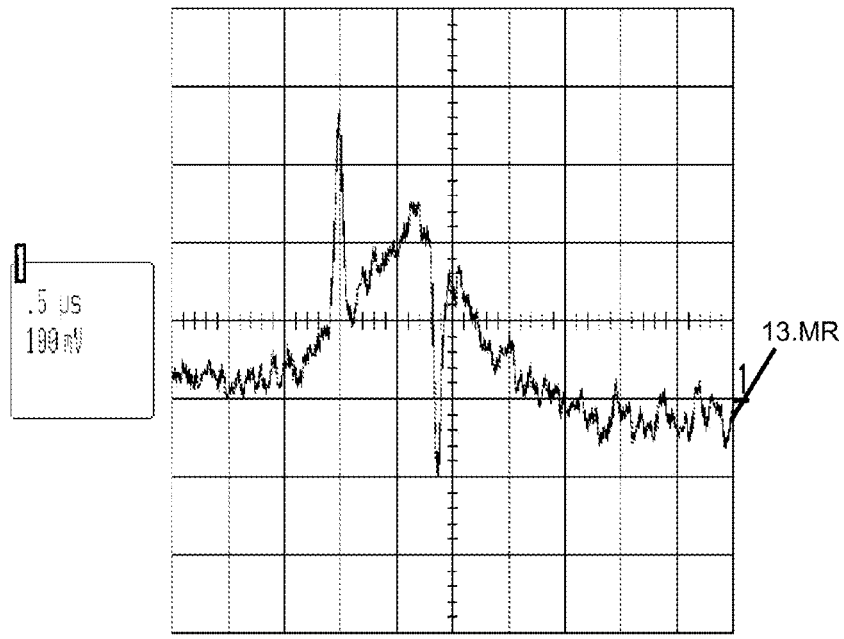
FIGS. 12A and 12B illustrate the magnetic induction is independent from the gravitational induction in the mass spin-valve device.
Figure 12B:
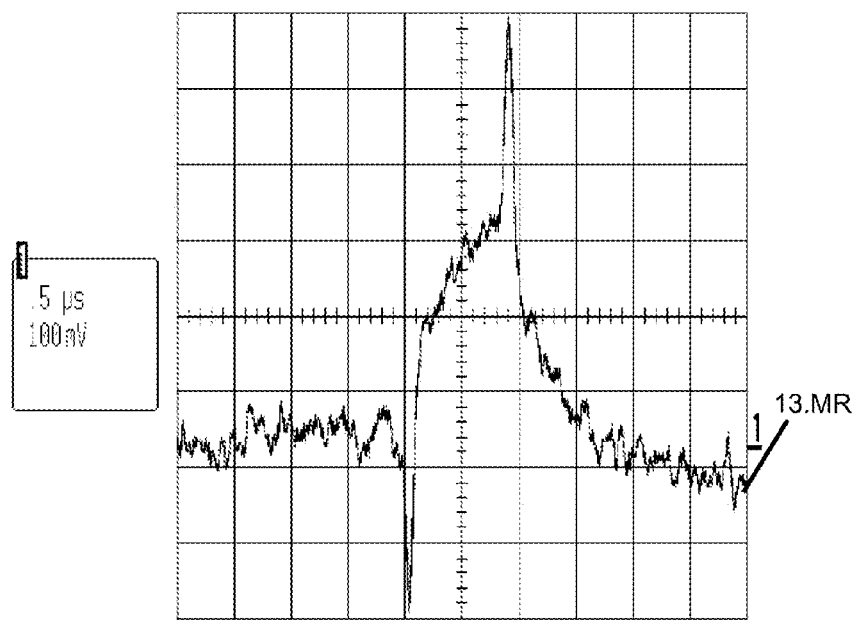

The relationship of mass to normal gravity is described by the relationship (additional mass) Bump Volume (μm$^3$)=6(-Gf)$^2$-7(-Gf)-0.4 (where Gf is the [-] attractive force of Gravity) which is a parabolic force field which has two mathematically real factors. (See FIG. 11) Assuming the Gravitational induction force ($-G_f$) is variable x and the volume of additional mass is y. Solving for y=0, by simplifying the equation by multiplying both sides with 5, gives two real factors x1 and x2: x1=1.221255 x2=-0.054589. Repulsive [+] anti-gravity exists in hyperbolic force field with one real part and two imaginary factors relative to the MR sensor described by the relationship of missing mass to the Pit Volume (um$^3$)=$-3000G_f^3+1000G_f^2-200G_f+8$. (See FIG. 11) Assuming the anti-gravitational induction force (Gf) is variable x and the volume of missing mass is y, then y=$-3000x^3+1000x^2-200x+8$=8($-375x^3+125x^2-25x+1$) and ($375x^3+125x^2-25x+1$) the factors are two imaginary one real. Solving for y=0 gives: $x_1$=0.0510251 x2=0.141154+0.179826*i x3=0.141154-0.179826*i FIGS. 12A and 12B illustrate the magnetic induction is independent from the gravitational induction in the mass spin-valve device 10. To examine the dependence of the measured MR mass spin-valve signal 13.MR on DC erase polarity, the two wires connected to the write transducer were disconnected, and re-attached to the head's paddle board for the opposite polarity to be applied to the write element during erasure. FIG. 12A illustrates the results at one erase polarity. FIG. 12B illustrates the results at the opposite erase polarity, the two MR modulation read back signals 13.MR corresponding to the switch in the electromagnetic field's direction produced by the edges of the falling and rising edges of the pit induced by a microfabricated defect is dependent on the polarity of DC erase on the MR media; but the MR mass spin-valve signal (i.e., the gravitomagnetic force field's direction) 13.MR is independent of the polarity of DC erase.

Figure 13:
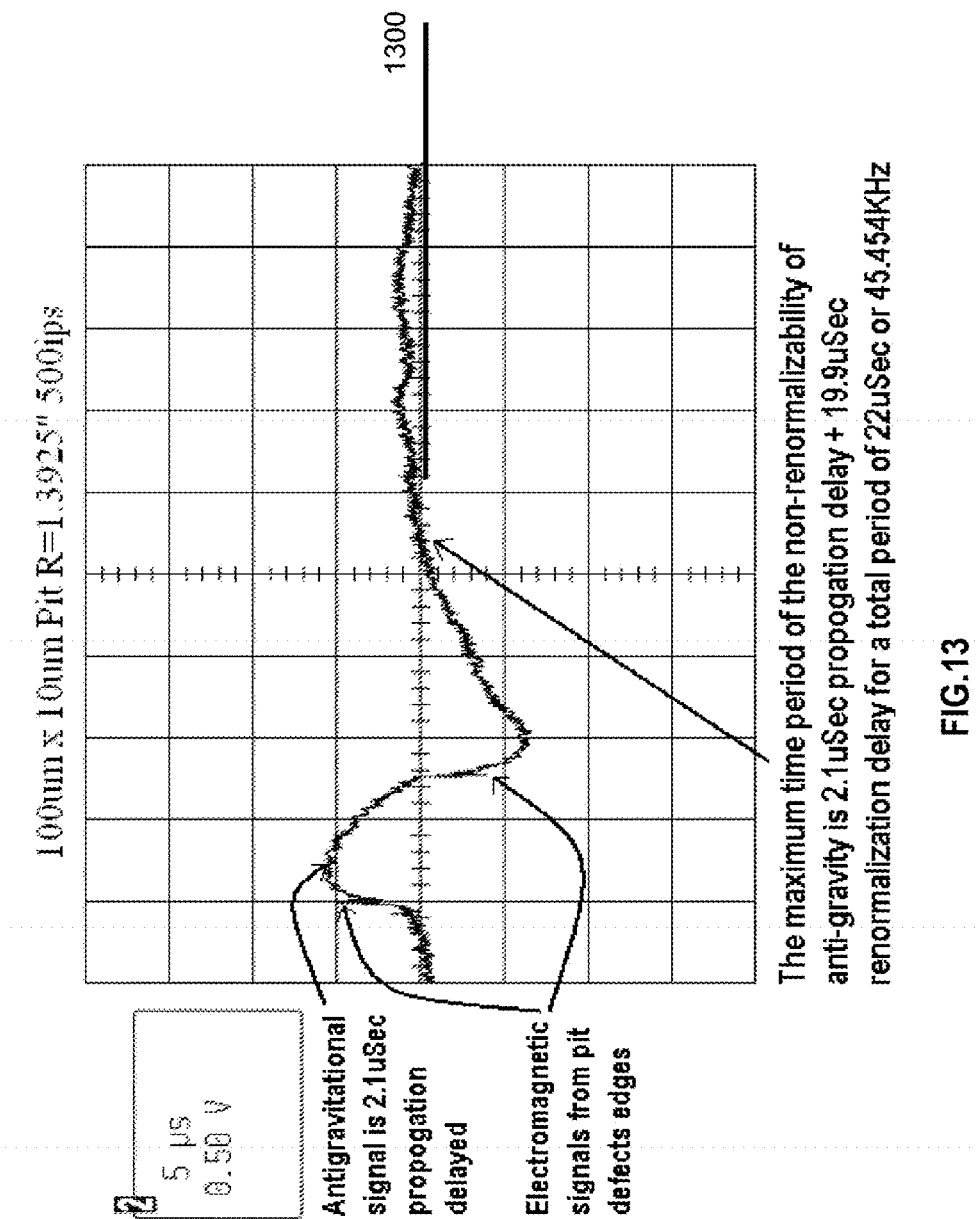
FIG. 13 illustrates the time band gap between gravity and electromagnetism in the mass spin-valve device.

FIG. 13 illustrates the time band gap 1300 between gravity and electromagnetism in the mass spin-valve device. FIG. 13 illustrates that the time band gap 1300 between gravity and electromagnetism is about 22 μSec. FIG. 9 illustrates that within the gravitational rectifier device that time has a "band-gap" 1300, much like the semiconductor, where that time band-gap 1300 depends on the nano-defect's DF.01-DF.N "gravitomagnetic energy" or "mass-energy" plus "electromagnetic energy" relative to the merged head 402.

Figure 14A:
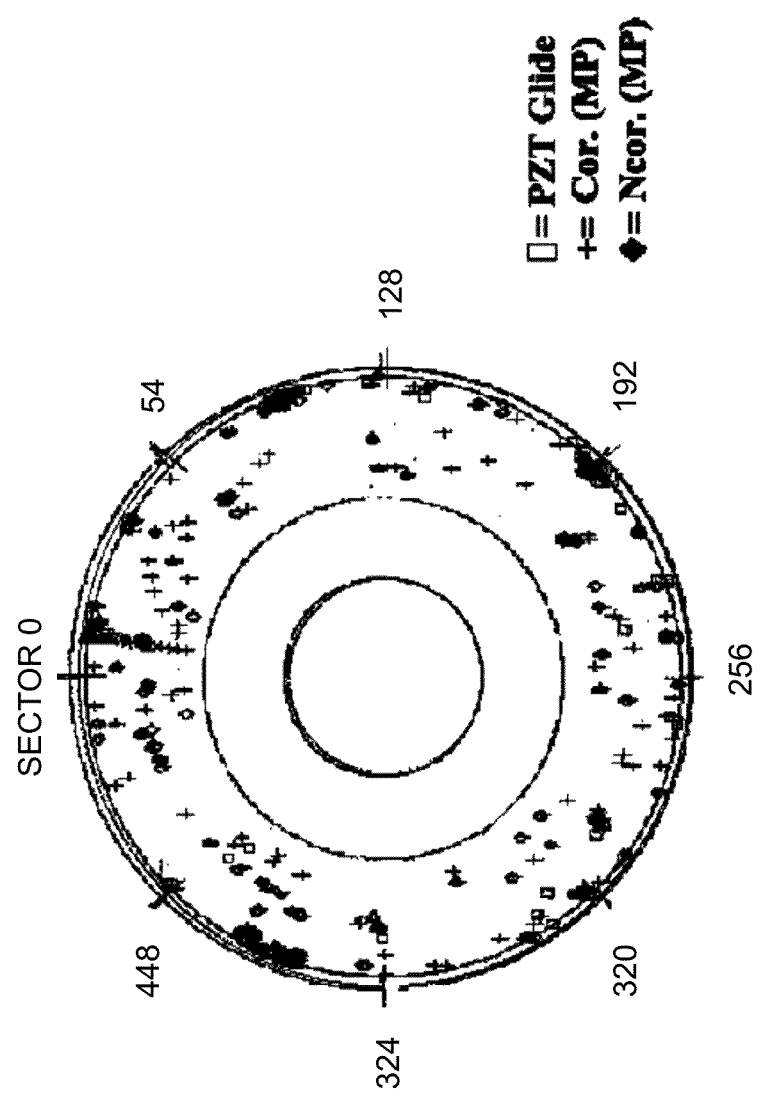
FIGS. 14A and 14B illustrate current piezoelectric glide defect detection utilized on industrial hard disk certifiers and certifier missing pulse defect detection and correction algorithms and the detection of the mass spin-valve signal, labeled as MS signal, in comparison to the certifier missing pulse defect detection and correction algorithms; on a Nano-features disk prototype.
Figure 14B:
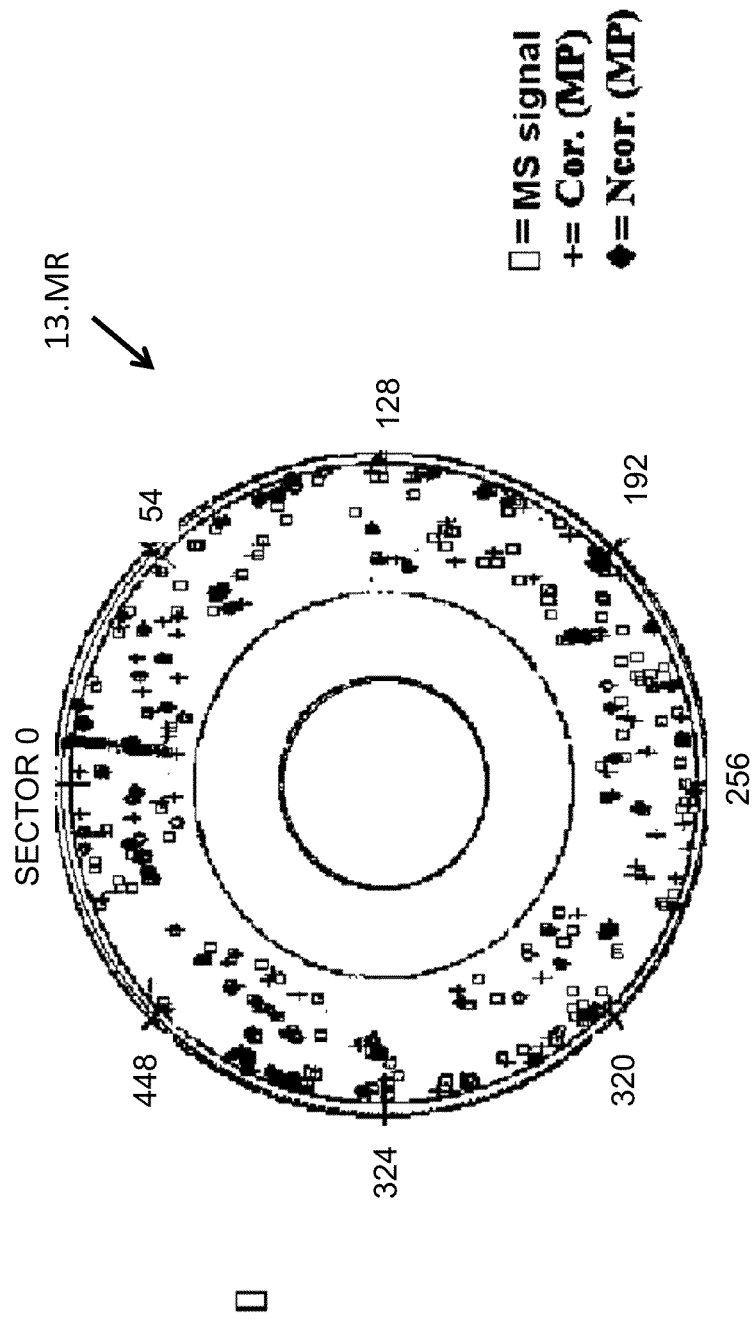

FIGS. 14A and 14B illustrate current piezoelectric glide 8 defect DF.01-DF.N detection utilized on industrial hard disk 2 certifiers and certifier missing pulse defect detection and correction algorithms; and the detection of the mass spin-valve signal 13.MR, labeled as MS signal, in comparison to the certifier missing pulse defect detection and correction algorithms; on a nano-defects DF.01-DF.N disk 2 prototype. FIG. 14A illustrates that the current piezoelectric glide 8 defect DF.01-DF.N detection utilized on industrial hard disk 2 certifiers is unable to detect nano-pit NP.01-NP.N type defects while certifier missing pulse defect detection and correction algorithms are able to detect both type defects (i.e., nano-pits NP.01-NP.N and nano-bumps NB.01-NB.N) fabricated on a 2400 Oe 31.5 mil 95 mm MR disk 2 using a FIB. FIG. 14B illustrates a high degree of correlation between in the detection of the mass spin-valve signal 13.MR, labeled as MS signal, and the certifier missing pulse defect detection and correction algorithms utilized by in industrial hard disk 2 certifiers.

Figure 15A:
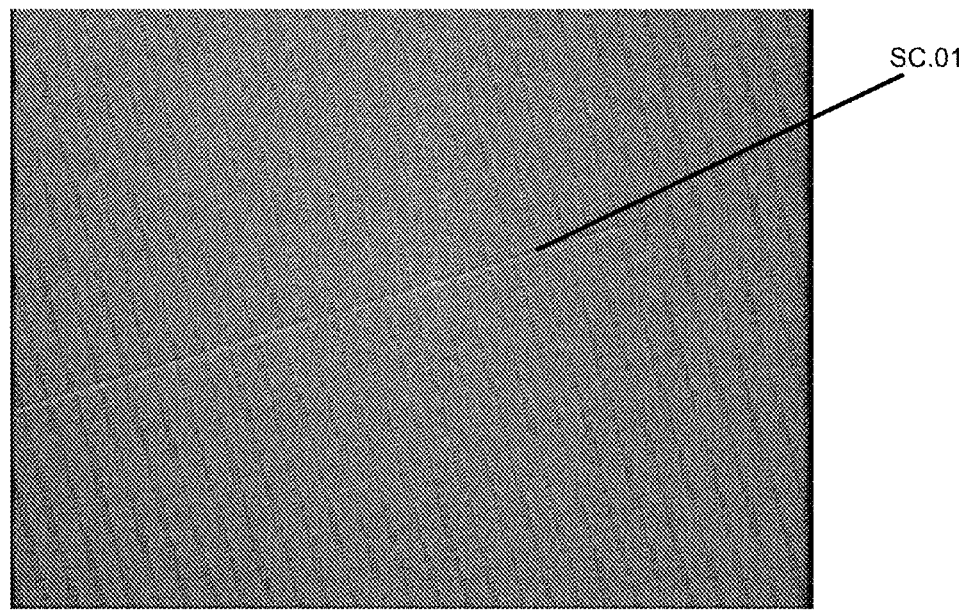
FIG. 15A shows a photograph of a scratch type defect on the prototype hard disk's surface.
Figure 15B:
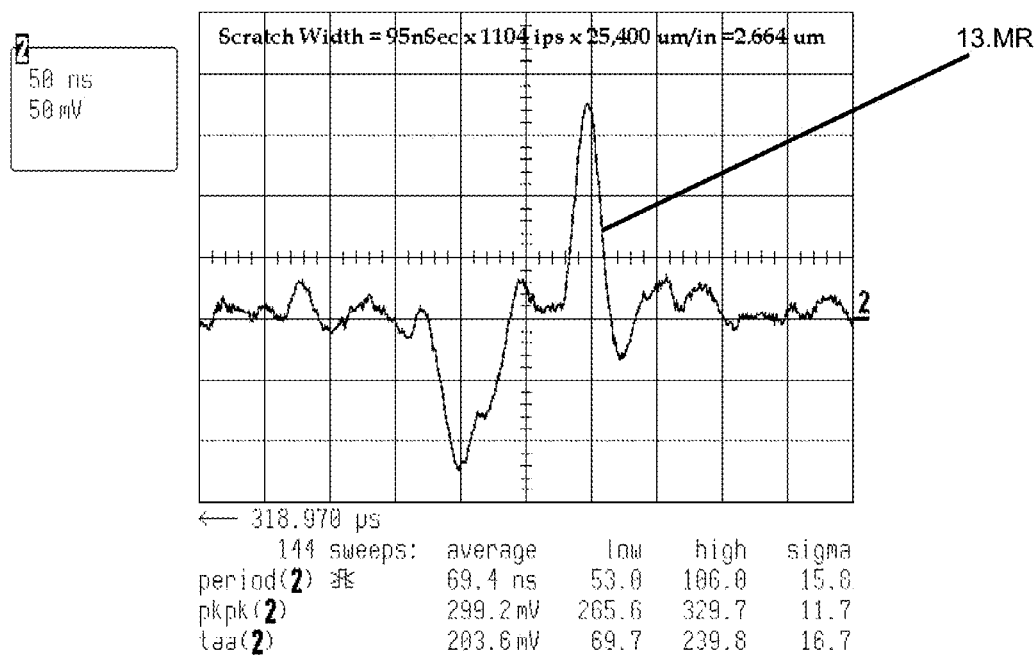
FIG. 15B illustrates the typical mass-spin valve read back signal.

FIG. 15A shows a photograph of a scratch type SC.01 defect DF.01-DF.N on the prototype hard disk's 2 surface 1500. 15B illustrates the typical mass-spin valve read back signal 13.MR. FIGS. 15A and 15B illustrate the application of the product/device for a scratch SC.01-SC.N type defect DF.01-DF.N on the disk's 2 surface 1500. The mass spin-valve signal 13.MR is labeled as non-contact MS-valve signal. The mass spin-valve signal 13.MR exhibits magnetic transition pulses from the scratch SC.01 defect's DF.01-DF.N edges only.

Figure 16A:
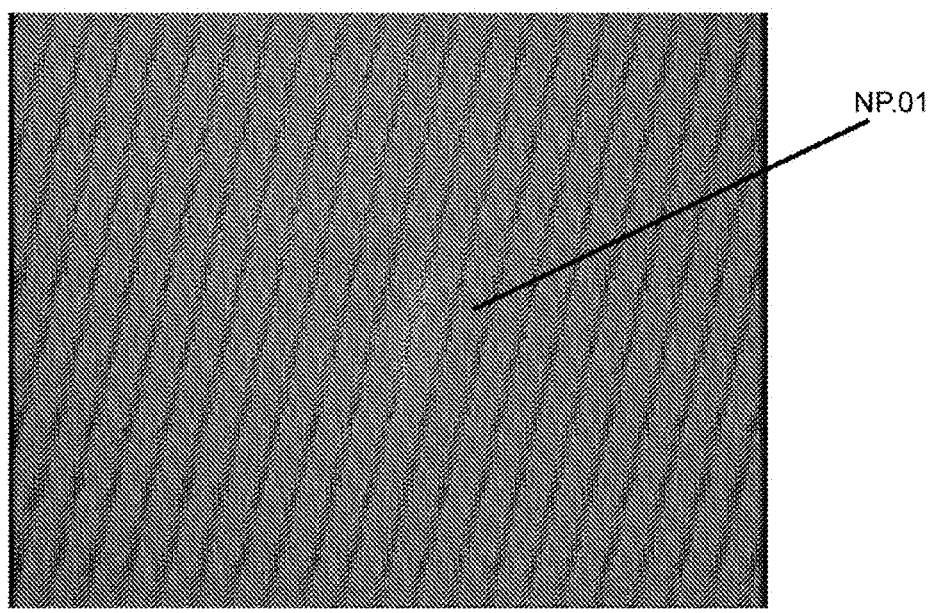
FIG. 16A shows a photograph of a shallow pit type defect on the prototype hard disk's surface.
Figure 16B:
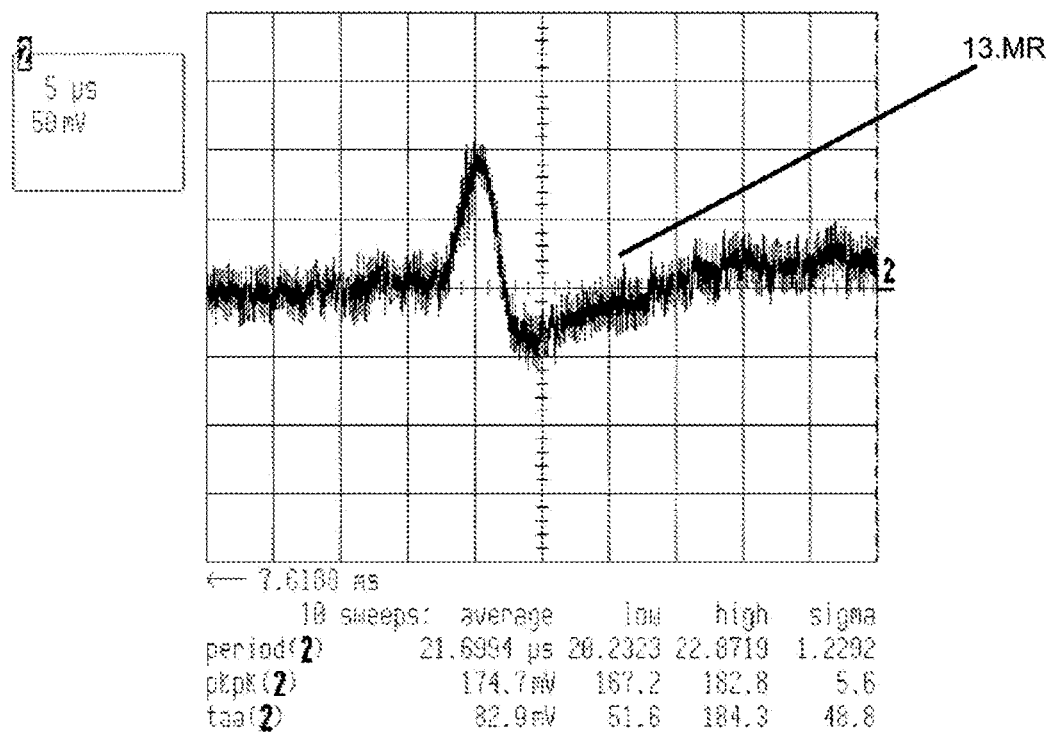
FIG. 16B illustrates the typical mass-spin valve read back signal.

FIG. 16A shows a photograph of a shallow nano-pit NP.01-NP.N type defect DF.01-DF.N on the prototype hard disk 2 surface 1500. FIG. 16B illustrates the typical mass-spin valve read back signal 13.MR. FIGS. 16A and 16B illustrate the results from a shallow nano-pit NP.01-NP.N type defect DF.01-DF.N on the disk 2 surface 1500. The read back signal 13 exhibits mass spin-valve signal with no MR magnetic modulation signal 13.MR present from edges of the defects DF.01-DF.N, but the characteristic polarity mass spin-valve signal 13 of a nano-pit NP.01-NP.N.

Figure 17A:
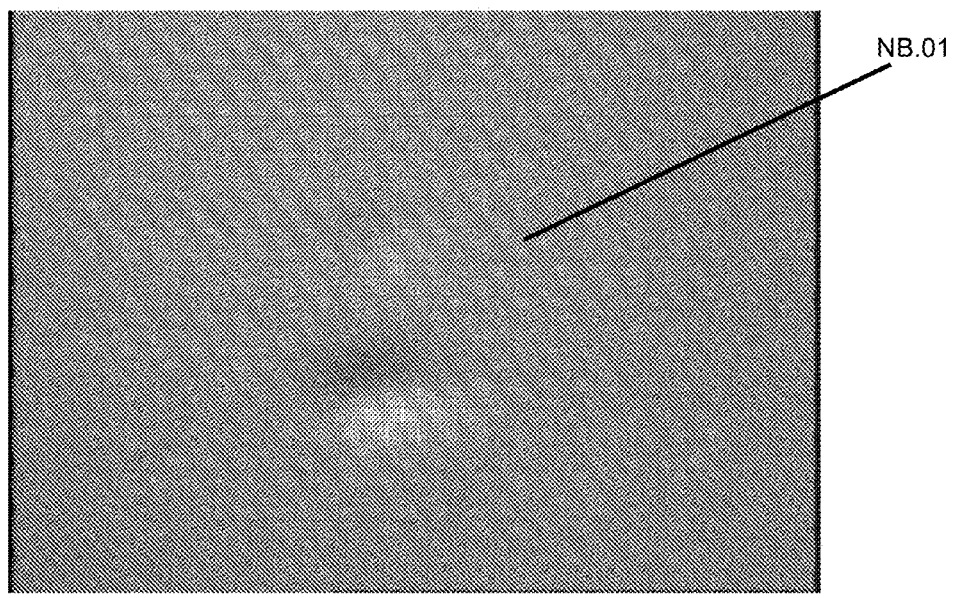
FIG. 17A shows a photograph of a short bump type defect on the prototype hard disk's surface.
Figure 17B:
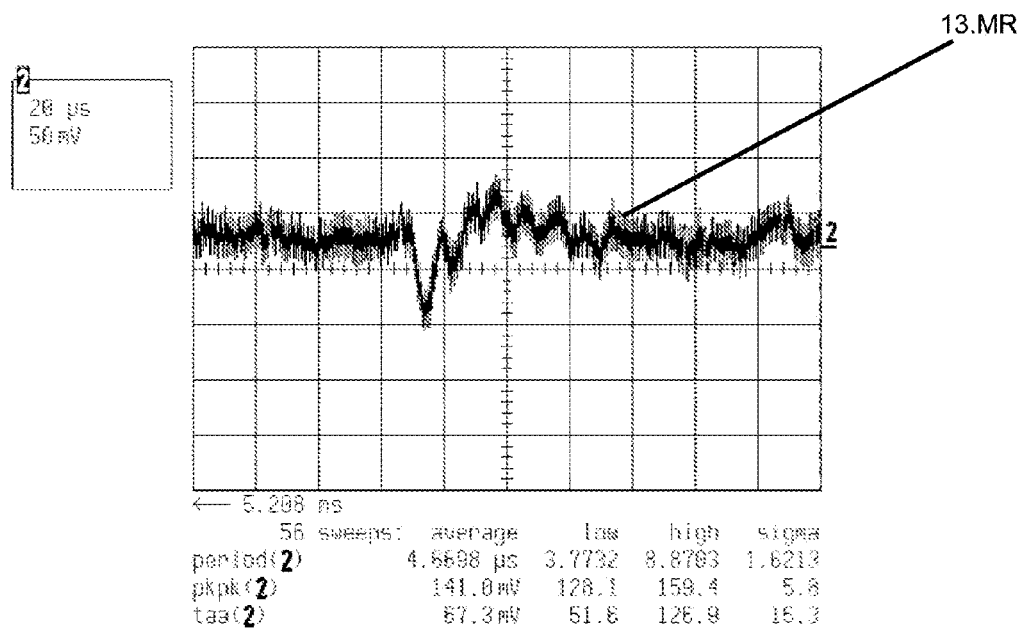
FIG. 17B illustrates the typical mass-spin valve read back signal.

FIG. 17A shows a photograph of a short nano-bump NB.01-NB.N type defect DF.01-DF.N on the prototype hard disk's 2 surface 1500. FIG. 17B illustrates the typical mass-spin valve read back signal 13.MR. FIGS. 17A and 17B illustrate the results from a short nano-bump NB.01-NB.N type defect DF.01-DF.N on the disk's 2 surface 1500. The read back signal 13 exhibits mass-spin valve with no MR magnetic modulation signal present from the defect's DF.01-DF.N edges, but the characteristic mass spin-valve 8 signal of a bump.

Figure 18A:
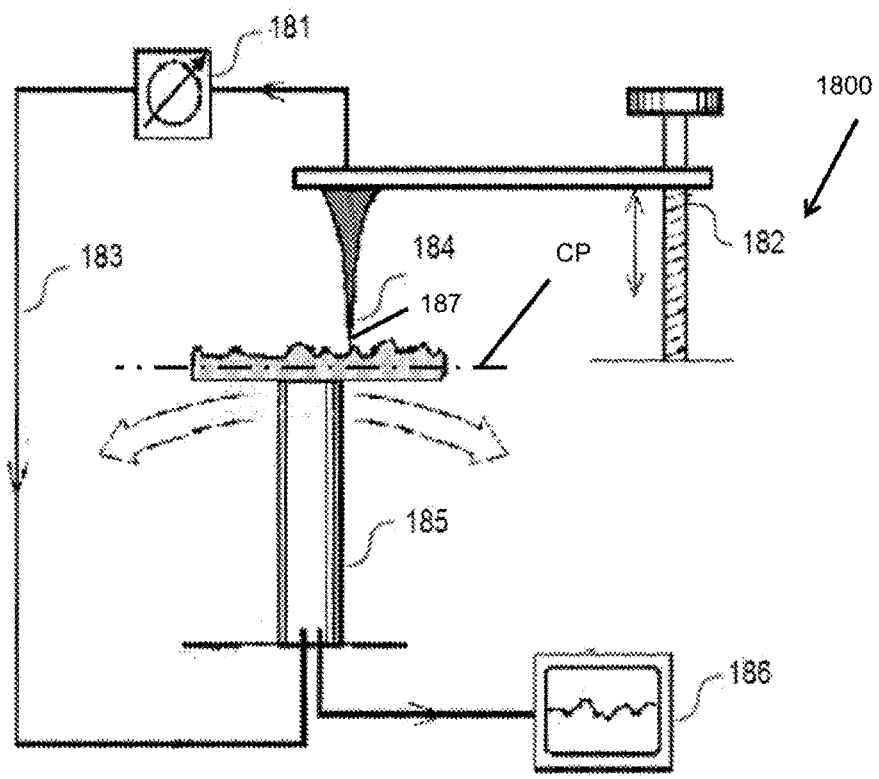
FIG. 18A illustrates a diagram of an atomic force microscope assembly showing the means of sensing the vertical position of the tip, a coarse positioning system to bring the tip in to the general vicinity of the sample, a feedback system to control the vertical position of the tip, a probe tip, a Piezo-electric scanner which moves sample under the tip (or the tip over the tip over the sample) in a raster pattern, and a computer system that drives the scanner, measures data and converts the data into an image.

FIG. 18A illustrates a diagram of an atomic force microscope assembly 1800. Atomic force microscopes (AFMs) are a family of instruments used for studying surface properties of materials from the atomic to the micron level. FIG. 18A illustrates the atomic force microscope (AFM) probing the surface of a sample with a sharp tip 185, approximately 2 microns long and often less than 100 Å in diameter 187. The tip 185 is located at the free end of a cantilever 184 that is preferably 100 to 200 µm long. Forces between the tip 185 and the sample surface cause the cantilever 184 to bend, or deflect. One or more detectors 181 and 183 measures the cantilever 184 deflection as the tip 185 is scanned over the sample 182, or the sample is scanned under the tip 185. The measured cantilever 184 deflections allow a computing device 186 to generate a map of surface topography. AFMs can be used to study insulators and semiconductors as well as electrical conductors. Several forces typically contribute to the deflection of an AFM cantilever 184. The force most commonly associated with atomic force microscopy is an inter-atomic force called the van der Waals force. Additionally shown is a center plane CP of the disk 2 toward which asperities DF.01-DF.N approach or from which asperities DF.01-DF.N extend.

Figure 18B:
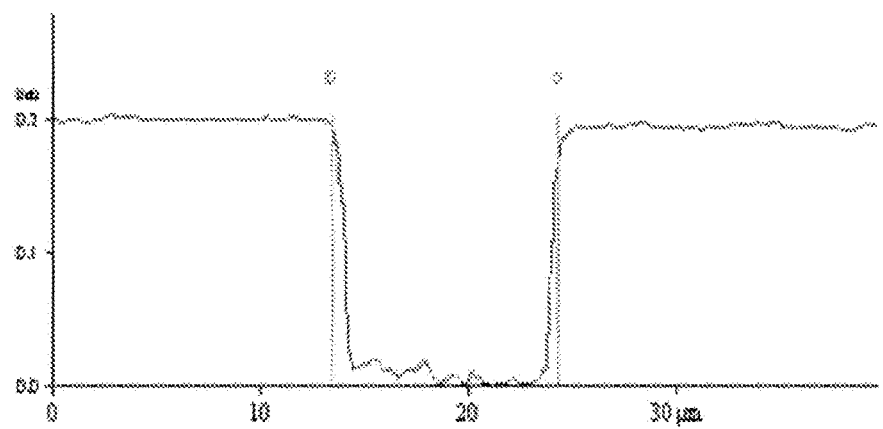
FIG. 18B is the AFM profile of the calibration pit used to determine the exact dimensions of the calibration pit.
Figure 19A:
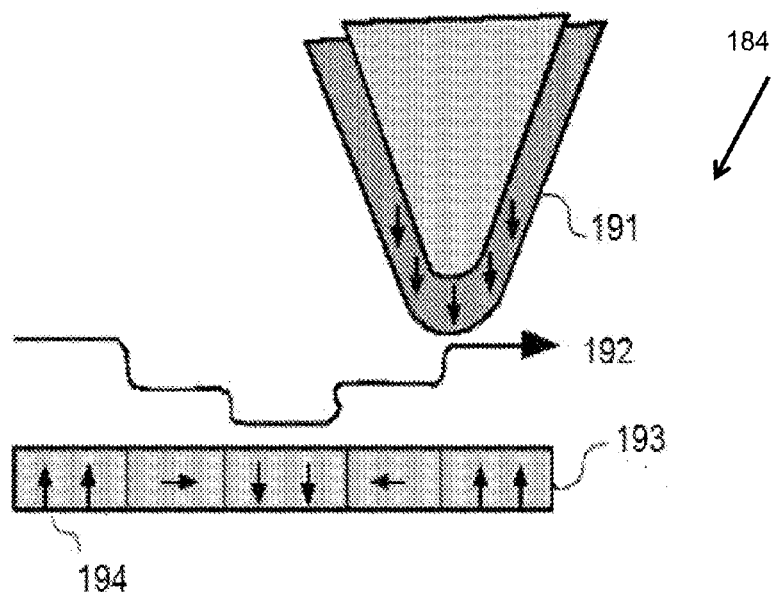
FIG. 19A illustrates a diagram of a magnetic force microscope cantilever showing a magnetically coated tip, a path of cantilever, a flat magnetic sample, and magnetic domains.
Figure 19B:
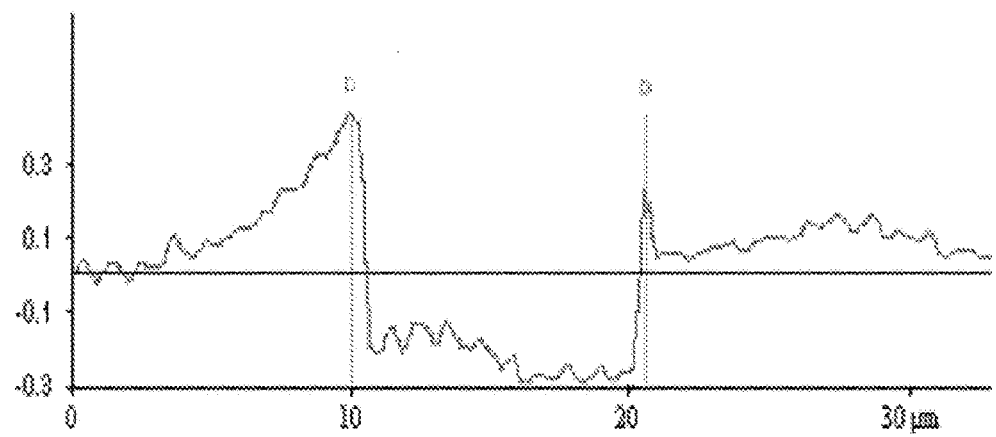
FIG. 19B illustrates the MFM profile of the calibration pit used to determine the exact gravitomagnetic force magnitude of the calibration pit.

FIG. 18B is the AFM profile of the calibration pit used to the exact dimensions of the calibration nano-pit NP.01-NP.N in this product and/or device FIG. 18B illustrates the 2-D cross section of a 10 µm×10 µm 200 nm deep Nano-pit measured with an AFM FIG. 19A illustrates a diagram of a magnetic force microscope ("MFM") cantilever 184, and FIG. 19B shows the MFM profile of the calibration pit used to determine the exact gravitomagnetic force magnitude of the calibration Nano-pit NP.01-NP.N in this product and/or device. Magnetic force microscopy (MFM) provides a 3-D profile of the spatial variation of magnetic forces on a sample surface. For an MFM, the tip 187 is coated with a ferromagnetic thin film 191. The system operates in non-contact mode, detecting changes in the resonant frequency of the cantilever 184 induced by the magnetic field's dependence on tip-to-sample separation 192, as illustrated in FIG. 19A. MFM can be used to image naturally occurring 193 and deliberately written domain structures 194 in magnetic materials. FIG. 19B illustrates the Magnetic Force Microscope (MFM) 2-D cross section used for a control measurement using a ~200 nm deep ~10 µm×10 µm Nano-pit NP.01-NP.N in this product and/or device as shown.

FIG. 20 shows magnetic induction modulation signals 13.IMS superimposed on a gravitomagnetic induction signal 13.GMI, referred herein as the MR Glide signal, for purposes of metrological analysis. There are two distinct forms of induction. First, electromagnetic ("EM") induction is distinguished from gravitomagnetic induction by the examination of the characteristic bipolar EM signals produced on the GMR sensor 10, herein also referred to as "MR modulation signal" 13.MRS. The MR modulation signals 13.MRS corresponds to the switch in polarity of the media (i.e. the disk) as the GMR sensor element crosses the edge of either a nano-pit NP.01-NP.N or a nano-bump NB.01-NB.N. This is same effect as is observed from a magnetic modulation signal 13 written on the disk for data Read/Write purposes. This modulation scales with the width of the defects DF.01-DF.N along their circumference by the relationship:

$$W_{defect} = \tau_{MRMod} \times v,$$

Where $W_{defect}$ is the width along the circumference, $\tau_{MRMod}$ is the time change between the positive and negative transition modulation pulse, and v is linear velocity of the MR element with respect to the defect.

Figure 21:
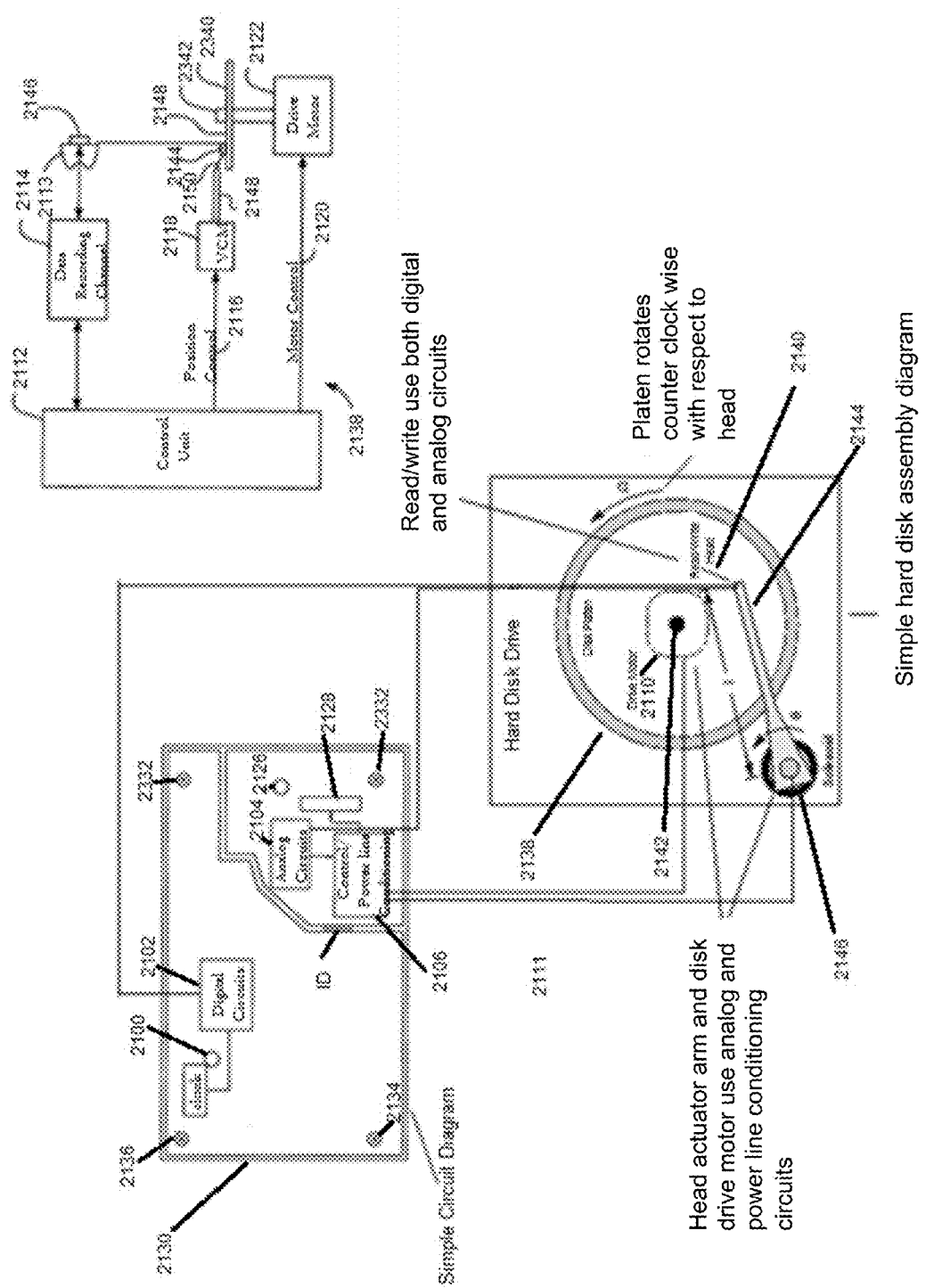
FIG. 21 shows a diagram of the basic components and assembly of the device.

FIG. 21 shows a diagram of the basic components and assembly of the device. First shown is a simple circuit diagram, showing a clock 2100 connected to digital circuits 2102, and analog circuits 2104 connected to control/power line conditioning 2106. Additionally, a simple hard disk assembly 600 diagram is presented, showing a head actuator arm 2108 and disk drive motor 2110, which use analog and power line conditioning circuits 2111, a platen which rotates clockwise with respect to the head, and a read/write head using both analog 2104 and digital circuits 2102. Also shown is a control unit 2112 bidirectionally coupled to a data recording channel 2114. The control unit 2112 additionally leads, via a position control 2116 to a VCM 2118, and via a motor control 2120 to a drive motor 2122.

For this embodiment, the ground plane is divided between a digital circuit ground plane 2124 and an analog circuit ground plane 2126. As is well known in the art of circuit board design, to minimize noise in printed circuit boards ("PCBs") that integrate digital and analog circuits, the digital ground plane 2124 is isolated from the analog ground plane 2126, and the ground planes are connected at a single point. The isolation of the digital circuit control unit 2112, digital ground plane 2124 and analog circuit ground plane 2126 is done to try to eliminate any large ground currents that flow through the analog area 2124 near the head-disk assembly connector 2128. The primary cause of noise on power and ground planes 2124-2126 is due to the difficulty of maintaining an equal potential surface on the ground and power planes 2124-2126 on the printed circuit board 300.

The unequal potential between the power and ground planes results in an unequal potential between the PCB ground plane and the HDA metal ground.

The clock 2100, used to generate data rates to read and write data in the hard-disk drive 2102, is mounted on the printed circuit board 2130 and coupled to the digital circuit ground plane 2124. Similarly, digital circuits 2104 that control the operation of the hard disk drive 2102 are also mounted on the printed circuit board 2130 and grounded on the digital circuit ground plane 2124. Analog circuits 2104, which operate on analog signals read from the head-disk assembly 600, are mounted on the printed circuit board 2130, and are coupled to the analog circuit ground plane 2126. The power and control signals from the analog circuits 2104 are input to control/power line conditioning circuits 2106. In general, the control/power line conditioning circuits 2106 condition the power and control signals to reduce noise coupling in the actuator 2102. The conditioned signals are then passed to the head-disk assembly (HDA) connector 2128.

In order to maintain an equal potential between the PCB ground and the HDA metal ground, a conductive screw 2132 is inserted into the head-disk assembly 600 metal to attach the ground for the head-disk assembly 600 to the PCB analog ground. For this embodiment, digital ground is attached to the head-disk assembly and PCB 2130 either/and through conductive screws 2134 and 2136. Conductive screw 2132 is not attached to the ground plane of the PCB 300, thus forming less of an inductive loop between the HDA metal and the PCB ground planes.

Additionally, there is shown a disk drive 2138 in accordance with one embodiment of the present invention. At least one rotatable magnetic disk 2140 is supported on a spindle 2142 and rotated by a disk drive motor 2122. The magnetic recording on each disk is typically in the form of an annular pattern of concentric data tracks (not shown) on the disk 2140.

At least one slider 2144 is positioned near the disk 2140, each slider 2144 supporting one or more magnetic read/write heads 2146. As the disk rotates, slider 2144 is moved radially in and out over disk surface 2148 so that heads 2146 may access different tracks of the disk where desired data are recorded and/or to be written. Each slider 2144 is attached to an actuator arm 2148 by means of a suspension 2150. The suspension 2150 provides a slight spring force which biases slider 2144 against the disk surface 2148. Each actuator arm 2148 is attached to an actuator 2118. The actuator 2118 may be a voice coil motor (VCM). The VCM typically comprises a coil movable within a fixed magnetic field, the direction and speed of the coil movements being controlled by the motor current signals supplied by controller 2112.

During operation of the disk storage system, the rotation of disk 2140 generates an air bearing between slider 2144 and disk surface 2148 which exerts an upward force or lift on the slider. The air bearing thus counter-balances the slight spring force of suspension 2150 and supports slider 2144 off and slightly above the disk surface by a small, substantially constant spacing during normal operation. Note that in some embodiments, the slider 2144 may slide along the disk surface 2148.

The various components of the disk storage system embodied are controlled in operation by control signals generated by control unit 2112, such as access control signals and internal clock signals. Typically, control unit 2112 comprises logic control circuits, storage (e.g., memory), and a microprocessor. The control unit 2112, generates control signals to control various system operations such as drive motor control signals on line 2120, and head position and seek control signals on line 2116. The control signals on line 2116 provide the desired current profiles to optimally move and position slider 113 to the desired data track on disk 2140. Read and write signals are communicated to and from read/write heads 2152 by way of recording channel 2114.

Figure 22:
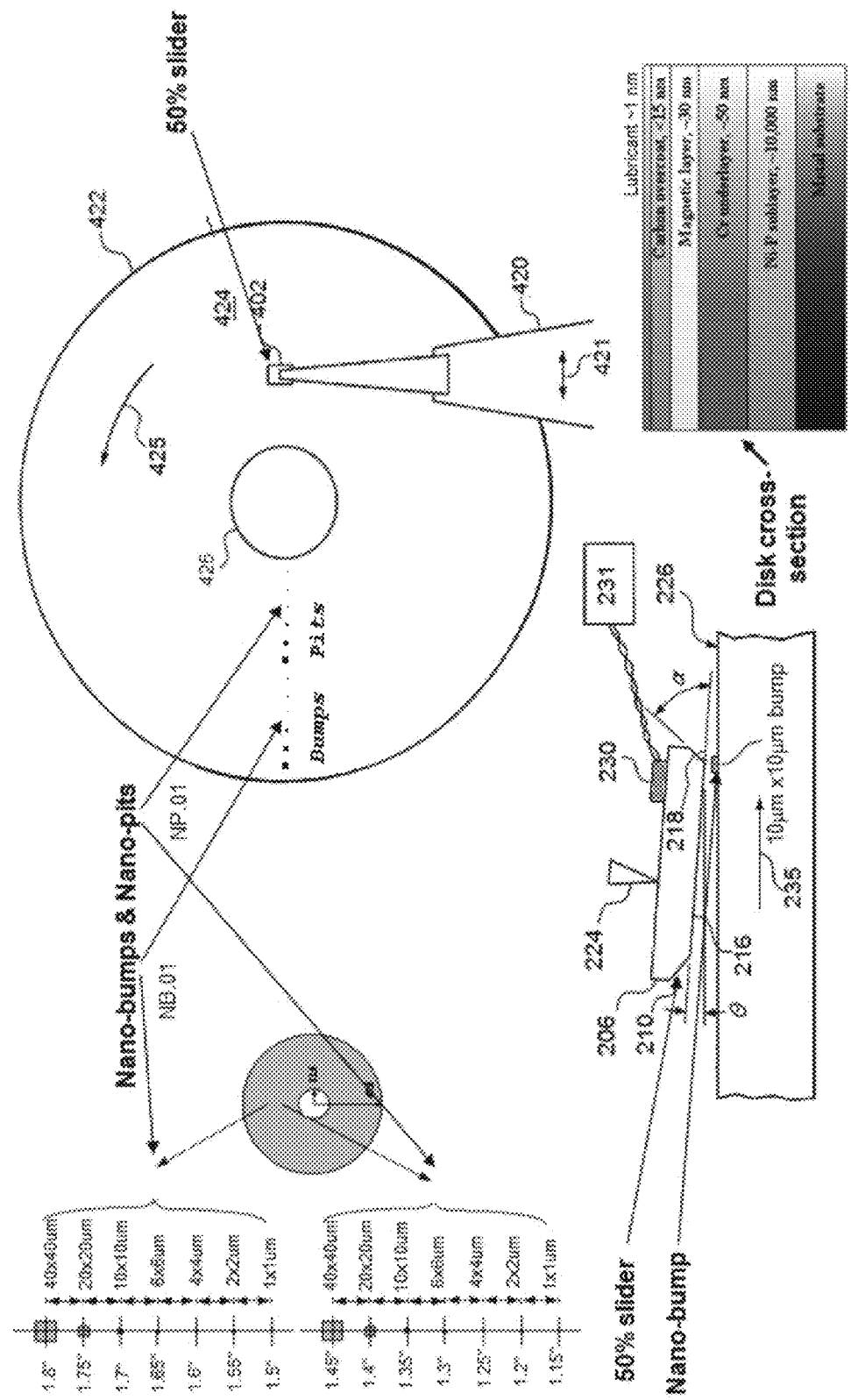
FIG. 22 shows a diagram of the nano-components of the device.

FIG. 22 shows a diagram of the nano-components of the device. A plurality of asperities DF.01-DF.N are shown on a disk 2, each asperity DF.01-DF.N being either a nano-bump NB.01-NB.N or a nano-pit NP.01-NP.N, and the size of each nano-bump NB.01-NB.N or nano-pit NP.01-NP.N. Also shown is a glide head 8 or a downward facing merged head mounted on a suspension arm 420 and flying over the surface 424 of a rotating disk 422. The disk 422 rotates in the direction of arrow 425. A linear actuator (not shown) controls the radial position of the head 402 with respect to the disk 422 by moving the suspension arm 420 as illustrated by arrow 421.

Figure 2A:
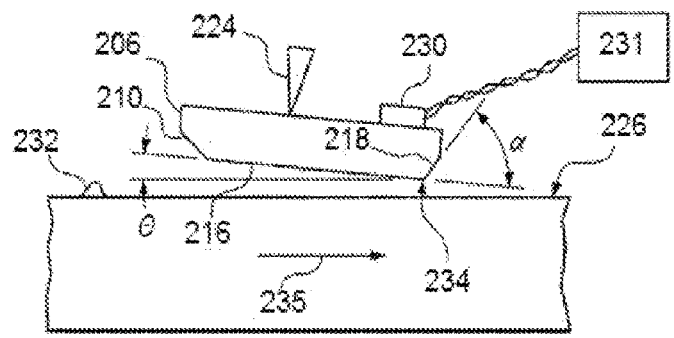
FIGS. 2A and 2B illustrate a bottom plan view and the side view of a conventional piezoelectric (PZT) glide head.
Figure 2B:
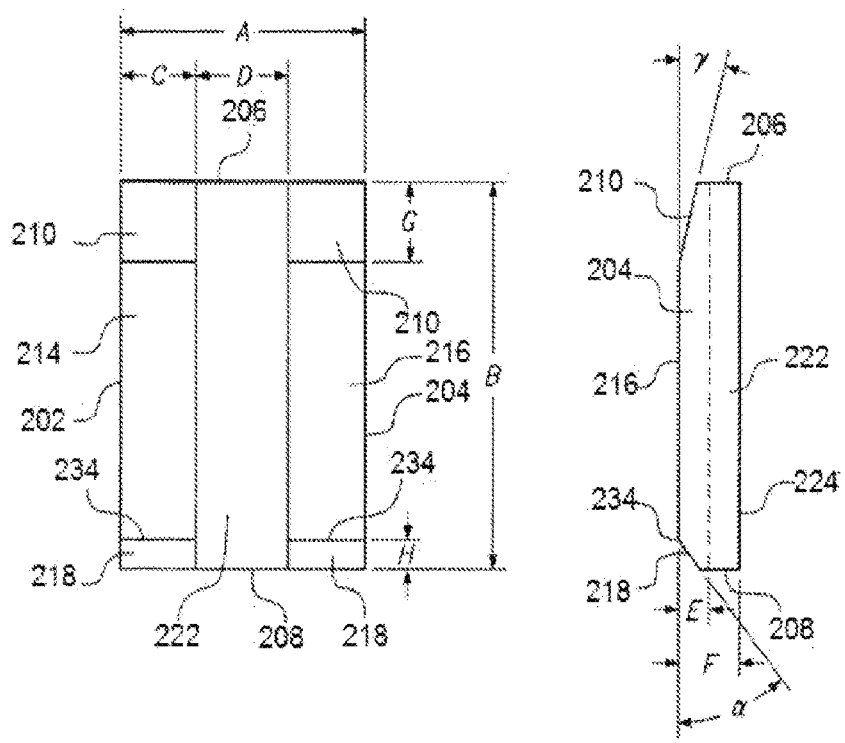
Figure 3A:
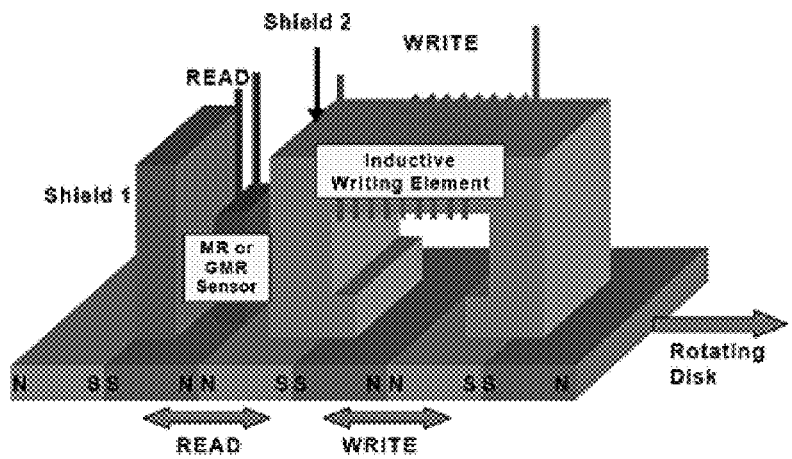
FIG. 3A illustrates magnetic head with combined elements of the read and write functions into a single, or "merged head"
Figure 3B:
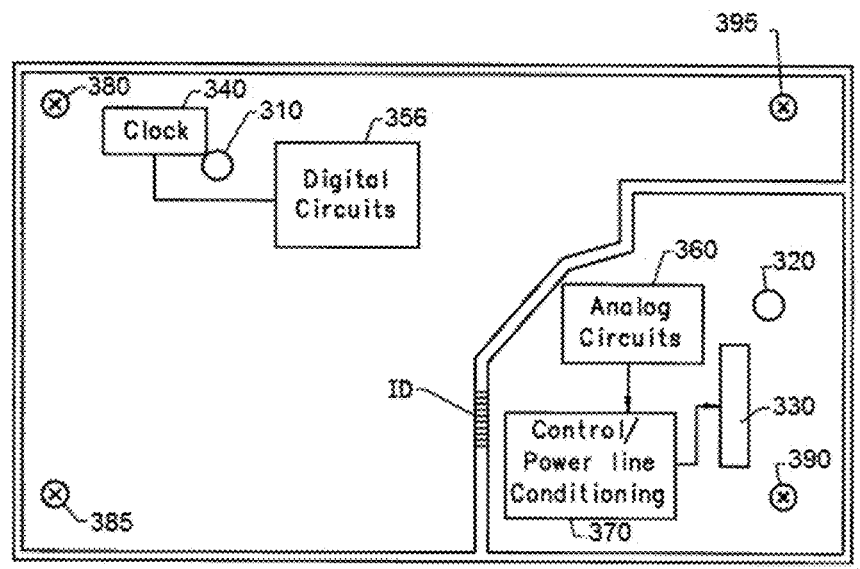
FIG. 3B illustrates one embodiment for a printed circuit board for use in the head-disk assembly.
Figure 4:
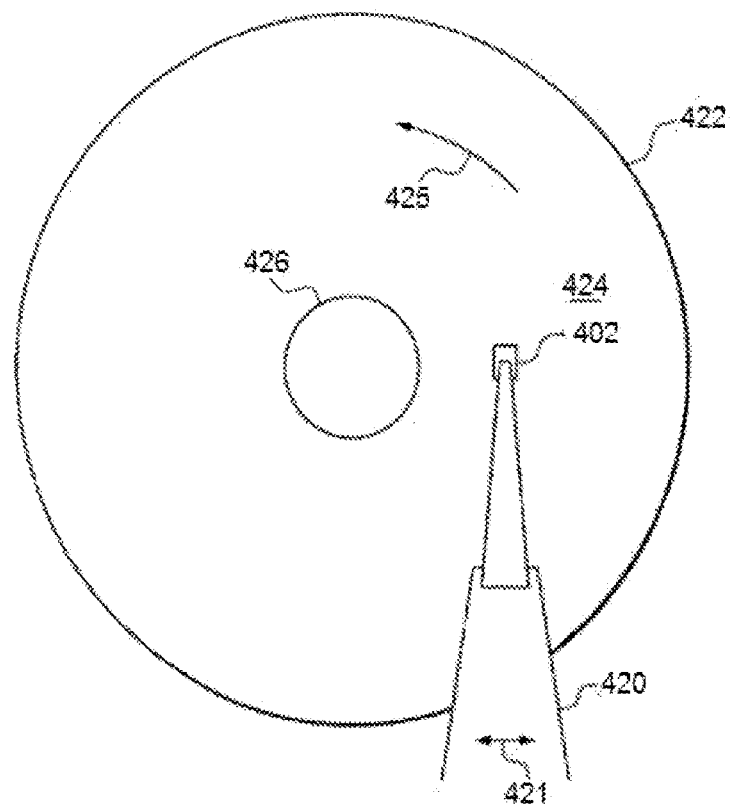
FIG. 4 illustrates a conventional glide head mounted on a suspension arm and flying over the surface of a rotating disk.
Figure 5:
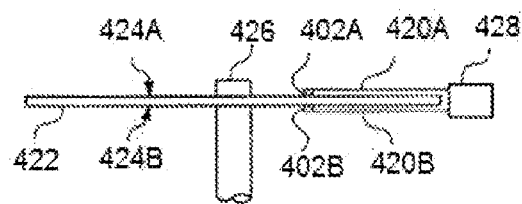
FIG. 5 illustrates a side view of a downward facing conventional glide head, or a downward facing conventional merged head.

Also shown is a side view of the prior art glide head assembly 8, as introduced above in reference to FIG. 2A and FIG. 2B. The glide head 8 is preferably mounted within the range of 10 nm to 1 mm to the disk. A disk cross section is additionally displayed, showing a plurality of layers of material on the disk 422: a lubricant being approximately 1 nm, a carbon overcoat being preferably less than 15 nm, a magnetic layer being approximately 30 nm, a Cr underlay being approximately 50 nm, an Ni—P sublayer being approximately 10,000 nm, and a metal substrate.

Figure 23A:
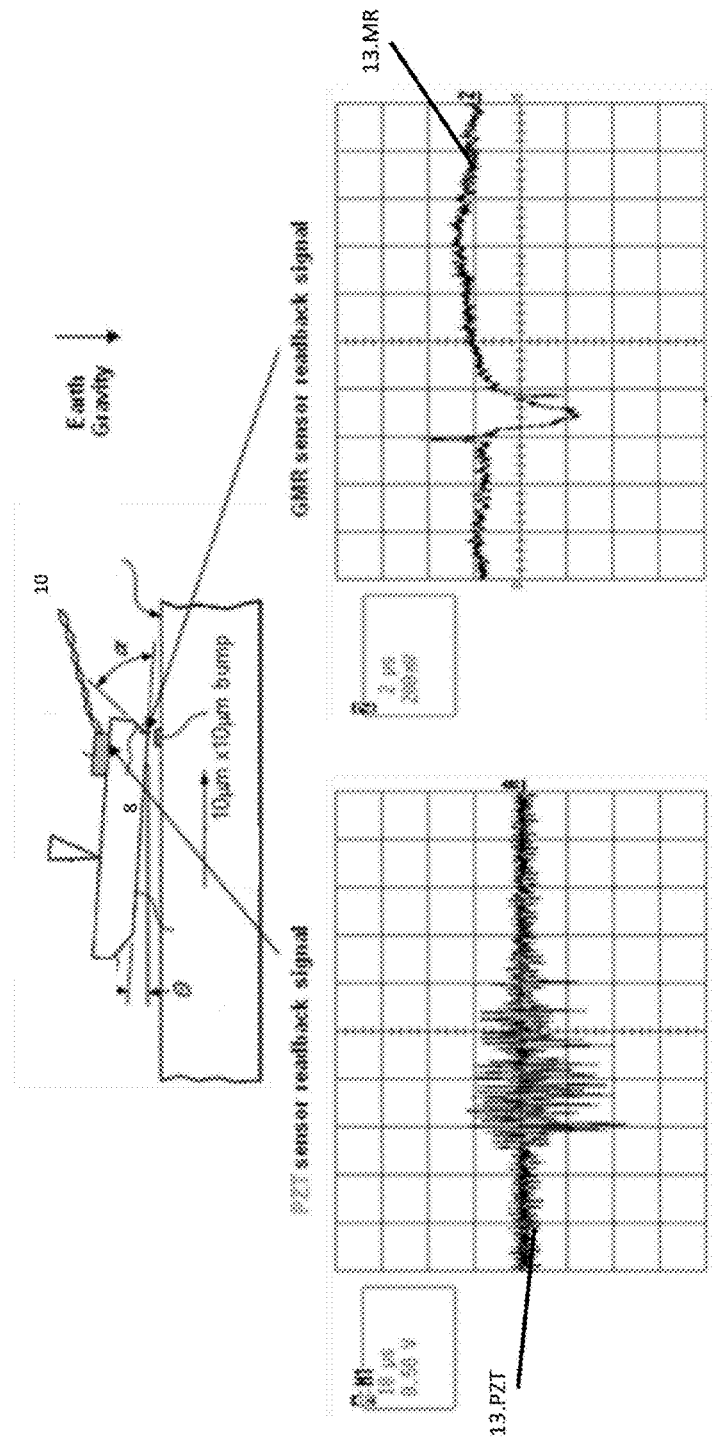
FIG. 23A shows a diagram of readback signals from GMR and PZT sensors for "bumps"

FIG. 23A shows a diagram of a readback signal 13.MR from a GMR sensor and a readback signal 13.PZT from a PZT sensor for nano-bumps NB.01-NB.N. The side view of a prior art head assembly 200, as referenced above in FIG. 2A and FIG. 2B, is shown wherein both a GMR head 10 and a PZT head 8 are mounted on the head assembly 600. Shown on the left is a graphical representation of the readings 13.PZT taken from the PZT sensor when interacting with nano-bump NB.01-NB.N, showing the electric signal induced on the PZT head 8, and on the right is a graphical representation of the GMR sensor readings 13.MR when interacting with the nano-bump NB.01-NB.N, showing the electric signal induced on the GMR head read sensor 10.

Figure 23B:
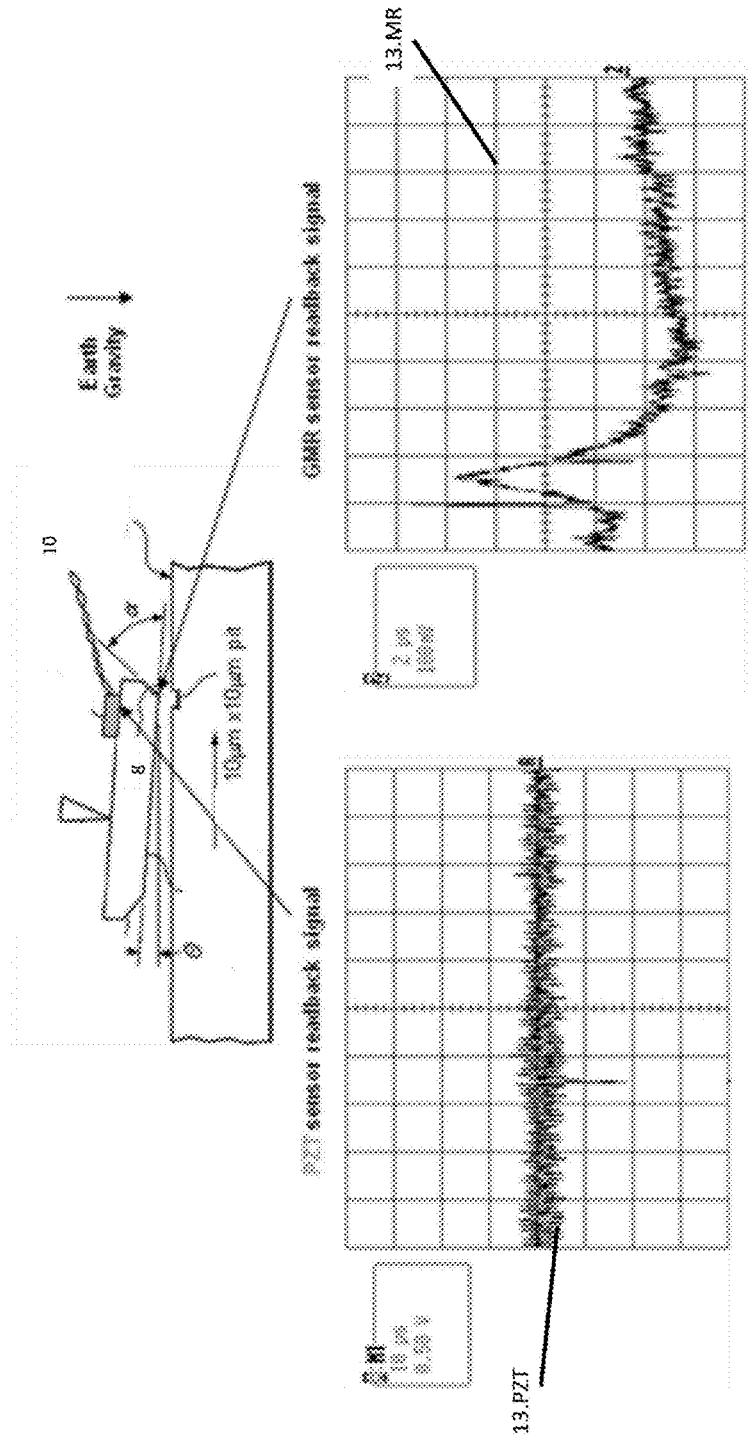
FIG. 23B shows a diagram of readback signals from GMR and PZT sensors for "pits"

FIG. 23B shows a diagram of readback signals from a GMR sensor 10 and from a PZT sensor 8 for nano-pits NP.01-NP.N. The side view of a prior art head assembly 2, as referenced above in FIG. 2A and FIG. 2B, is shown wherein both a GMR sensor and a PZT sensor are mounted on the head assembly 200. The GMR sensor 10 is preferably within the range of 10 nm to 1 mm with the disk, and the PZT sensor 8 is preferably mounted approximately halfway between the GMR sensor and the disk 2. On the left is shown a graphical representation of readings 13.PZT from the PZT sensor 8 when encountering the nano-pit NP.01-NP.N, showing the electric signal induced on the PZT head, and on the right is shown a graphical representation of the readings 13.MR from the GMR sensor 10 when encountering the nano-pit NP.01-NP.N, showing the electric signal induced on the GMR head read sensor 10.

Figure 24:
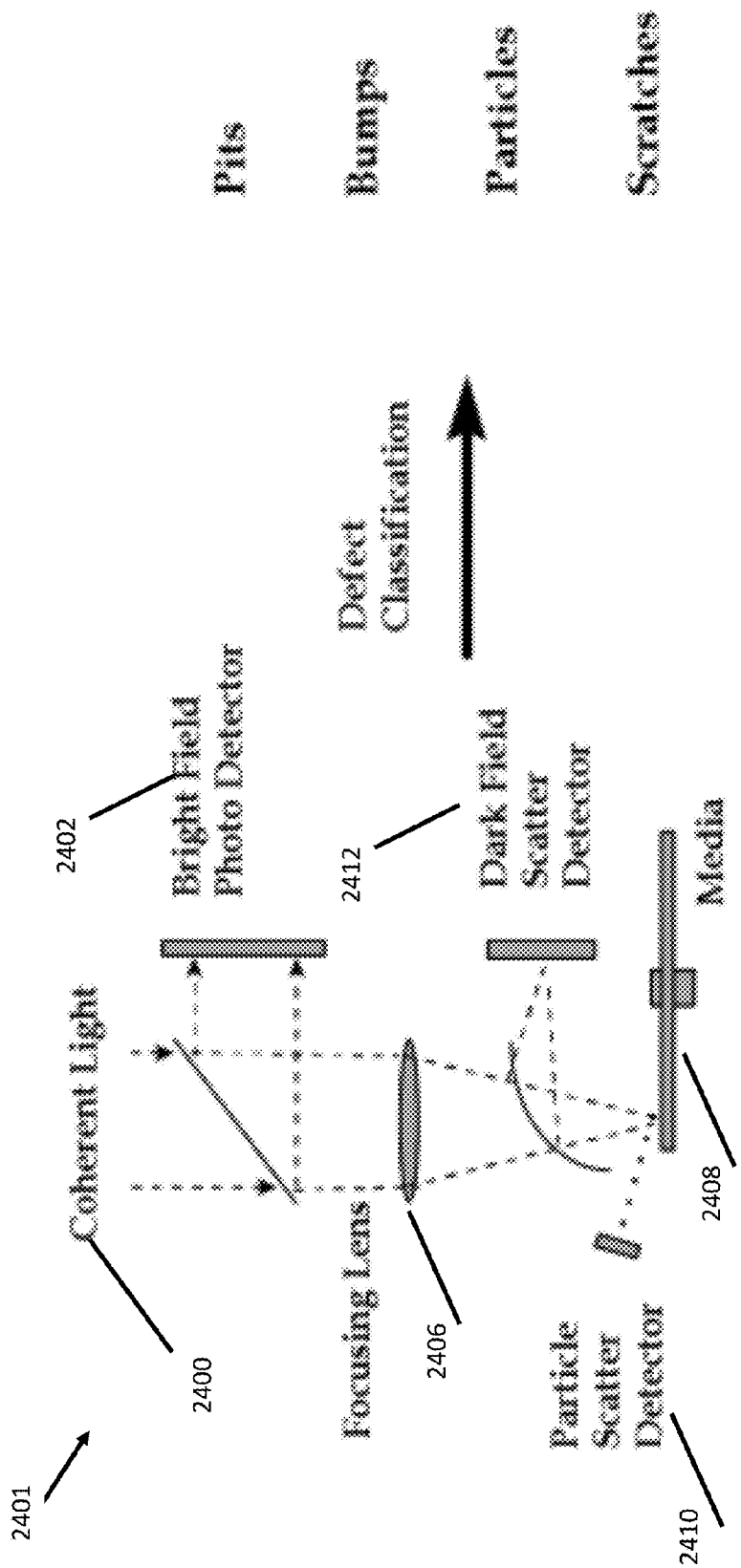
FIG. 24 shows an overview of hard disk optical inspection equipment.

FIG. 24 shows an overview of generic hard disk optical inspection equipment 2401. Light 2400, preferably but not necessarily coherent, such as a laser, is directed toward a bright field photo detector 2402, through a focusing lens 2406, bounced off of the media 2408, and directed toward a particle scatter detector 2410. Additionally shown is a dark field scatter detector 2412, into which the light may be directed by an additional lens. The defects DF.01-DF.N detected by the specific deflections of light 2400 are subsequently classified as pits NP.01-NP.N, bumps NB.01-NB.N, particles PT.01-PT.N, or scratches SC.01-SC.N.

Figure 25:
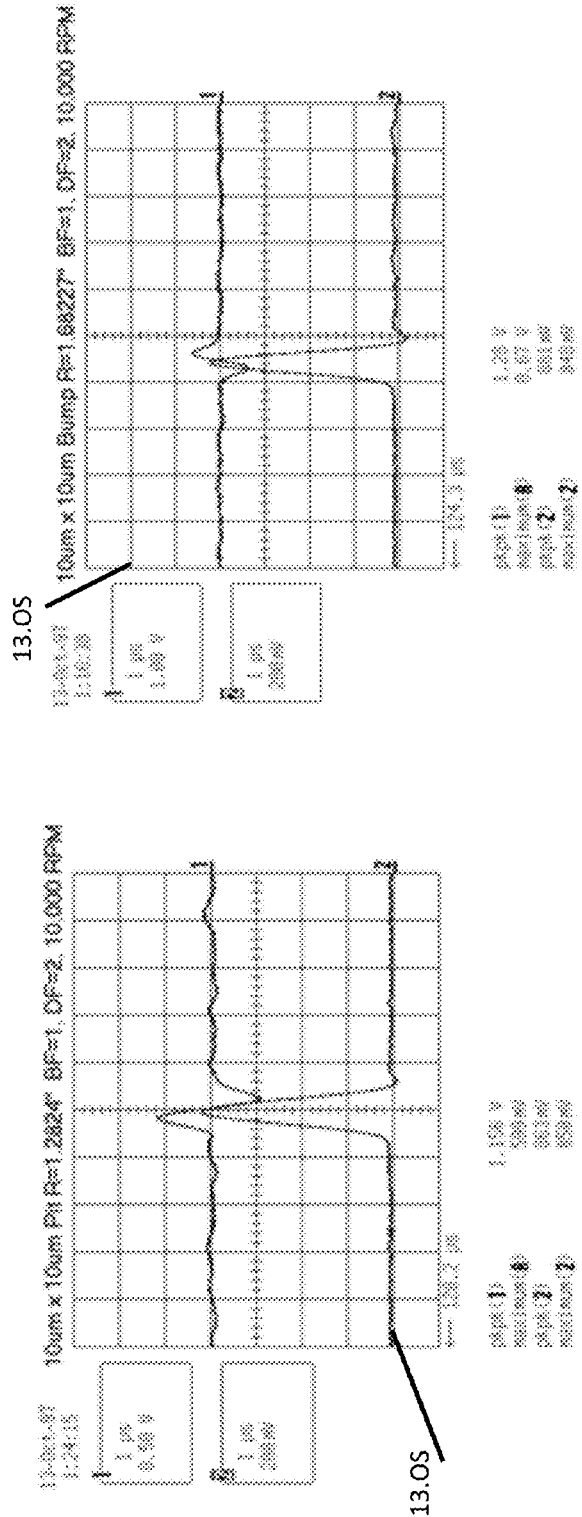
FIG. 25 shows diagrams of readback signals from an optical sensor for pits and bumps.

FIG. 25 shows diagrams of readback signals 13.OS from an optical sensor 2401 for nano-pits NP.01-NP.N and bumps NB.01-NB.N. On the left is displayed a graphical representation of the readings 13.OS from an optical sensor 2401 for a pit, showing the bright field signal detected as channel 1 and the dark field signal detected as channel 2. On the right is displayed a graphical representation of the readings 13.OS from an optical sensor 2401 for a bump, showing the bright field signal detected as channel 1 and the dark field signal detected as channel 2.

Figure 26A:
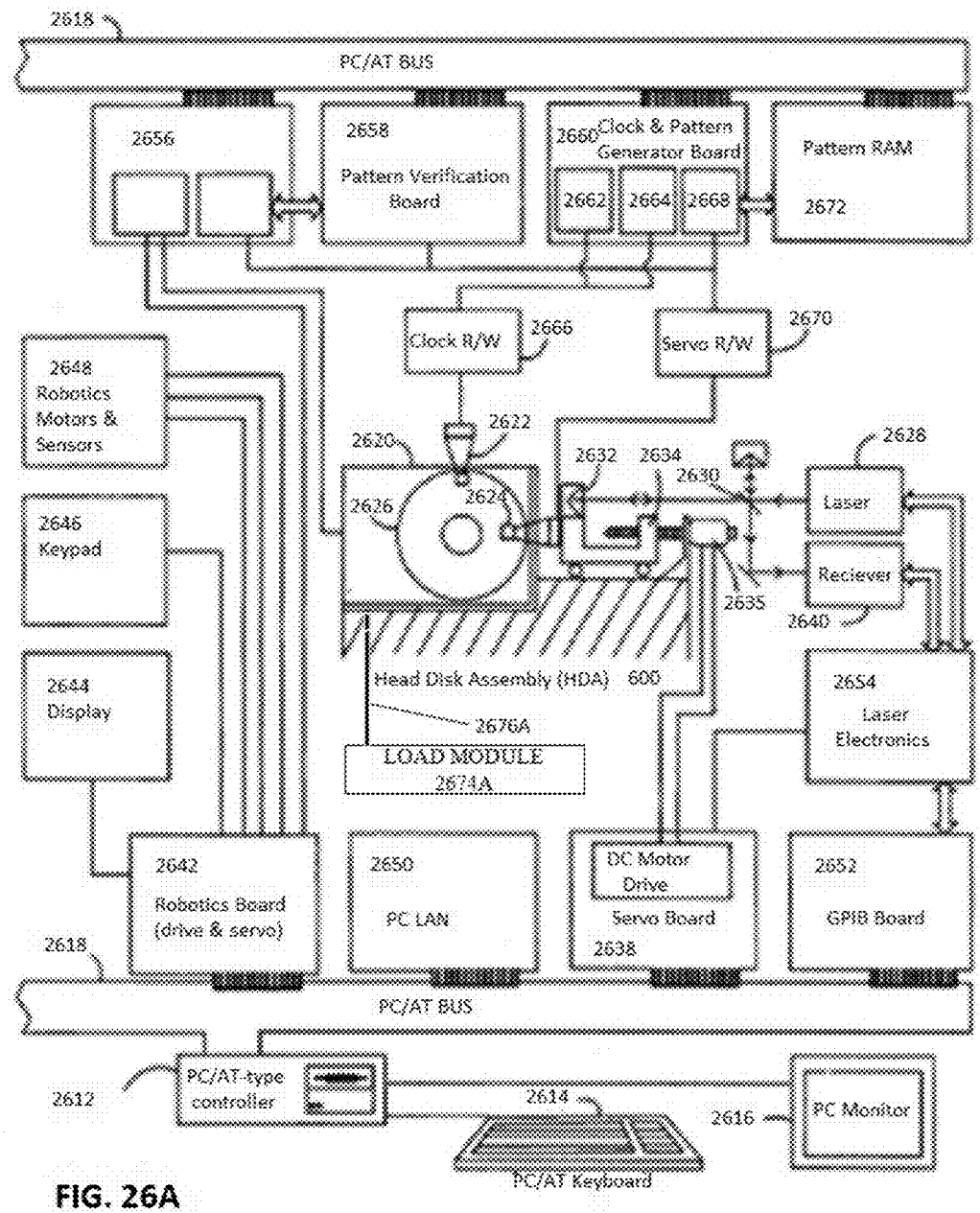
FIG. 26A-FIG. 26F shows a schematic overview of internal hard disk inspection and certifier equipment having a plurality of means by which energy from the GMR head may be gathered, stored, and utilized.

FIG. 26A shows a circuit diagram of hard disk 2 inspection and certifier equipment 2610. Shown is a PC/AT BUS 2618 for board expansion, a pattern verification board 2658, a user expansion board 2656, a clock and pattern generator board 2660 having modules 2662 and 2664 that drive a clock R/W preamplifier board 66 and a module 2668 that drives a servo R/W preamplifier boards 2670, a servo pattern RAM expansion board 2672, pattern RAM 2674, robotics motors and sensors 2648, a sixteen-button key pad 2646, a display 2644, a robotics expansion board 2642, a personal computer ("PC") local area network ("LAN") 2650, a DC motor drive contained within a servo board 2638, a general purpose interface bus expansion board 2652 bidirectionally coupled with a laser electronics 2654 controller, which is in turn bidirectionally coupled with a laser light receiver 2640 and a laser 2628, which shines through mirror 2630 and reflects off of retroreflector 2632 mounted on mechanism 2634 driven by motor 2636 and servo board 2638. Also shown is the head disk assembly 600 coupled with a clock R/W 2666 and a servo R/W 2670. Additionally shown is a clock head 2622, a servo head 2624, and a disk media 2626. An electrical impedance load module 2674A (hereinafter "load module 2674A"), into which current generated by the gravitomagnetic induction may be directed and stored, is shown to be connected to the head assembly 600 by means of a signal line 2676A. The electrical impedance load module 2674A may be or comprise any energy storage or use means known in the art, as discussed in greater detail below. Finally, a PC/AT keyboard 2614 and a PC display and/or monitor 2616 are additionally connected to a PC/AT-type controller 2612.

Figure 26B:
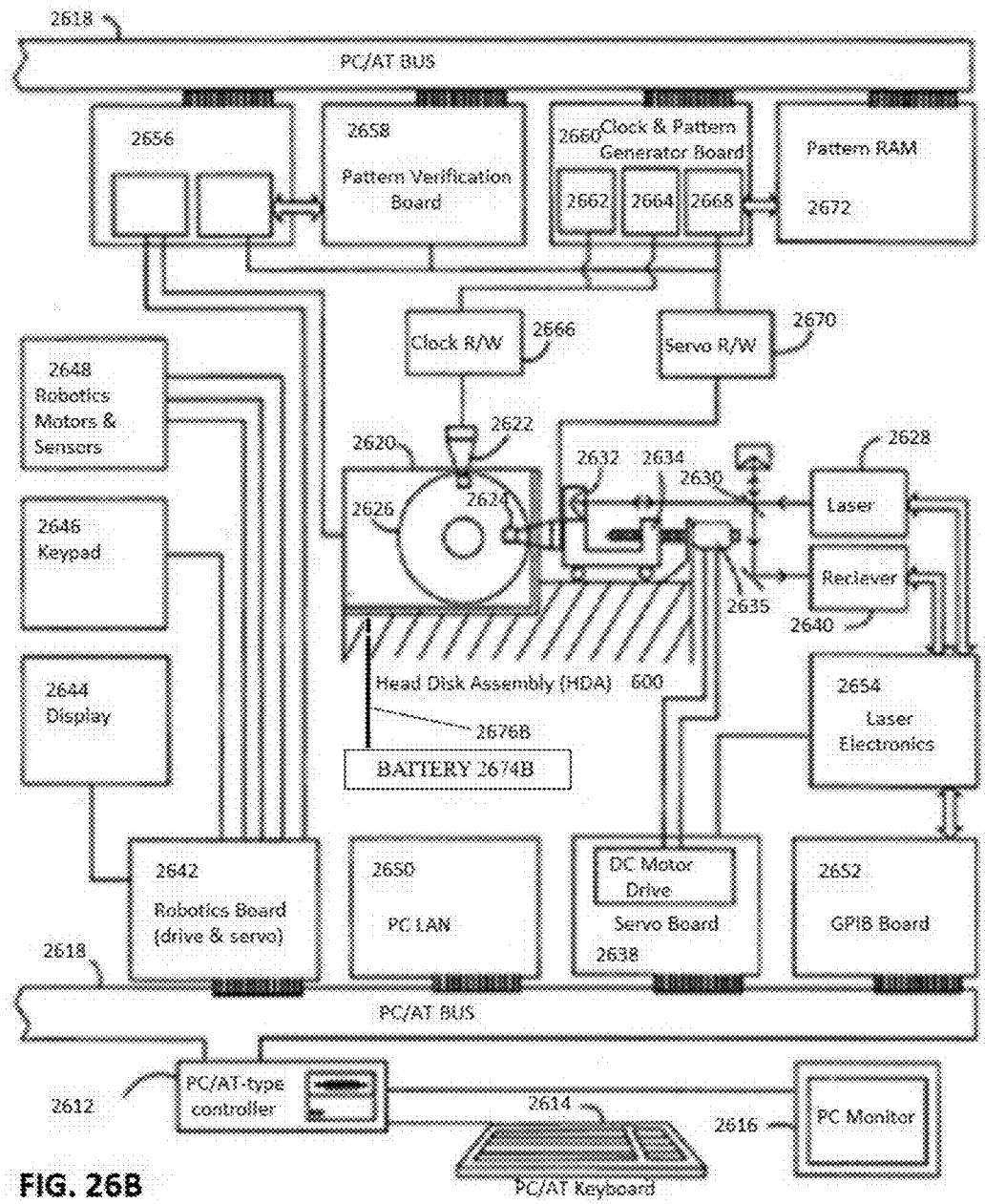

FIG. 26B show the circuit diagram of hard disk 2 inspection and certifier equipment, having the above-listed components, and wherein the load module 2674A comprises a battery 2674B connected to the head assembly 600 by means of a signal line 2676B to collect, store and ultimately dispatch gravitomagnetic energy generated by the head assembly 600. The battery 2674B may be, but is not limited to, a group size battery as defined by the Battery Council International (BCI) of Chicago, Ill.; a lead-acid battery, a T01-RE™ electrical energy storage battery, L16RE-A™ electrical energy storage battery, L16RE-B™ electrical energy storage battery, or L16RE-2V™ electrical energy storage battery, each marketed by Trojan Battery Company of Santa Fe Springs, Calif., or any suitable battery technology known in the art.

Figure 26C:
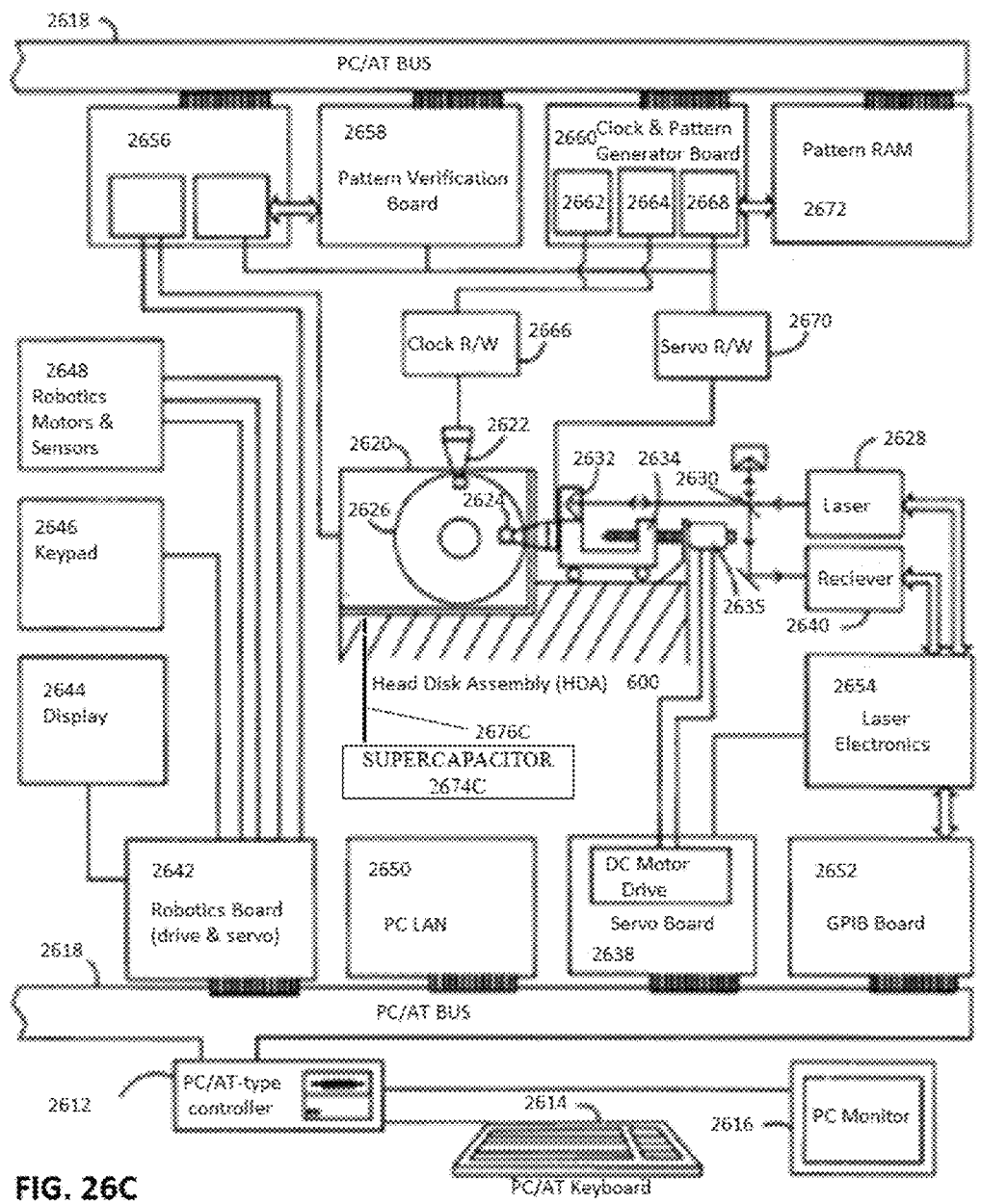

FIG. 26C shows the circuit diagram of hard disk 2 inspection and certifier equipment, having the above-listed components, and wherein the load module 2674A comprises a supercapacitor 2674C connected to the head assembly 600 by means of a signal line 2676C for the purpose of rapid collection, storage and ultimate dispatch of the gravitomagnetic energy generated by the head assembly 600. The supercapacitor 2674C may optionally be, but is not limited to a symmetrical capacitor, an asymmetrical capacitor, an electric double layer capacitor, a MAXWELL 16V MODULE ULTRACAPACITOR BMOD0500 P016 B01™ electrical charge capacitor, as marketed by Mouser Electronics, Inc. of Mansfield, Tex. or any suitable supercapacitor technology known in the art.

Figure 26D:
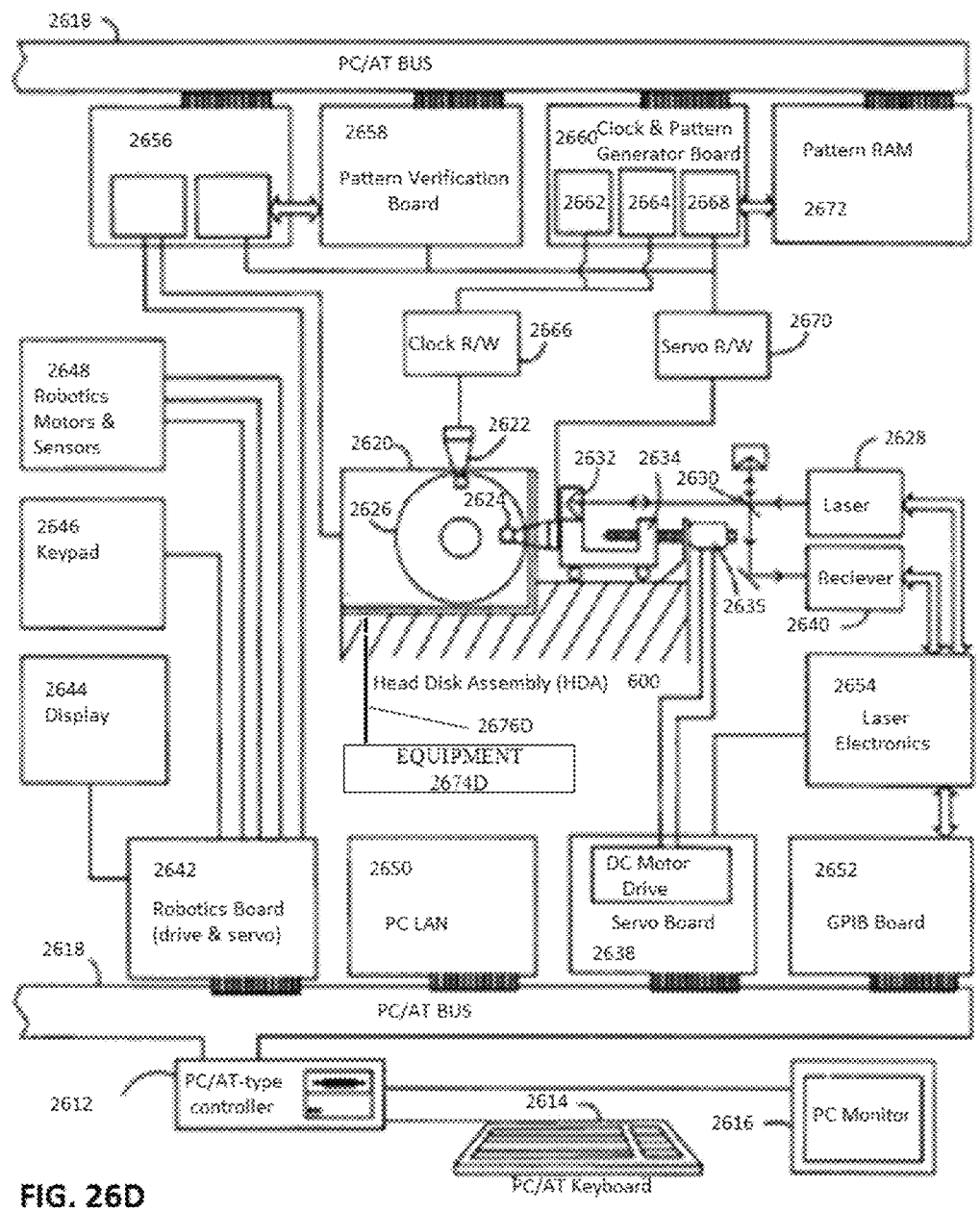
Figure 26E:
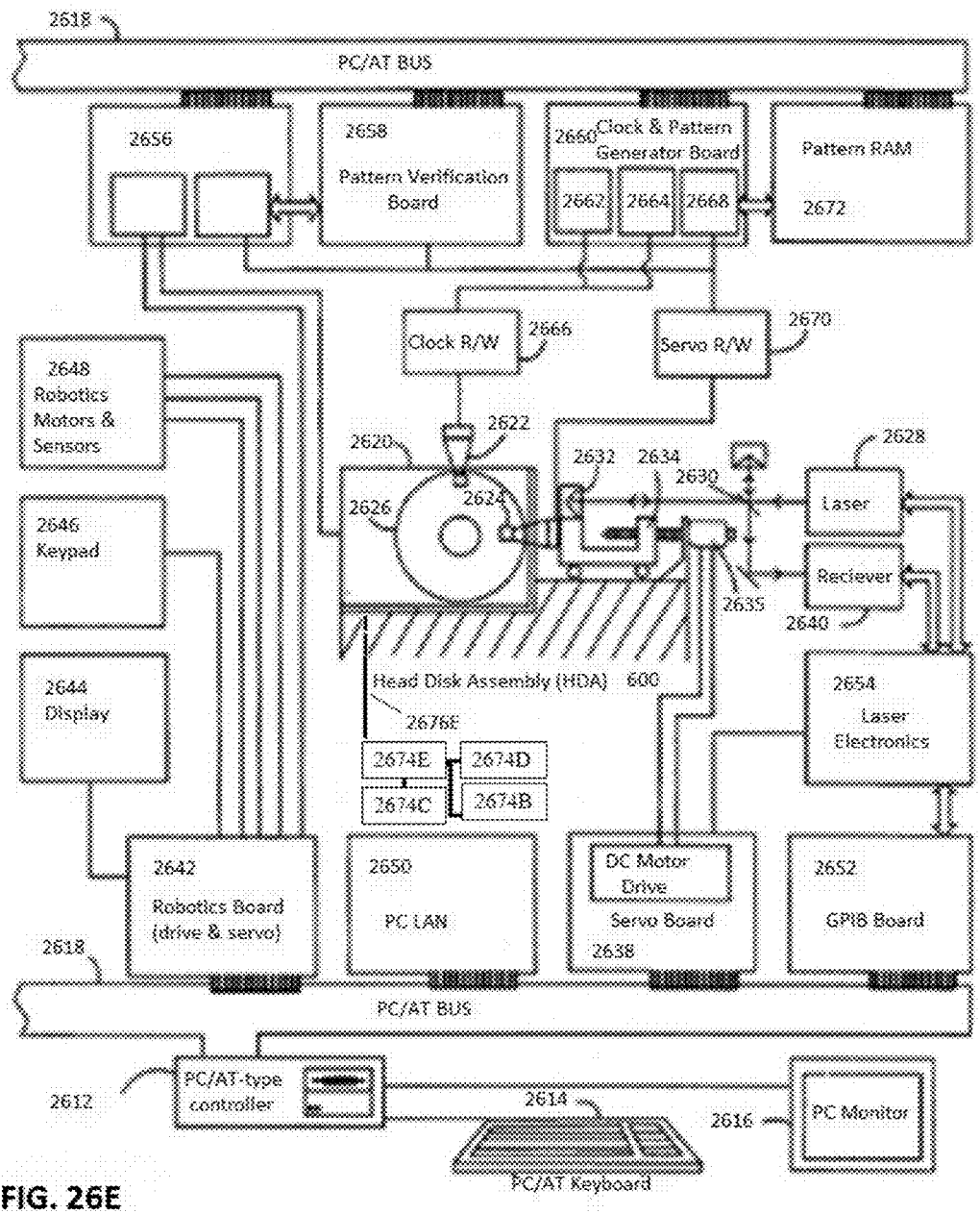

FIG. 26D shows the circuit diagram of the hard disk 2 inspection and certifier equipment, having components as outlined in the description of FIG. 2A, and wherein the load module 2674A comprises equipment 2674D connected to the head assembly 600 by means of a signal line 2676D. The equipment 2674D may optionally be, but is not limited to an electric vehicle such as the Model S, as marketed by Tesla Motors of Palo Alto, Calif.; mobile phones, particularly "smart phones" such as the IPHONE™ marketed by Apple, Inc. of Cupertino, Calif., or the GALAXY™ series marketed by Samsung Group of Seoul, Republic of Korea; mobile computing devices or tablets such as the IPAD™ by Apple, Inc. of Cupertino, Calif.; a NIVEUS 5200 computer workstation marketed by Penguin Computing of Fremont, Calif. and running a LINUX™ operating system or a UNIX™ operating system; (c.) a network-communications enabled personal computer configured for running WINDOWS VISTA™, WINDOWS 8™, or WINDOWS 10 operating system marketed by Microsoft Corporation of Redmond, Wash.; (d.) a MACBOOK PRO™ or iMAC personal computer as marketed by Apple, Inc. of Cupertino, Calif., or other suitable equipment known in the art which makes use of electrical current. In this embodiment of the invented device, the equipment 2674D preferably accepts current directly from the head assembly 600 and immediately employs the current directly and/or stores the current internally.

Figure 26F:
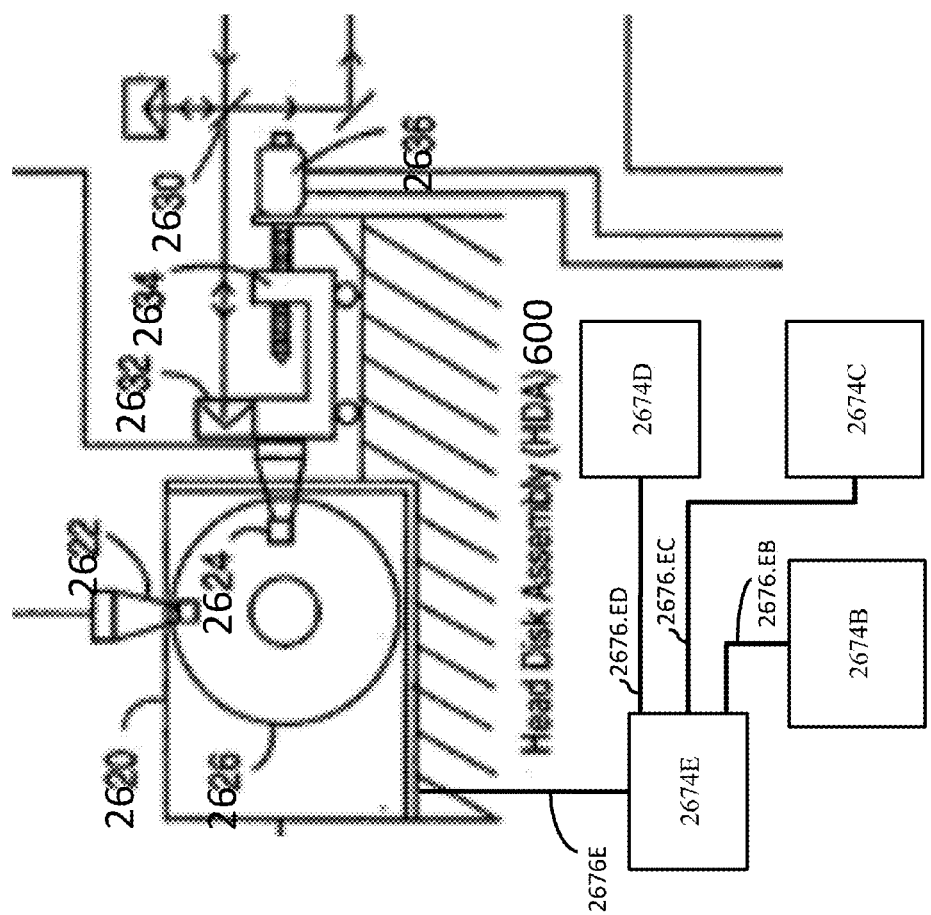

FIG. 26F shows the circuit diagram of the hard disk 2 inspection and certifier equipment, having components as outlined in the description of FIG. 2A, and wherein the load module 2674A comprises a power distribution controller 2674E (hereinafter "controller 2674E"). The controller 2674E is coupled to, and receives current from, the head assembly 600 by means of a signal line 2676E. As shown in greater detail in FIG. 26F, the controller 2674E is additionally coupled to one or more of (a.) a battery 2674B by means of a signal line 2676.EB; (b.) a supercapacitor 2674C by means of a signal line 2676.EC; and (c.) equipment 2676D by means of a signal line 2676.ED. The controller 2674E preferably controls and directs the flow of current from the head assembly 600 to and between the battery 2674B, the supercapacitor 2674C, and/or the equipment 2676D, such that no single component is overwhelmed with more current than it can handle, or is deprived of current when it may be necessary.

Figure 26G:
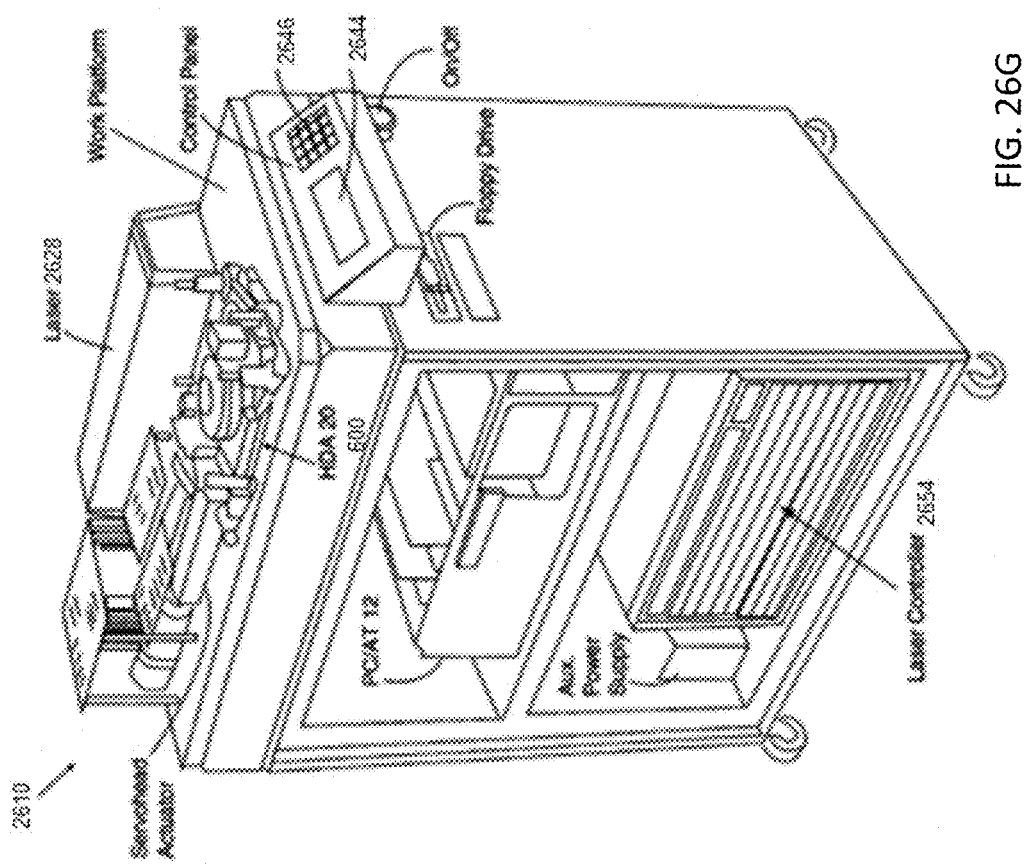
FIG. 26G shows an overview of the external hard disk inspection and certifier equipment.

FIG. 26G shows an overview of the external hard disk inspection and certifier equipment 2610, wherein a servo-head actuator 2634, the head disk assembly 600, and the laser 2628 are shown to be on a top of an assembly cart. Additionally shown are a work platform, a control panel, an on/off switch, a floppy drive, a laser controller, an auxiliary power supply, and the PC/AT.

Figure 27:
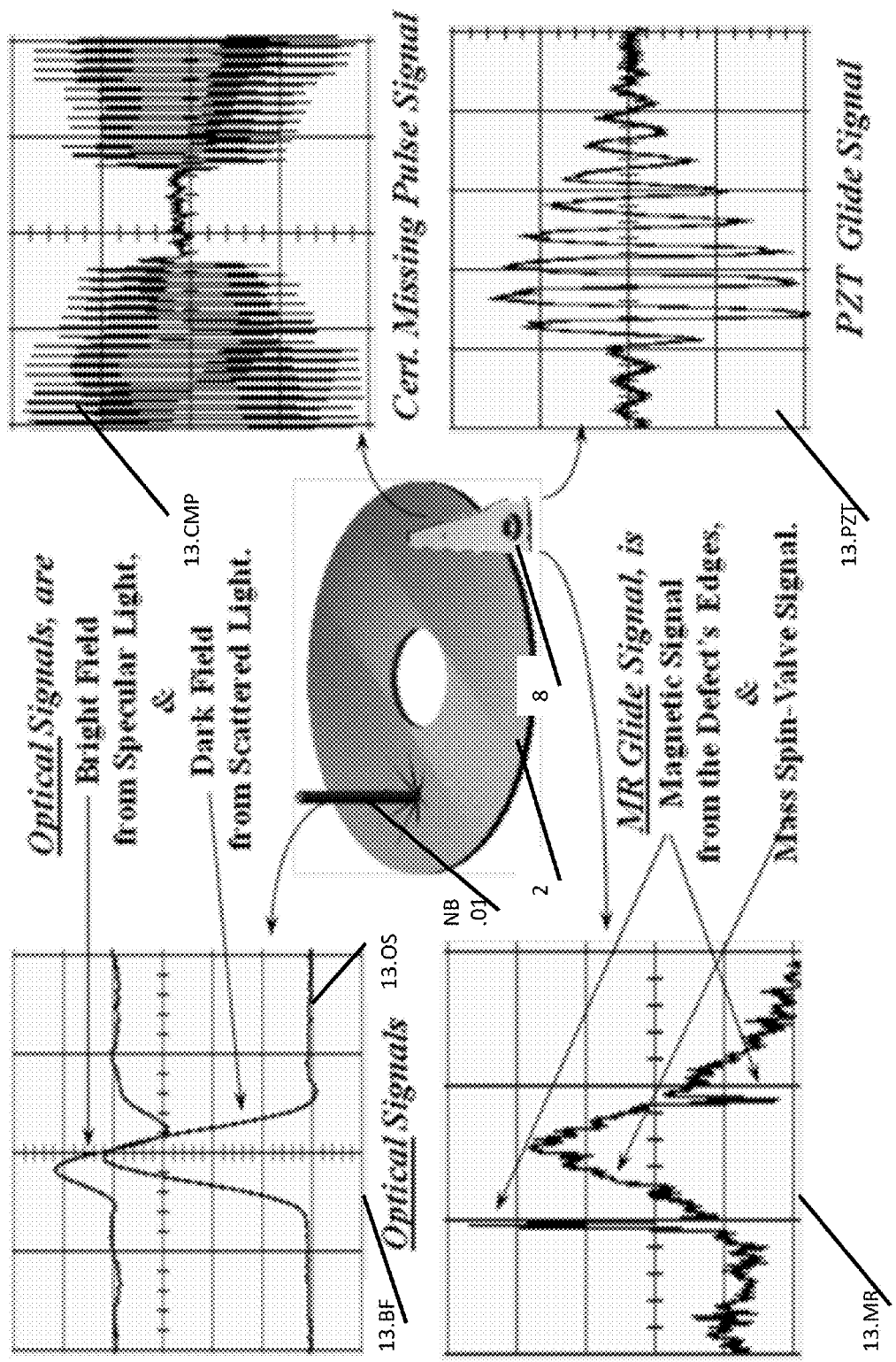
FIG. 27 is a diagram defining optical, certification, PZT and MR glide signals.

FIG. 27 is a diagram defining optical signal readout 13.OS, certification missing pulse signal readout 13.MPS, PZT signal readout 13.PZT and MR signals readout 13.MR. An optical test 2401 involves directing light 2400 at a spinning disk 2 and regarding the ways in which the light 2400 refracts off of the media 2408. A nano-pit NP01-NP.N is indicated by the polarity of bright field signal detected for the nano-pit NP.01-NP.N, showing the bright field signal 13.BF detected as channel 1 on the right, and for a nano-bump NB.01-NB.N, showing the bright field signal 13.BF detected as channel 1 on the left (See FIG. 25). Graphical displays of optical signals 13.OS indicate bright fields from specular light, and dark fields from scattered light; in the correspondences and differences between the bright field and the dark field, a defect DF.01 may be judged.

A missing pulse test involves writing a sinusoidal waveform to the surface of the disk 2 using a write head 10, and then reading back the recorded signal using a read head 10. Because a sine wave has two transitions per cycle, the read back frequency is twice the write frequency. Discrepancies, referred to as "dropouts" or "missing pulses", between what is written and what is read are used to identify disk errors. As domain size has decreased, it has become necessary to use higher frequency to properly analyze the surface of a disk. Currently, write frequencies as high as 200 MHZ (and corresponding read frequencies of 400 MHZ) may be used.

Asperities DF.01-DF.N in a spinning disk 2 are indicated in graphical displays of MR glide signals by the Certification Missing Pulse read back signal 13.CMP, which is caused by magnetic signals from the edges of the defect, whether a nano-pit NP.01-NP.N or a nano-bump NB.01-NB.N.

A PZT glide 8 is simply placed very close, preferably within a range of 10 nm to 1 mm to the disk 2, such that a nano-bump NB.01-NB.N creates vibrations in the PZT glide 8, indicating an asperity DF.01-DF.N. The PZT glide 8 does not detect nano-pits NP.01-NP.N. In current disk drive 14 manufacturing environments, it is common to subject each disk 2 to component level testing before it is assembled into a disk drive 14. One type of disc 2 test is referred to as a "glide" test 2702, which is used as a go/no-go test for surface defects DF.01-DF.N or asperities, or excessive surface roughness. A glide test 2702 typically employs a precision spin stand 2704 and a specially configured glide test head 10 including a piezo-electric sensing element also commonly known as a "PZT glide test head." The glide test is performed with the PZT glide test head flown at approximately half the flying height (~12 nm) at which the operational read/write head will nominally fly in the finished disc drive 14 product. If the glide test 2702 is completed without contact between the PZT glide test head 8 and any surface defects DF.01-DF.N, then the disc 2 is passed on the assumption that there will be no contact between the operational heads 8 & 10 and the discs 2 during normal operation. On the other hand, if contact occurs between the PZT glide head 8 and any surface defects DF.01-DF.N, then the disc 2 is passed on the assumption that there will be no contact between the operational heads 8 & 10 and the discs 2 during normal operation.

Figure 28A:
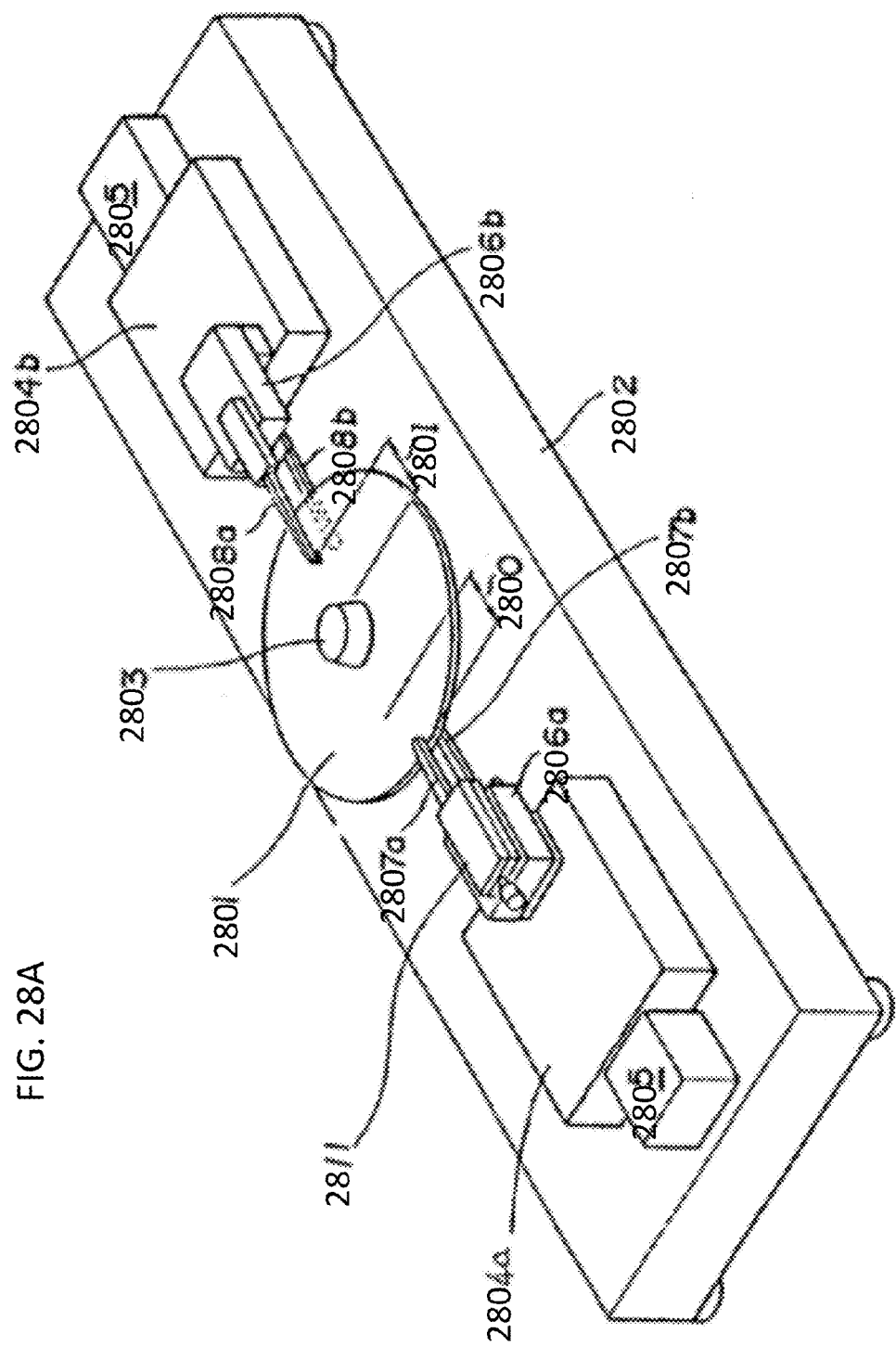
FIG. 28A is a top view of a diagram of a disk certifier.

FIG. 28A is a perspective view of a hard disk testing apparatus of the present invention. A hard disk 2801 is mounted on a rotation spindle 2803 provided on a bed 2802, and rotated at a revolution speed determined by a user and/or by the manufacturing of the device.

A pair of carriages 2804a and 2804b are provided laterally opposed to one another on the bed 2802 with the rotation spindle 2803 at the center therebetween. The carriages 2804a and 2804b are constructed in a manner such that they are preferably reciprocated in the direction of the center of rotation spindle 2803 each by a driving motor 2805 through a built-in ball screw mechanism.

Head mounting boards 2806a and 2806b are fixed on end portions of the carriages 2804a and 2804b. At the upper and lower sides of the respective head mounting boards 2806a and 2806b are provided pairs of upper and lower heads 2807a and 2807b, and 2808a and 2808b, respectively, which each extend toward the rotation spindle 2803.

The head 2807a is connected to an end portion of a micro adjustment carriage 2809 which is fixed to the upper face of the head mounting board 2806a. The micro adjustment carriage 2809 is a kind of a small sized carriage of the above 2804a or 2804b, and has a driving motor and built-in ball screw mechanism. It is constructed in such a manner that the head 2807a is reciprocated by the ball screw mechanism in the direction of the center of the spindle 2803.

On the other hand, the lower head 2807b is fixedly mounted on the side of the head mounting board 2806a, and the heads 2807a and 2807b are provided with predetermined separations from the respective upper and lower surfaces of the disk 2801.

The pair of upper and lower heads 2808a and 2808b are fixedly mounted with the aid of jigs on the head mounting board 2806b which is provided on the carriage 2804b. The end faces of the heads 2808a and 2808b are aligned to a near vertical line and are maintained at predetermined separations from the upper and lower surfaces of the disk 2801.

A procedure of the adjustment of head positions is hereunder described with reference to a flow chart shown in FIG. 29.

As shown in FIG. 28A, supposing that the carriage 2804a is operated as an outer carriage for testing the outer half O radius of the disk 2801, and the carriage 2804b as an inner carriage for testing the inner half radius I of the disk 2801. After retracting both carriages 2804a and 2804b, a disk 2801 is set on the rotation spindle 2803 for test, and is rotated at a predetermined revolution speed.

Thereafter, the carriage 2804b is moved toward the rotation spindle 2803 until the heads 2808a and 2808b reach a writing start position of the carriage 2804a which is located at around the center of the measuring range of the disk 2801. At this location a test signal is written in the disk 2801 by a write circuit (not shown) through the heads 2808a and 2808b, thereby providing a track of the test signal at around the center of the measuring range of and in both upper and lower surfaces of the disk 2801.

Following the above operation, the carriage 2804a is moved toward the rotation spindle 2803 while reading outputs of the head 2807b by a read circuit (not shown). When a maximum value of the signal written by the head 2808b is detected, the carriage 2804a is stopped at this position.

The micro adjustment carriage 2809 is then moved back and forth until the head 2807a detects the signal written by the head 2808a. While observing outputs from the head 2807a, the micro adjustment carriage 2809 is operated to move the head 2807a. At the detection of a maximum value of the written signal, the movement of the micro adjustment carriage 2809 is stopped.

By the above operation, the positions at which the heads 2808a and 2808b are mounted are correctly adjusted. Therefore, even if there is a small difference between positions of the heads 2808a and 2808b, positions of the heads 2807a and 2807b are accordingly adjusted.

As a result, a track at which the test is started by the inner carriage and a track at which the test is completed by the outer carriage are correctly registered, and therefore omission or duplication of test of tracks at the border between an inner testing range covered by the inner carriage (e.g. the range I as shown in FIG. 28A) and an outer testing range covered by the outer carriage (e.g. the range O as shown in FIG. 2801) is effectively prevented.

Figure 28B:
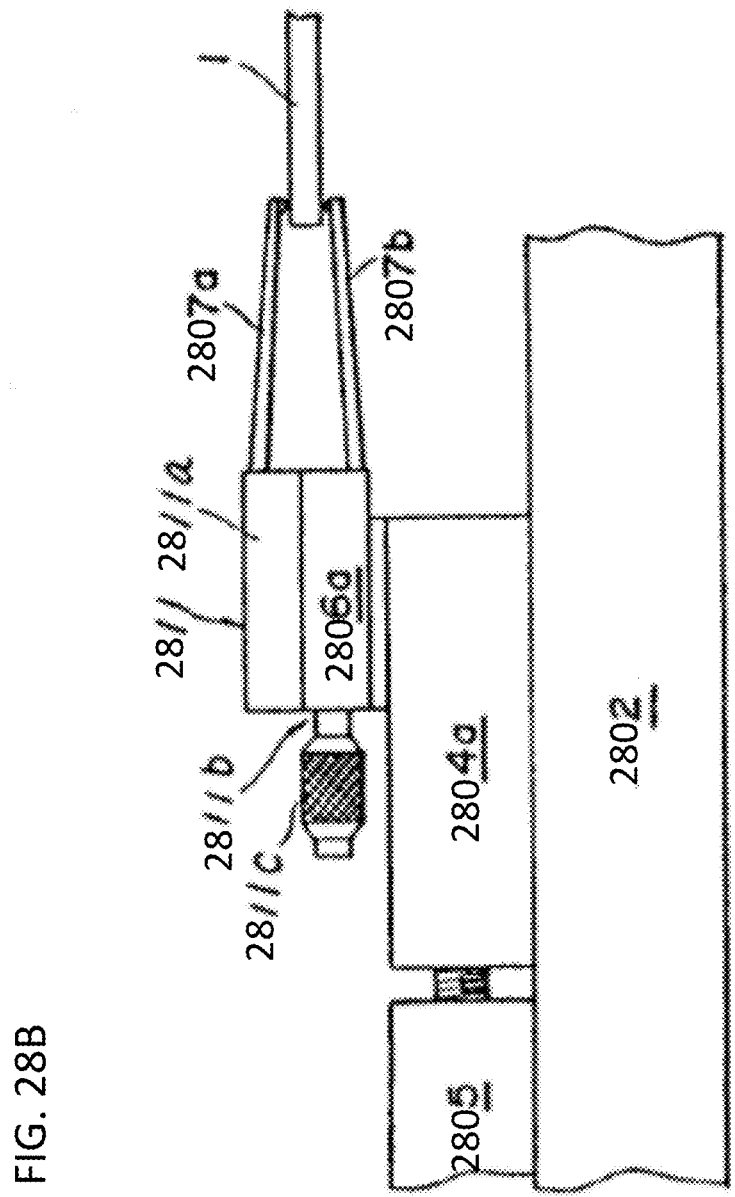
FIG. 28B is a side view of a diagram of a disk certifier.

FIG. 28B in this embodiment, a micro adjustment carriage 2811 has a well-known micrometer mechanism which is used to reciprocate a head 2807a in the direction of the center of a spindle 2803.

Figure 29:
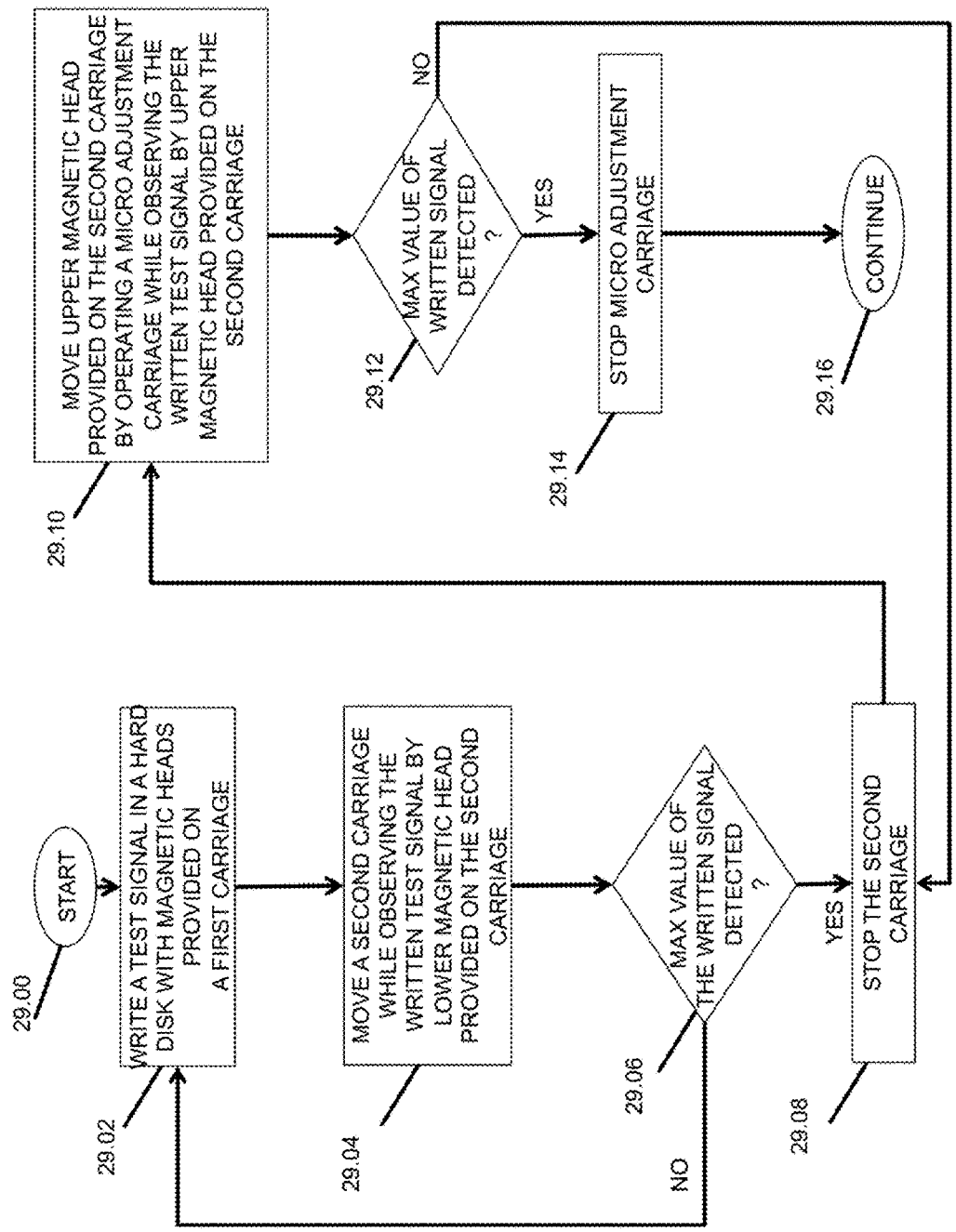
FIG. 29 is a flow chart of a certifier operation algorithm.

FIG. 29 is a flow chart of a certifier operation algorithm. In step 29.02 a test signal 13.TEST is written in a hard disk with magnetic heads 10 provided on a first carriage CRG.01. In step 29.04 a second carriage CRG.02 is moved while observation is made in a written test signal 13.TEST by a lower magnetic head 10 provided on the second carriage CRG.02. In step 29.06 it is determined whether a maximum value of the written test signal 13.TEST has been detected. When it is determined in step 29.06 that the maximum value of the written signal 13.TEST has not been detected, the loop of steps 29.02 through 29.06 is repeated as necessary. Alternatively, when it is determined in step 29.06 that the maximum value of the written signal test 13.TEST has been detected, the second carriage CRG.02 is stopped in step 29.08. In step 29.10 the upper magnetic head 10, which is provided on the second carriage CRG.02, is moved by operating a micro adjustment carriage CRG.03 while observing the written test signal 13.TEST by the upper magnetic head 10 provided on the second carriage CRG.02. In step 29.12 it is additionally determined whether the maximum value MV.01 of the written signal 13.TEST has been detected. When it is determined in step 29.12 that the maximum value MV.01 of the written signal 12.TEST has not been detected, the process returns to step 29.08 and re-executes the loop of steps 29.08 through 29.12 as necessary. In the alternative, when it is determined in step 29.12 that the maximum value MV.01 of the written signal 13.TEST has been detected, the micro adjustment carriage CRG.03 is stopped in step 29.14. Alternate operations are subsequently executed in step 29.16.

Figure 30:
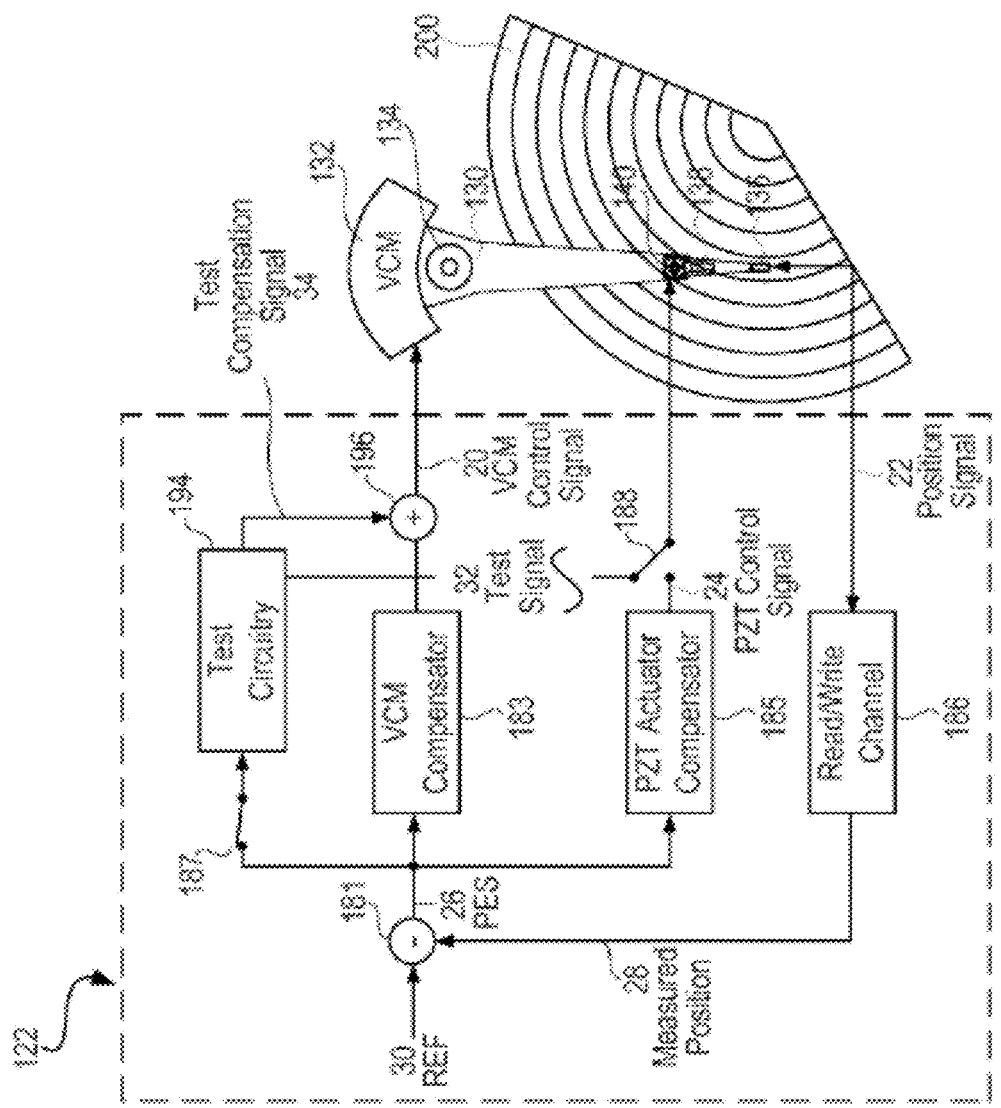
FIG. 30 is a PZT glide operations flow diagram.

FIG. 30 is a PZT glide 8 operations flow diagram. Power flows through a plurality of circuits and charge modifications to the VCM, and is subsequently optionally sent back through a read/write channel.

Figure 31:
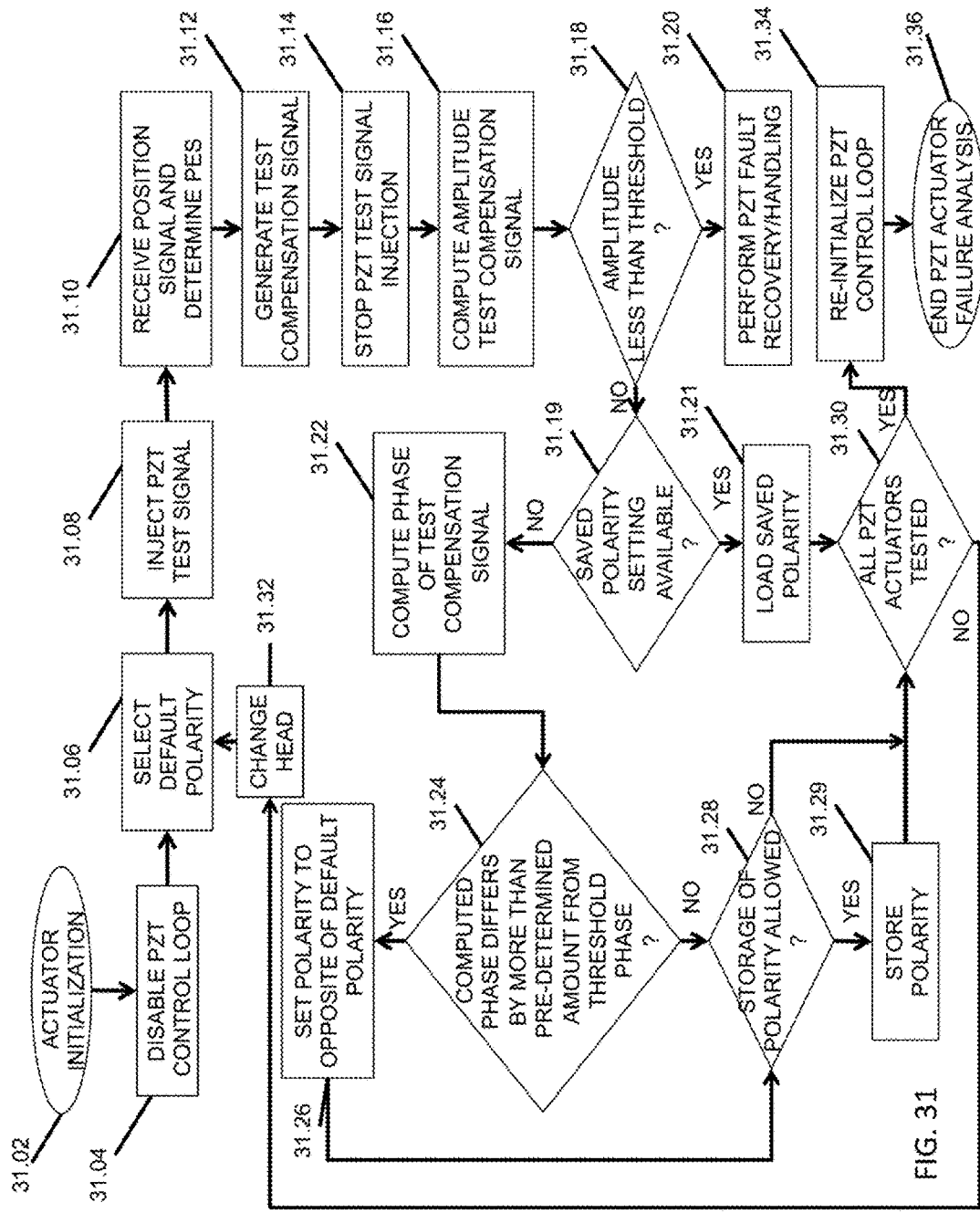
FIG. 31 is a flow chart of PZT actuator failure analysis.

FIG. 31 is a flow chart of PZT actuator 3100 failure analysis. In step 31.02 the actuator 3100 is initialized, and in step 31.04 a PZT control loop PZT.LP.01 is disabled. In step 31.06 a default polarity POL.01-POL.N is selected. In step 31.08 a PZT test signal 13.TEST is injected. In step 31.10 a position signal 13.POS is received, and a PES is determined, and a test compensation signal is determined in step 31.12. In step 31.14 the PZT test signal 13.TEST injection is stopped, and in step 31.16 the amplitude of the test compensation signal 13.TEST is computed. In step 31.18 it is determined whether the computed amplitude is less than a predetermined threshold, preferably 1 mVolt or based on maximum signal detection capability and requirements. When it is determined that the computed amplitude is less than the threshold, a PZT fault recovery/handling process 3102 is performed. Alternatively, when it is determined that the computed amplitude is greater than the threshold, it is determined in step 31.19 whether a saved polarity setting POL.01 is available. When a saved polarity setting POL.01 is available, the saved polarity POL.01 is saved in step 31.21, and in step 31.30 it is determined whether all of the PZT actuators 3100 have been tested. When it is determined in step 31.30 that all of the PZT actuators 3100 have been tested, the PZT control loop PZT.LP.01 is re-initialized in step 31.34, and the PZT actuator failure analysis process is ended in step 31.36.

In the alternative, when it is determined in step 31.19 that no saved polarity setting POL.01 is available, a phase of the text compensation signal 3104 is computed in step 31.22. Subsequently, it is determined whether the computed phase differs by more than a predetermined amount from the threshold phase. When the computed phase differs by more than a predetermined amount from the threshold phase, the polarity POL.01-POL.N is set to the opposite of the default polarity POL.DEF in step 31.26. Upon completion of step 31.26, or when the computed phase does not differ by more than the predetermined amount from the threshold phase, it is determined in step 31.28 whether storing of the polarity setting POL.01-POL.N is allowed. When storing of the polarity setting POL.01-POL.N is allowed, the polarity POL.01-POL.N is stored in step 31.29. When it is determined that storing of the polarity setting POL.01-POL.N is not allowed, it is determined in step 31.30 whether all of the PZT actuators 3100 have been tested. When it is determined that all of the PZT actuators 3100 have not been tested, the head 8 is changed in step 31.32, and steps 31.06 through 31.36 are additionally and/or alternatively executed as necessary.

Figure 32A:
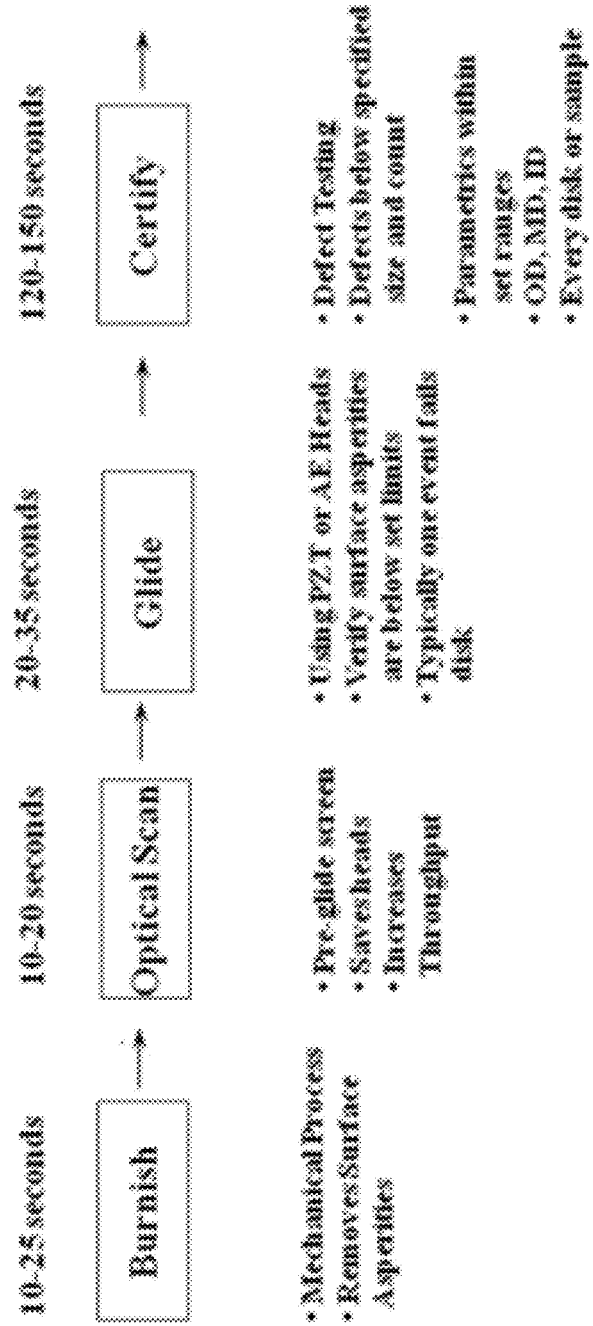
FIG. 32A is a typical hard disk test cycle.

FIG. 32A is a typical hard disk 2 test cycle 3200. In the first 10-25 seconds of a typical test cycle 3200, the disk 2 is burnished, which is a mechanical process for removing surface asperities DF.01-DF.N from the disk 2. In the 10-20 second segment of a typical test cycle 3200, an optical scan 2401 is executed, which occurs before a glide head 8 screen, which saves glide heads 8 and increases the number of throughput disks 2. In the 20-35 second segment of the typical test cycle 3200, a glide head 8 test is executed, wherein a PZT or AE head is used, and the purpose is to verify that any existing surface asperities DF.01-DF.N are below any previously determined limits. In this stage of the test cycle 3200, a single asperity DF.01-DF.N event can fail a disk 2. In the segment of 120-150 seconds in the typical test cycle 3200, a disk 2 is certified, wherein it is verified that any asperities and defects DF.01-DF.N are below a specified size and count, and that all of the parametrics, i.e. OD, MD, and ID fall within set ranges.

Figure 32B:
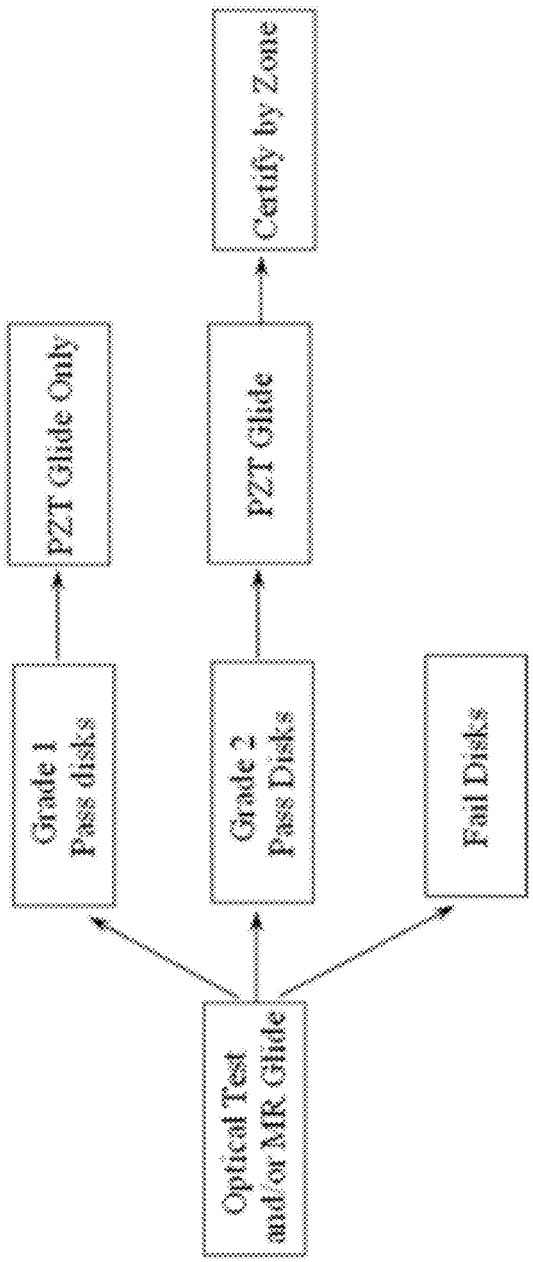
FIG. 32B is an MR glide and PZT glide operations test sequence.

FIG. 32B is an MR glide 10 and PZT glide 8 operations test sequence 3202. Following an optical test 2401 and/or an MR glide 10, a Grade 1 passes the disks 2, sending the disks 2 onto a PZT glide 8 only; a Grade 2 also passes the disks 2, and a PZT glide 8 is executed, and the disk 2 is certified by zone; or the disks 2 may optionally be failed if a greater than allowed number or severity of asperities and defects DF.01-DF.N are detected. This greatly increases the efficiency by which disks 2, especially disks 2 not composed of ferromagnetic materials may be tested, because gravitomagnetic induction is distinct and different from magnetic induction of the ferro-magnetic media.

Figure 33:
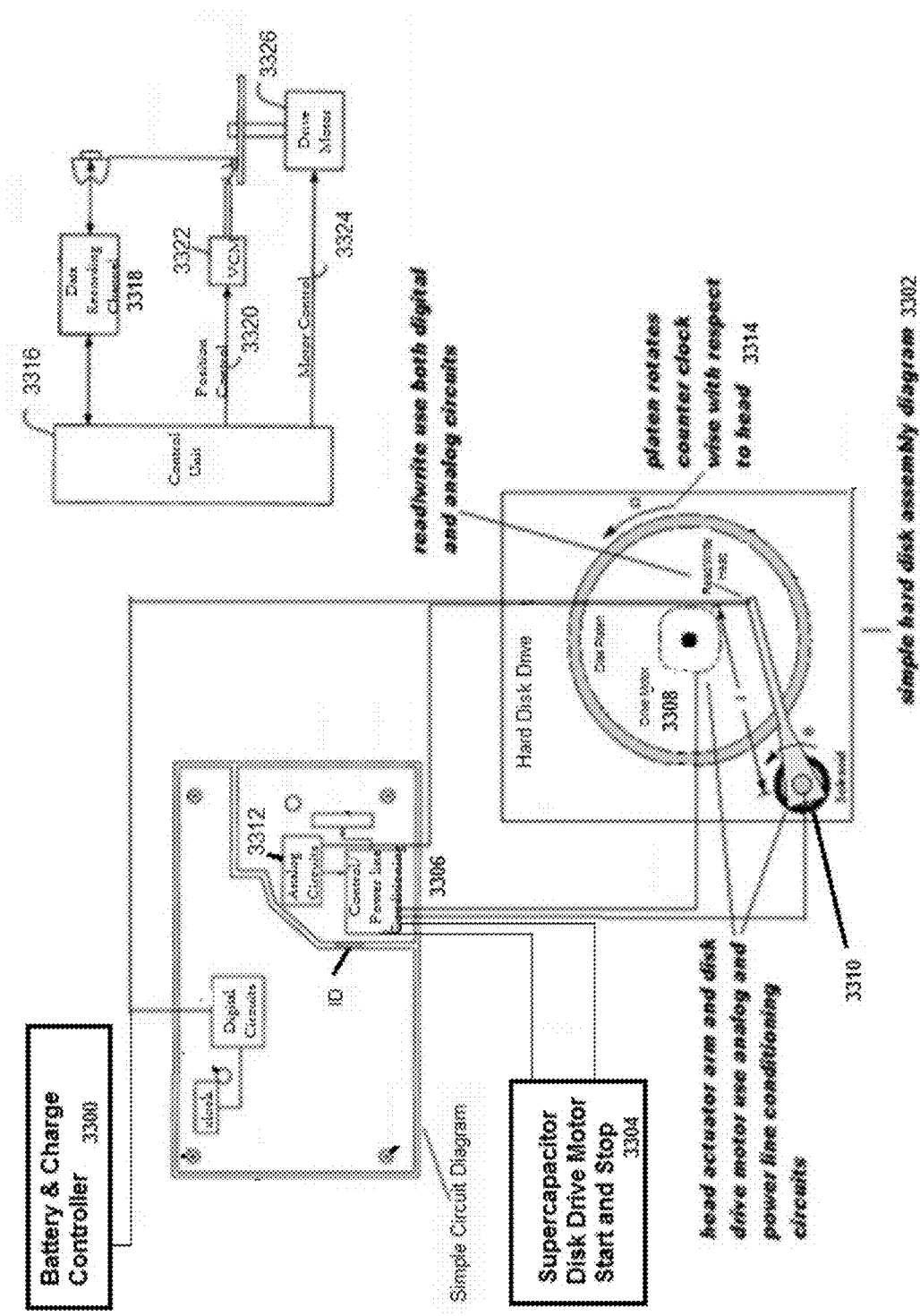
FIG. 33 is a gravitomagnetic induction power supply equipment overview.

FIG. 33 is a gravitomagnetic induction power supply equipment overview. A battery and charge controller 3300 is shown to be connected to digital circuits in a simple circuit diagram, and to a read/write head 10 in a simple hard disk 2 assembly diagram 3302. A supercapacitor disk drive motor start and stop 3304 is shown to be connected both to control/power line 3306 conditioning in the simple circuit diagram, which is also connected to the disk drive motor 3308, and to the arm 3310 on which the read/write head 10 is mounted. Analog circuits 3312 are additionally connected from within the simple circuit diagram to the read/write head 10. A platen 3314 is indicated which rotates counter clockwise with respect to the read/write head 10. Additionally shown is a control unit 3316 bidirectionally coupled to a data recording channel 3318. The control unit additionally leads, via a position control 3320 to a VCM 3322, and via a motor control 3324 to a drive motor 3326.

Figure 34:
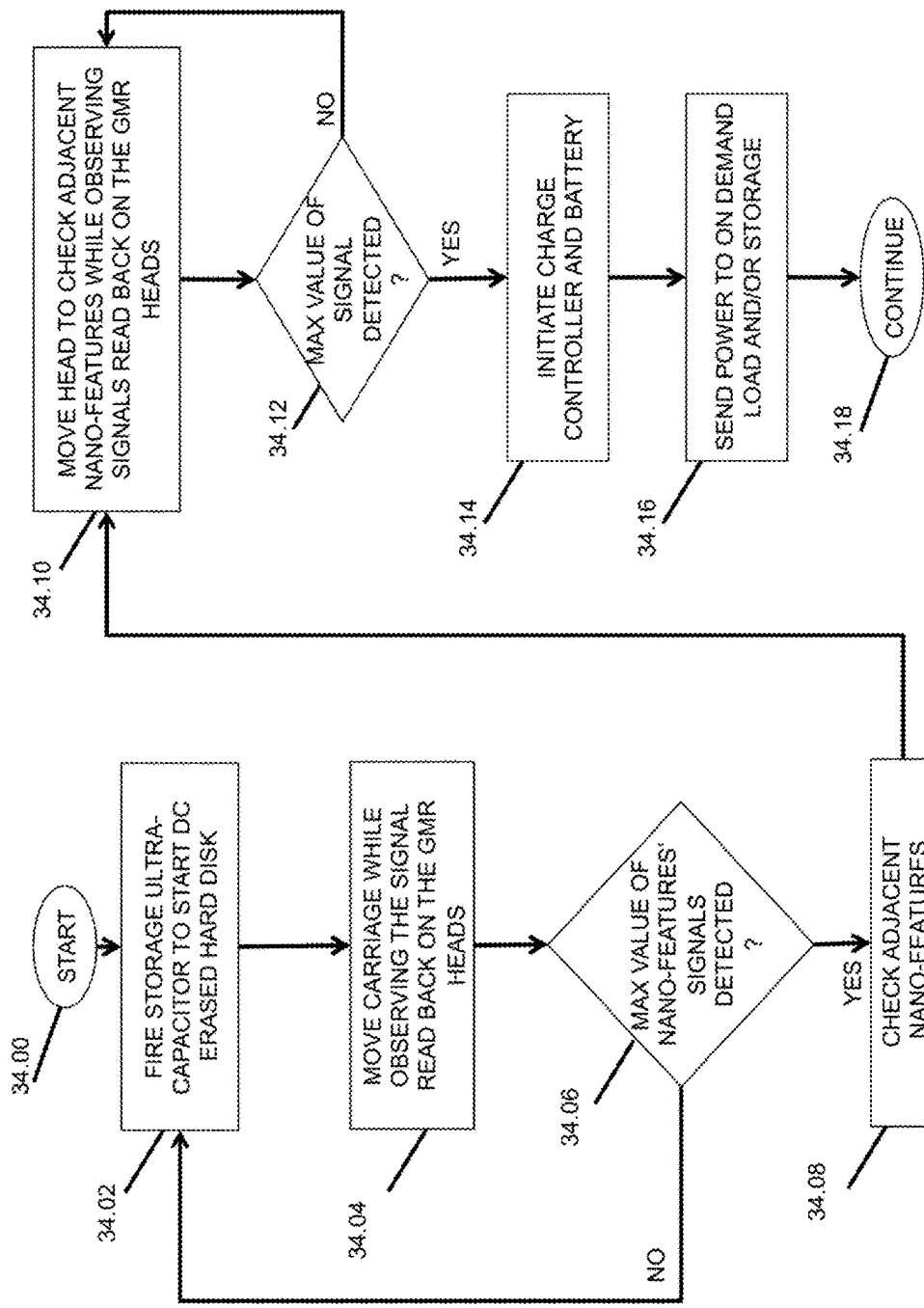
FIG. 34 is a flowchart of the gravitomagnetic induction power supply operations.

FIG. 34 is a flowchart of the gravitomagnetic induction power supply operations. In step 34.02 a storage ultra-capacitor 3400 is started in order to start a DC erased hard disk 2. In step 34.04 the carriage CG.01 is moved while the signal readback 13.GMR on the GMR heads 10 is observed. In step 34.06 it is determined whether the maximum value of the nano-features' NF.01-NF.N signals 13.NF have been detected. When the maximum value of nano-features' NF.01-NF.N signals 13.NF have not been detected, the loop of steps 34.02 through 34.06 is repeated. When it is determined that the maximum value of nano-features' NF.01-NF.N signals 13.NF have been detected, the adjacent nano-features NF.01-NF.N are checked in step 34.08. In step 34.10, the head 10 is moved to check the adjacent nano-features NF.01-NF.N while observing signals read back on the GMR heads 10. In step 34.12 it is determined whether the maximum value of the signal 13.NF has been detected. When the maximum value of the signal 13.NF has not been detected, step 34.10 is re-executed. When it is determined that the maximum value of the signal 13.NF has been detected, a charge controller and battery 2674 are initiated in step 34.14, wherein the battery 2674 is used to receive and store energy generated by the interaction of the GMR head 10 with the nano-features NF.01-NF.N. In step 34.16, power generated by the interaction of the GMR head 10 with the nano-features is sent to on-demand locations, such as within a computer or a vehicle, or is stored, if no demand for power is currently being made. In step 34.18, alternate operations are executed.

Figure 35:
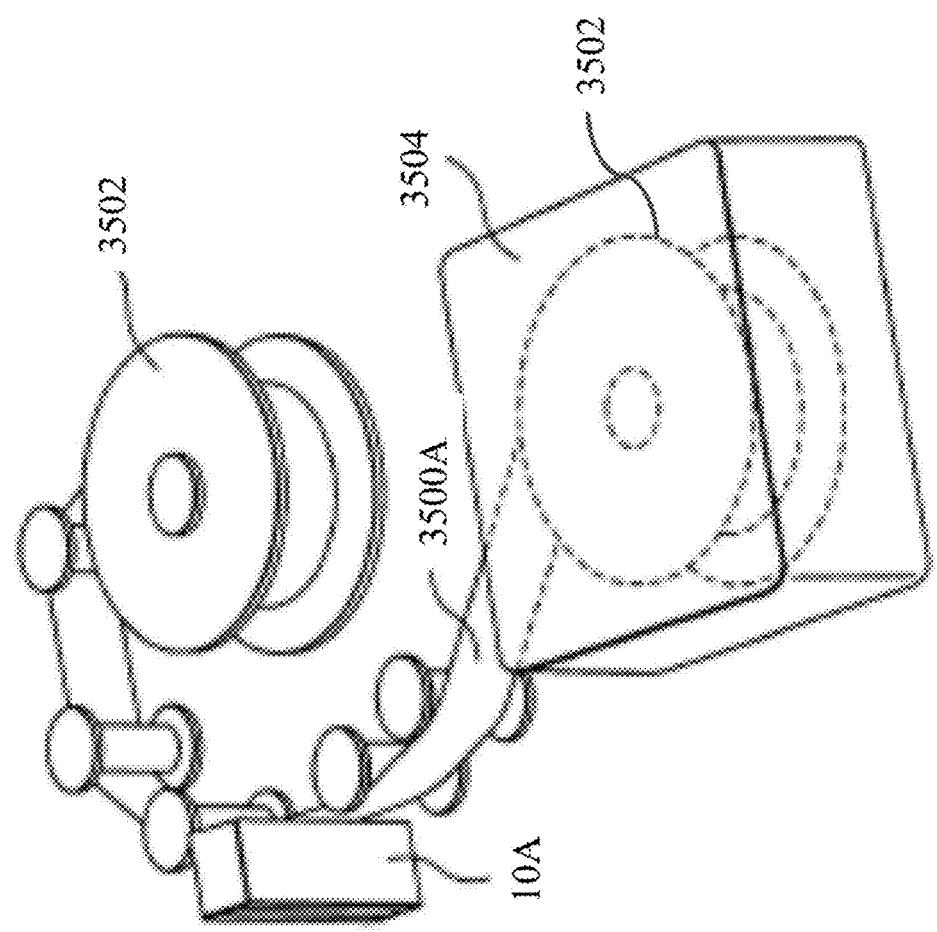
FIG. 35 is a diagram of a GMR head testing magnetic tape, wherein the magnetic tape may additionally be used in a process of gravitomagnetic induction.

FIG. 35 is a diagram of a GMR head testing magnetic tape 3500A, wherein the magnetic tape may additionally be used in a process of gravitomagnetic induction. A tape cartridge having a single reel 3504 is shown, in addition to a take-up reel 3502 for temporarily rewinding a multi-channel magnetic tape 3500A drawn out from the tape cartridge 3504, and a multi channel thin-film magnetic head 10A. The multi channel thin-film magnetic head 10A can reciprocate in directions or track-width directions 3600A and 3600B, perpendicular to reciprocating running directions 3602A and 3602B of the multi-channel magnetic tape 3500A. As is known in the art, write and read operations are performed to and from the multi-channel magnetic tape 3500A of the half-inch width. The multi-channel thin film magnetic head 13 for this purpose is provided with magnetic GMR read head elements of 16 channels, magnetic write head elements of 16 channels and magnetic servo head elements of 2 channels.

Figure 36:
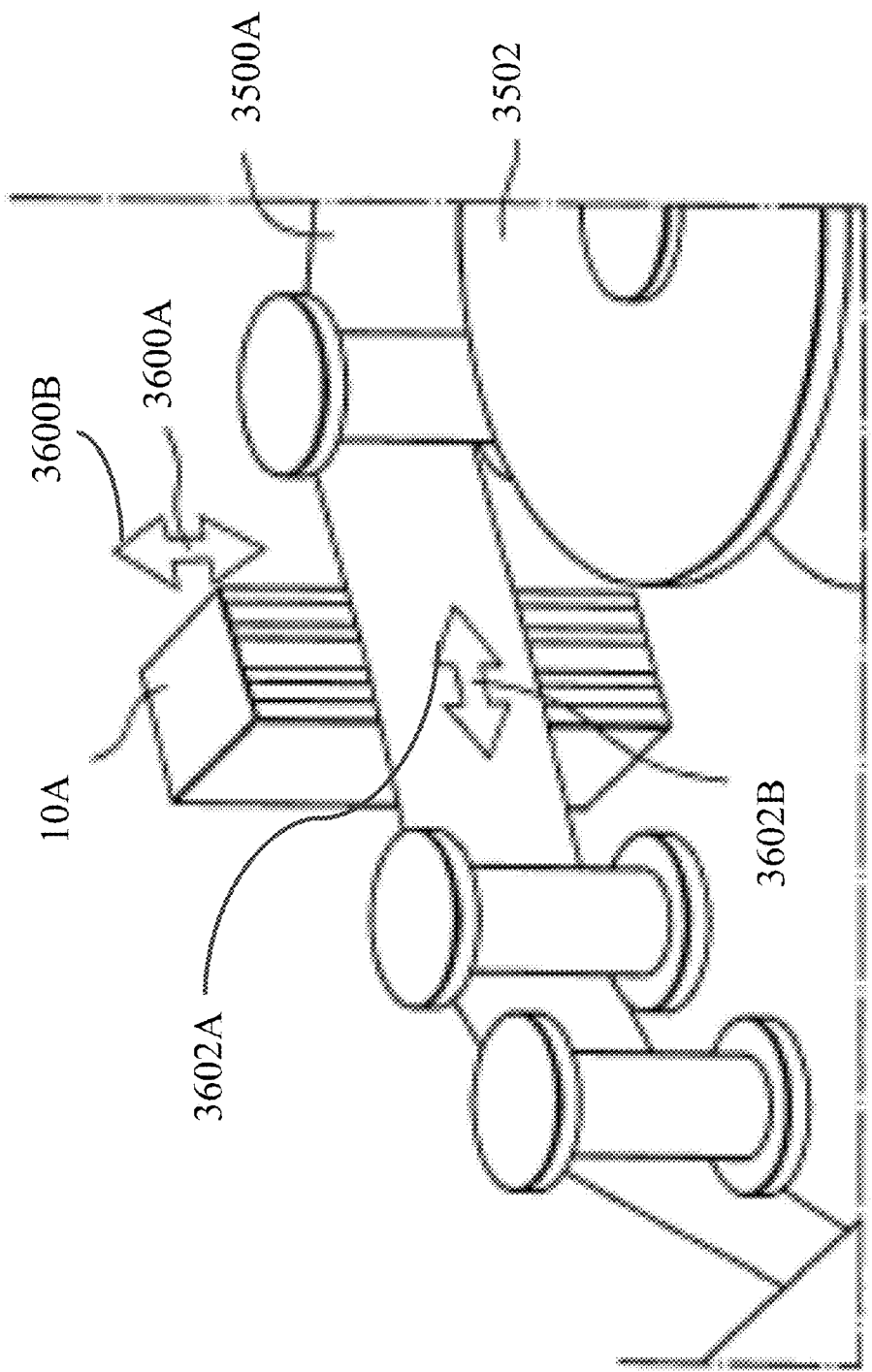
FIG. 36 is a blown-up view of the diagram of FIG. 35.

FIG. 36 is a blown-up view of the diagram of FIG. 35.

Figure 37:
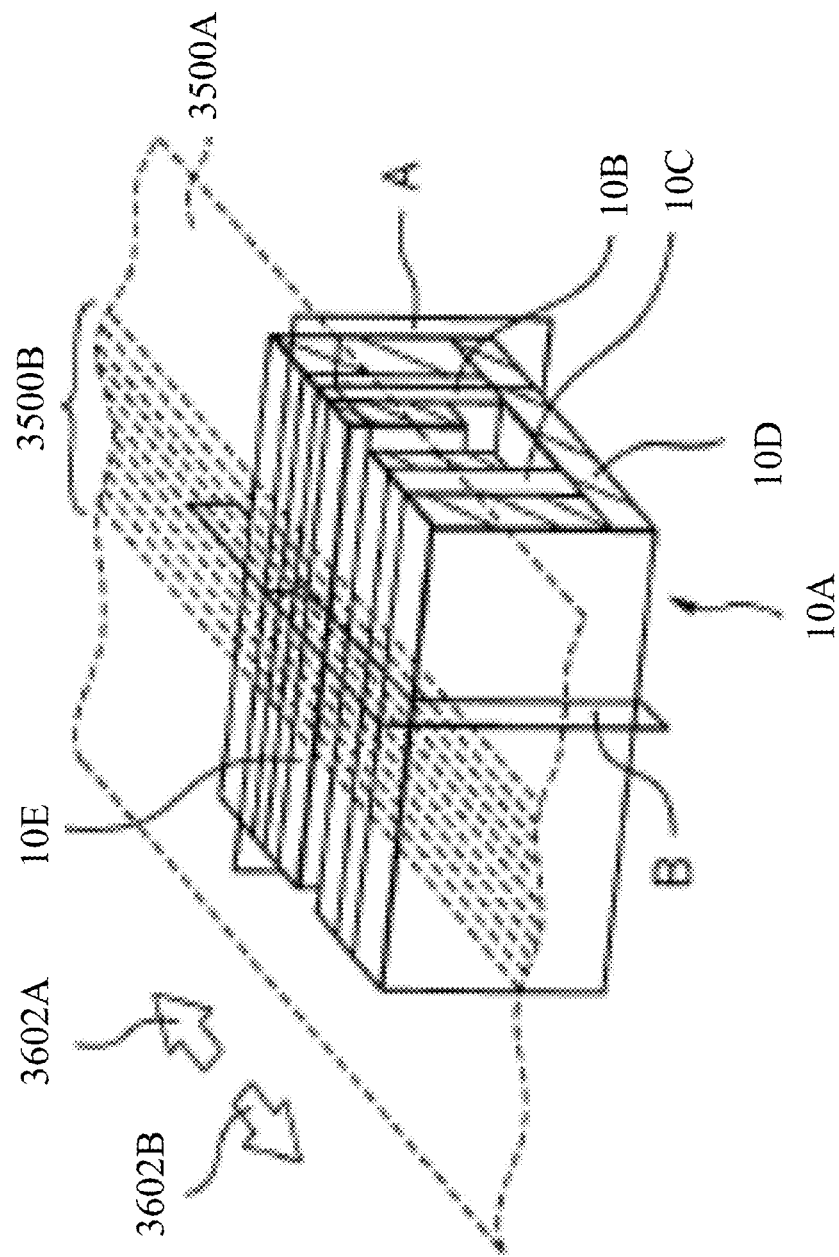
FIG. 37 is a perspective view of the means by which the GMR head may test the magnetic tape.

FIG. 37 is a perspective view of the means by which the GMR head may test the magnetic tape 3500A, and schematically illustrates relative constitution between the multi-channel thin film magnetic head 10A and the multi-channel magnetic tape 3500A, shown in FIG. 35. As shown in the figure, the multi-channel magnetic tape 3500A has a plurality of tracks 3500B. Additionally, the multi-channel thin-film magnetic head 10A has a first head section 10A, a second head section 10b and a frame 10C for supporting the both head sections. When performing write and read operations, the magnetic tape 3500A moves alternately in direction of arrow 3602A or arrow 3602B. The write and read operations of data signal with respect to the tracks 3500B of the magnetic tape 3500A are performed under the state where a TBS 10E of the thin-film magnetic head 10A is in contact with the surface of the moving magnetic tape 3500A. When the magnetic tape 3500A moves to the direction of arrow 3602A, for example, read operation is performed in trailing side first head section 10B and write operation is performed in leading side second head section 10C. Whereas when the magnetic tape 2500B moves to the opposite direction, the direction of the of arrow 3602B, read and written head sections are replaced.

FIGS. 38A and 38B compare VSD for tape cartridge (Oracle T1OOOOC cartridge volume, 5.5 TB data capacity [denoted by 3500A]), HDD (desktop 3.5-inch form-factor drive volume, wherein 3800 denotes a disk platen A, 3804 denotes a disk platen B, and 3802 the GMR head assembly 600 for disk platen A, where 3800 denotes a disk platen A. VSD, defined in this manner, is a function of areal density and packaging efficiency. Even though tape has the lowest areal density, its higher packaging efficiency, due to tape stacking on itself in the cartridge and absence of a motor, actuator or electronics in the cartridge, offsets this. As an additional benefit, the stacked nature of tape also serves to protect the critical magnetic recording surface.

A supercapacitor is essential to enable to fast source of power storage or generation to stop and start the disk 2 spinning to maintain adequate and reliable power in super capacitor. The battery requires quick power storage capacity and slower discharge then supercapacitor Possible commercial, business, and governmental applications to this invention are as follows:

1. Calibration Disk Standards for manufacturing purposes traceable to the National Institute of Standards and Technology requirements. Quality control for high density recording requires that the computer's hard disk surface be free of defects larger than 1 mm×1 mm in areal size or better. Current methods for characterizing defects of this size are limited by slow metrology techniques such as Atomic Force Microscopy (AFM), the associated Magnetic Force Microscopy (MFM), or faster techniques like Piezoelectric (PZT) Glide. Another faster defect detection technique that uses spin stands such as magnetic certification testers that detect missing pulses at high frequency write and read rates (i.e. Phase Metrics MG250, which is a type of hard disk certifier).

The GMR gravitomagnetic method and device could replace the existing magnetic certification testers currently in use by the magnetic media industry to detect missing pulse errors at high frequency write and read rates in magnetic media. The head disk assembly (HDA) used to detect missing pulse errors can compromise read and write capabilities for data exchanges that exceed the reliability requirement of the head disk assembly in the hard drive manufacturing process currently in use. The invented device described herein replaces this "certifier" with one that can detect pits, in addition to bumps, on the surface of the hard disk platter, as well as magnetic media defects, and can do so without high frequency write and read rates data recording, and the associated high frequency electronics necessary for certifying the disk platter's reliability using the current methodology.

The PZT gravitomagnetic method and device could replace the existing Piezoelectric (PZT) Glide head assembly used to detect bumps that compromise the reliability of the head disk assembly in the hard drive manufacturing processes. The invented device as described herein replaces these with a more efficient device and method that can detect pits in addition to bumps on the surface of the hard disk platter, and that can do so without contacting the spinning disk's surface.

The invented device is partially preferably characterized by its no-contact interaction with the disk platen, by its detection of pits and non-contact bumps, and National Institute of Standards and Technology ("NIST") traceable metrology techniques performed at disk drive speeds. These characteristics of the invented device provide increased yields and throughputs of disks without a loss of quality in the HDA manufacturing process.

2. Power generation using gravitational induction as the power source.

The invented device may additionally provide benefits in widespread commercial applications. For example, using the means by which power may be generated by means of the gravitomagnetic induction for purposes of powering electronic devices including, but not limited to, mobile phones, mobile computing devices such as tablets, desktop computers, laptop computers, etc. By incorporating the device in to the existing head disk assemblies of the electronic devices, significant increases may be made in the battery lives of such devices, and in the external power needed to provide charge to the devices. Very few changes would be required to make existing hard drives functional with a built-in gravitomagnetic power source.

By scaling up the device to a larger surface area disk, with nano-bumps NB.01-NB.N and/or nano-pits NP.01-NP.N covering a larger surface area, power densities of 10 MWh/meter$^2$ should be achievable in combination with a computer and/or micro-controllers, power control circuits, digital read-write, and analog circuitry, including super-capacitors, a high power capacity battery, for example in electric vehicles such as the TESLA MODEL S,™ electric automobile as marketed by Tesla Motors of Palo Alto, Calif., or other power storage devices. This could be integrated in combination with PV solar, wind, or conventional power generation to produce distributed power generation anywhere on demand.

3. Spin stand and mass spin-valve time band-gap based clocks to set Earth Gravity Standards for Time.

Gravitomagnetic time keeping may additionally be incorporated in to navigational systems and electronics so that time keeping is standardized relative to the earth's gravitomagnetic time frame of reference, which is slower on the earth's surface then it is in outer space due to gravitational frame dragging produced by the earth's gravitational field as the earth rotates. This uses the GMR gravitomagnetic method and device to determine the time frame of the point of interest relative to earth's gravitomagnetic time frame of reference in this application of this invention is to allow the determination the two points of interest, and their time reference frames, for purpose of propulsion and teleportation.

The current standards of universal are based on radioactive decay rates that have been found to be subject to rate changes during solar flares, but because the time keeping would be standardized to a specific point on Earth, external factors would be less likely to cause interruptions or inconsistencies.

4. Transportation devices using mass-spin valve gravity rectification for propulsion.

The power generation application of the invented device may be harnessed for purposes of powering electric vehicles of all sorts, including, but not limited to RVs, boats, cars, trucks, trains, airplanes, etc. Additionally, the implementation of the gravitomagnetic power generation should be readily achievable by replacing the existing battery source with one that is interconnected to the mass-spin valve for continuous power needs to be provided on demand.

To produce a direct propulsion source that incorporates the mass-spin valve's gravitomagnetic induction fields will require the incorporation of a type of plasmonic thrust using what is called Surface Plasmon Polaritons, which requires certain system configurations i.e. tuning, and a certain linear velocity of the turning disk, preferably within the range of 1 to 13,000 RPM, to achieve the necessary harmonics.

Quasi-particles are constructs that help physicists to make sense of the world; following is a non-limiting list of the relevant quasi-particles.

Electron quasi-particle—An electron with altered mass which accounts for all the interactions of electrons as they move through a material;

Hole—A positively charged spot where an electron once resided which is not static, and is used to understand behavior of electrons and protons when they exchange energy, often referred to as the generation-recombination mechanism in the field of semiconductor physics;

Exciton—An electron attracted to a hole, which leads to innovation in the fields of solar cells and light-emitting diodes in electronic displays;

Polariton—An exciton or similar particle coupled to a photon which leads to energy-efficient lasers;

Dropleton—A liquidlike cluster of electrons and holes that offers insight into commercially important semiconductors;

Phonon—A vibration that moves through a material's atoms as if it were a particle and that may play a pivotal role in inducing superconductivity in matter; and Plasmon—A wave of free-flowing electrons in a metal or plasma, which is essential for understanding how materials interact with light.

Plasmon waves are carriers of energy and have the ability to travel resistance free, but because everything in the universe is constantly in motion there are characteristic Plasmon waves, where these wave states act as carriers of energy, i.e. the Plasmon quasi-particles, having the ability through the superposition of states (harmonics) to also act as a power amplifier, which enables the production of thrust needed for propulsion.

Thus, the invented method and device provide a new way of powering electrical devices using gravitomagnetism, and a new way of producing thrust using gravitomagnetic induction harmonized with plasmonics.

5. Teleportation devices using mass-spin valve gravity rectification that converts electromagnetism with mass-energy, using quantum entanglement, into electromagnetism, and back into mass-energy so as to transport matter and energy to another distant location without alteration.

Teleportation requires the combination of the transmission of electromagnetic signals at two distant locations where the mass-spin valve device is entangled at both locations. However, current technology has successfully achieved entanglement with electrons only. There are characteristic plasmon waves, where these wave states act as carriers of energy, as in the above-outlined quasi-particles, and have the ability to travel resistance free necessary to enable the teleportation of mass. The mass spin-valve device in combination with a specific type of Plasmon, which requires certain system configurations, and a certain linear velocity of the turning disk, to achieve the necessary harmonics to do teleportation. This requires a gravitomagnetic plasmonic transceiver at both ends to achieve teleportation which incorporates two mass-spin valve devices quantum entangled together along with two electromagnetic transceivers.

The foregoing description of the embodiments of the invention has been described in connection with what are presently considered to be the most practical and preferred embodiments. However it is to be understood that the invention is not limited to the disclosed embodiments, but rather as intended to cover various modifications and equivalent arrangements which are included within the spirit and scope of the following claims. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A device adapted to detect physical features of an optical disk, the device comprising:
    a) an optical disk, the optical disk presenting a surface;
    b) means to securely rotate the optical disk ("rotating means") and rotating disk adapted to support the optical disk, wherein the surface is exposed;
    c) a GMR read head coupled with the rotating means, the GMR read head comprising an MR element electrically coupled with a signal output line, the MR element positioned sufficiently close to the surface to generate and capture gravito-magnetic energy;
    d) a measurement module coupled with the signal output line, the measurement module adapted to derive detections of extension features and depression features from gravito-magnetic energy transmitted via the signal output line, whereby extension features and depression features of the surface are detected and reported;
    e) a coherent light source; and
    f) a reflected light detection and measurement module, the coherent light source adapted to direct light energy toward the surface and the reflected light detection and measurement module adapted to detect and measure light received from the surface.

2. The device of claim 1, wherein the optical disk is a computer disk.

3. The device of claim 1, wherein the means to securely rotate the surface comprises a platen, the platen adapted to rotatably position the disk.

4. The device of claim 1, further comprising a piezoelectric glide head mechanically coupled with the rotating means and electrically coupled with the measurement module.

5. The device of claim 1, wherein the optical disk is pre-calibrated disk, wherein the calibration of the optical disk occurs prior to positioning the optical disk onto the rotating means.

6. The device of claim 5, further comprising a calibration memory coupled with the signal output and adapted to receive and record signals generated by the GMR head.

7. The device of claim 5, further comprising a piezoelectric module coupled with the rotating means and the measurement module.

8. The device of claim 1, further comprising a piezoelectric module coupled with the rotating means and electrically coupled with the measurement module.

9. The device of claim 1, wherein the reflected light detection and measurement module comprises a particle scatter detector.

10. The device of claim 1, wherein the reflected light detection and measurement module comprises a dark field scatter detector.

11. The device of claim 1, wherein the reflected light detection and measurement module comprises a bright field photo detector.

12. A method comprising:
    a. positioning a GMR head proximate to a disk;
    b. spinning the disk to generate gravito-magnetic energy;
    c. detecting depression features and extension features of the disk by an interpretation of the generated gravito-magnetic energy;
    d. storing an interpretation of the generated gravito-magnetic energy in a disk profile record;
    e. transferring the disk to a second disk inspection equipment;
    f. applying the second disk inspection equipment to generate depression feature measurements and extension feature measurements of the disk;
    g. comparing the depression feature measurements and extension feature measurements of the disk as generated by the second disk equipment with the disk profile record;
    h. generating a calibration evaluation of the second disk inspection equipment from the comparison of step g;
    i. applying a coherent light source adapted to direct light energy toward the surface; and j. applying a reflected light detection and measurement module adapted to detect and measure light received from the surface.

13. The method of claim 12, further comprising:
k. temporarily coupling a second disk with the second disk equipment;
l. applying the second disk inspection equipment to generate depression feature measurements and extension feature measurements of the second disk; and
m. applying the calibration evaluation of step h to interpret the measurements of the second disk generated in step l.

14. The method of claim 13, wherein the second disk is a non-magnetic disk.

15. The method of claim 13, wherein the second disk is an optical disk.

16. The method of claim 13, wherein the second disk comprises a glass substrate.

17. The method of claim 13, wherein the second disk equipment comprises a PZT head.

18. The method of claim 17, wherein the generation of measurements of step l comprises a generation of disk contact data from the PZT head.

19. A system adapted to detect physical features of an optical disk, the device comprising:
a) means to spin the optical disk, the optical disk presenting a surface;
b) means to position an MR element positioned sufficiently close to the surface to generate and capture gravito-magnetic energy;
c) means to derive detections of extension features and depression features from gravito-magnetic energy transmitted from the MR element, whereby extension features and depression features of the surface are detected;
e) a coherent light source; and
f) a reflected light detection and measurement module, the coherent light source adapted to direct light energy toward the surface and the reflected light detection and measurement module adapted to detect and measure light received from the surface.

* * * * *